United States Patent
Yamagishi

(10) Patent No.: US 6,717,692 B1
(45) Date of Patent: Apr. 6, 2004

(54) IMAGE PROCESSING SYSTEM AND CONTROL METHOD THEREFOR, IMAGE PROCESSING APPARATUS, AND RECORDING MEDIUM

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,985

(22) Filed: Dec. 21, 1999

(30) Foreign Application Priority Data

Dec. 24, 1998 (JP) .............................. 10-368166

(51) Int. Cl.$^7$ ................................ G06K 15/00

(52) U.S. Cl. ..................................... 358/1.15; 358/1.13

(58) Field of Search ................. 358/1.1, 1.13, 358/1.15, 1.18; 710/1, 8, 9, 10, 11, 16, 15, 62, 72, 64

(56) References Cited

U.S. PATENT DOCUMENTS 6,130,758 A * 10/2000 Funazaki ................ 358/1.15
2001/0003526 A1 * 6/2001 Kanehara ................ 370/465

* cited by examiner

*Primary Examiner*—Arthur G. Evans
(74) *Attorney, Agent, or Firm*—Fitzpatrick, Cella, Harper & Scinto

(57) ABSTRACT

In an image processing system in which an image processing apparatus and an image forming apparatus are connected via a serial bus, to print, at a high speed, a plurality of types of image data isochronously transferred from the image processing apparatus, a large-capacity memory for correcting the timing for each of the plurality of types of image data becomes necessary, resulting in an increase in cost. In this invention, in an image processing system in which a computer and a plurality of printers are connected via a serial bus, the computer acquires printer device information and efficiently acquires channels for isochronous transfer on the serial bus on the basis of whether channels can be shared by image data of a plurality of colors to be transferred to the printer.

58 Claims, 35 Drawing Sheets

FIG. 9A

| CHANNEL | 1 | 2 | 3 | 4 | 5 |
|---|---|---|---|---|---|
| PRINTER 102 | Y | M | C | K1 | — |
| PRINTER 103 | Y | M | C | — | K2 |

FIG. 9B

| CHANNEL | 1 | 2 | 3 | 4 | 5 | 6 | 7 |
|---|---|---|---|---|---|---|---|
| PRINTER 102 | Y | M1 | — | C1 | — | K1 | — |
| PRINTER 103 | Y | — | M2 | — | C2 | — | K2 |

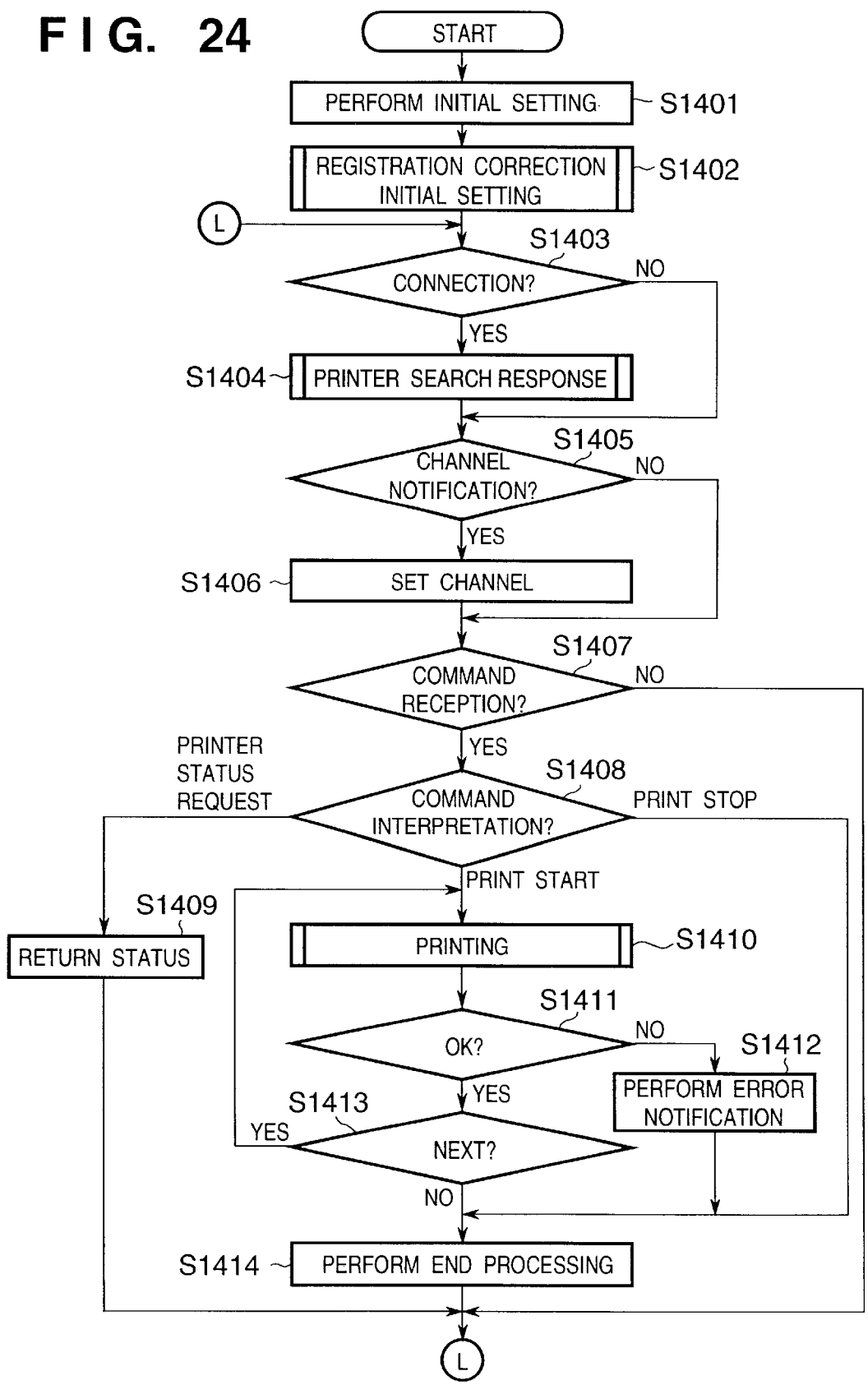

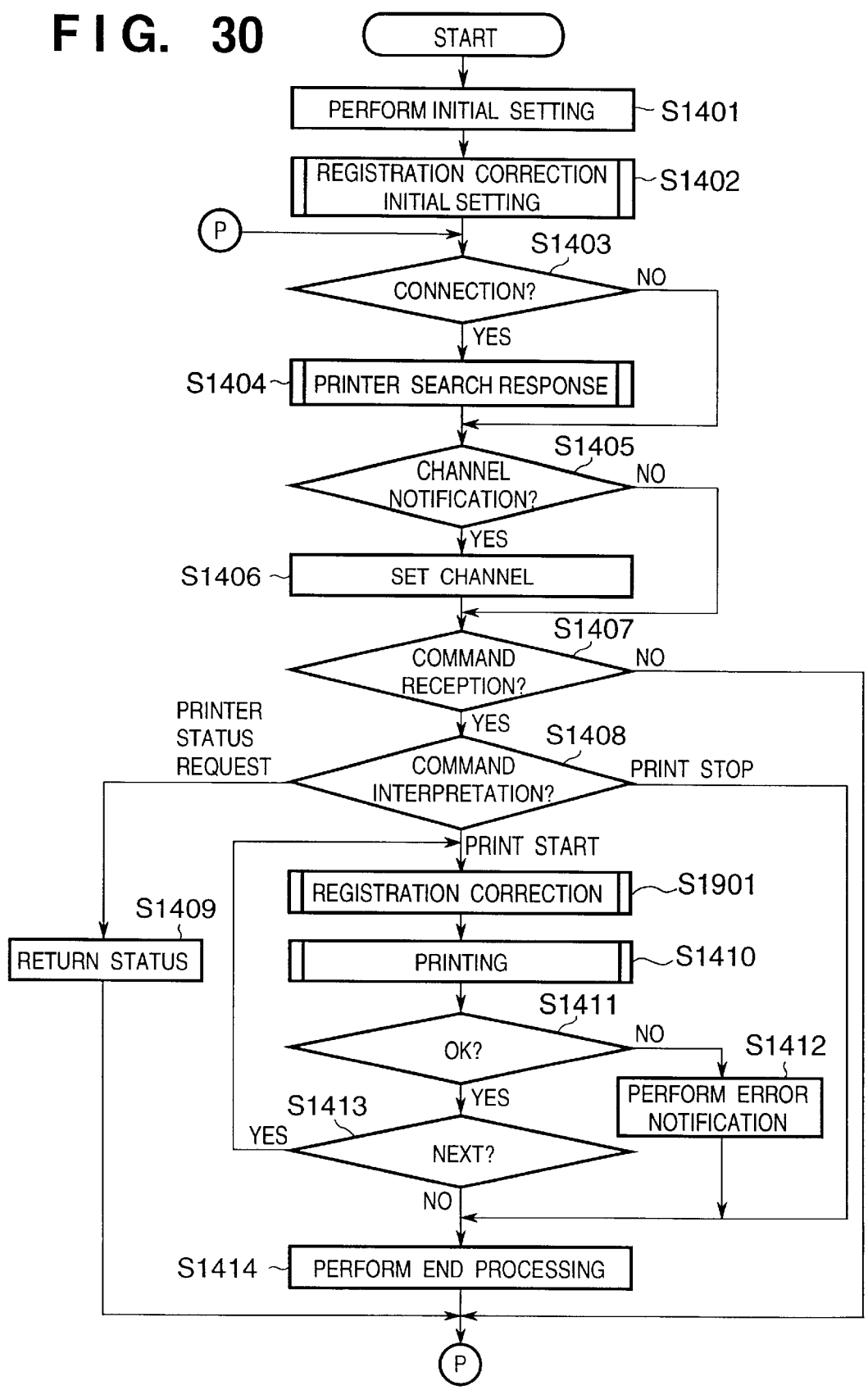

IMAGE PROCESSING SYSTEM AND CONTROL METHOD THEREFOR, IMAGE PROCESSING APPARATUS, AND RECORDING MEDIUM

BACKGROUND OF THE INVENTION

The present invention relates to an image processing system and a control method therefor, an image processing apparatus, and a recording medium and, more particularly, to an image processing system for forming a color image by an image forming apparatus on the basis of data transferred from an image processing apparatus and a control method for the system, an image processing apparatus, and a recording medium.

In recent years, networking of image processing apparatuses has progressed, and systems for data communication based on high-speed serial communication using IEEE 1394 (to be referred to as an IEEE 1394 scheme hereinafter) have emerged to realize high-speed transfer of a large quantity of image data.

High-speed serial communication such as IEEE 1394 or USB has an isochronous transfer mode capable of ensuring a given data transfer rate. More specifically, according to the isochronous transfer mode, a necessary number of channels for guaranteeing data transfer every defined cycle can be ensured. Hence, for example, in an image processing system having an image reading apparatus, computer, and image forming apparatus which are connected through an IEEE 1394 serial bus, image data can be transferred from the image reading apparatus to the computer or from the computer to the image forming apparatus by ensuring a predetermined transfer rate corresponding to the processing ability of each apparatus.

As an image forming apparatus constructing the above-described image processing system using a serial bus, an image forming apparatus for forming a color image by electrophotography is known.

A known color image forming apparatus using electrophotography repeats the image forming operation four times for yellow, magenta, cyan, and black using one photosensitive drum and a transfer drum, thereby forming a color image.

In the image processing system in which image data is transferred from a computer and an image is formed on printing paper using such one-drum image forming apparatus, after the printing paper is wound on the transfer drum, image data for yellow image formation is transferred first to form an image. Next, image data for magenta image formation is transferred to form an image, image data for cyan image formation is transferred to form an image, and finally, image data for black image formation is transferred to form an image. After that, the printing paper is removed from the transfer drum, and the images are fixed to print the color image.

In the image processing system using the one-drum color image forming apparatus, one set of mechanisms such as a photosensitive drum necessary for image formation suffices. Since color image data can be transferred four times, the apparatus need not be equipped with a large-capacity image memory required to temporarily store the color image data although high-speed printing is difficult. For this reason, color printing can be realized with a relatively inexpensive arrangement.

Another known color image forming apparatus using electrophotography uses four photosensitive drums for yellow, magenta, cyan, and black and forms an image once per drum to form a color image.

In an image processing system in which image data is transferred from a computer and an image is formed on printing paper using such four-drum image forming apparatus, after image data of yellow, magenta, cyan, and black sent from the computer are temporarily stored in image memories for the respective color image data, the color image data are sequentially read out from the image memories to form images in accordance with timings for conveying printing paper to the respective photosensitive drums. After this, the images are fixed to print the color image.

In the image processing system using the four-drum image forming apparatus, a color image can be formed by conveying printing paper once. For this reason, printing at a relatively high speed can be realized.

For example, given a system which connects one computer to a plurality of image forming apparatuses as the image processing system using a serial bus, image data can be transferred from the computer to the plurality of image forming apparatuses by ensuring a necessary number of channels of a transfer mode such as the isochronous transfer mode capable of ensuring a data transfer rate, and an image can be formed.

In this case, however, the computer outputs image data without control, i.e., transfers data to ensured channels without handshaking. Each of the plurality of image forming apparatuses connected must have a large-capacity memory to establish synchronization with data transfer from the computer so as to compensate for a synchronization shift between the image forming apparatuses. The image forming apparatuses and system become expensive because of the image memories.

For image data transfer from the computer to the plurality of image forming apparatuses in the system, if channels of the isochronous transfer mode are individually ensured for the image forming apparatuses for data transfer, synchronization adjustment using the large-capacity image memories of the image forming apparatuses is unnecessary. In this case, however, the number of channels to be ensured increases in accordance with the number of image forming apparatuses, resulting in occupation of channels in the isochronous transfer mode.

In the four-drum image forming apparatus, the photosensitive drums are spaced apart from each other by a predetermined distance for reasons of mechanical arrangement, and printing paper is conveyed sequentially through the plurality of photosensitive drums. Hence, image data of the respective colors must be supplied while correcting any time lags between the times of arrival of the printing paper at the photosensitive drums. In addition, differences in the image formation position between the photosensitive drums, i.e., so-called misregistration must be corrected. To do this, synchronization adjustment between the color image data and fine adjustment of the image formation positions must be performed using a large-capacity image memory or FIFO memory for temporarily storing image data. Hence, the cost of the image forming apparatus inevitably increases.

In the image processing system including a four-drum image forming apparatus as well, when the channels in the isochronous transfer mode are individually ensured for the plurality of photosensitive drums in the image forming apparatus, as described above, synchronization adjustment between the photosensitive drums using a large-capacity image memory need not be performed. However, four channels must be ensured for each photosensitive drum of each image forming apparatus. Hence, the number of channels required further increases, resulting in occupation of channels of the isochronous transfer mode.

SUMMARY OF THE INVENTION

Accordingly, it is an object of the present invention to provide an image processing system in which an image processing apparatus and image forming apparatus are connected via a serial bus, and the image forming apparatus with an inexpensive arrangement can print, at a high speed, image data transferred from the image processing apparatus in the isochronous transfer mode, a control method for the image processing system, an image processing apparatus, and a recording medium.

According to the present invention, the foregoing object is attained by providing an image processing apparatus connected to a plurality of image forming apparatuses via a serial bus, comprising:

channel control means for ensuring a plurality of channels for isochronous transfer through said serial bus and assigning the channels to a plurality of types of image data on the basis of device information of said plurality of image forming apparatuses; and communication means for isochronously transferring the plurality of types of image data to said plurality of image forming apparatuses using the assigned channels.

The foregoing object is also attained by providing an image processing system in which an image processing apparatus and a plurality of image forming apparatuses are connected via a serial bus, the image processing apparatus comprises:

channel control means for ensuring a plurality of channels for isochronous transfer through said serial bus and assigning the channels to a plurality of types of image data on the basis of device information of said plurality of image forming apparatuses; and first communication means for isochronously transferring the plurality of types of image data to said plurality of image forming apparatuses using the assigned channels, and each of said plurality of image forming apparatuses comprises:

second communication means for receiving the plurality of types of image data isochronously transferred using the channels via said serial bus; and image formation means for forming an image on a recording medium on the basis of the received plurality of types of image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A and 9B are views showing examples of a channel assignment table of the first embodiment;

FIG. 24 is a flow chart showing the main routine of the printer of the second embodiment;

FIG. 30 is a flow chart showing the main routine of a printer of the third embodiment;

DESCRIPTION OF THE PREFERRED EMBODIMENTS

Preferred embodiments of the present invention will now be described in detail in accordance with the accompanying drawings.

First Embodiment

<System Arrangement>

Figure 1:
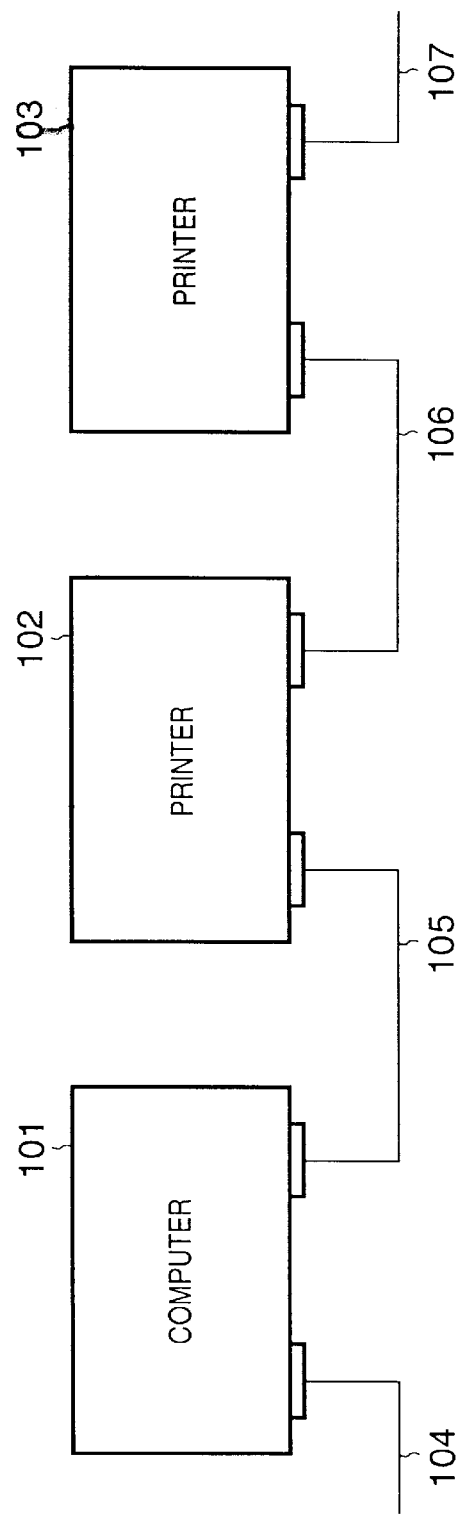
FIG. 1 is a block diagram showing the overall arrangement of an image processing system according to the first embodiment of the present invention.

FIG. 1 is a block diagram showing the overall arrangement of an image processing system according to the first embodiment. Referring to FIG. 1, a computer 101 normally used by a user is connected to a printer 102 as an image forming apparatus via a high-speed serial communication I/F 105 and also to a printer 103 as another image forming apparatus via a high-speed serial communication I/F 106. The computer 101 and printer 103 are also connected to other devices (not shown) via high-speed serial communication I/Fs 104 and 107.

The printers 102 and 103 implement the printing function of the computer 101. More specifically, to print a document or image created by the computer 101, data for image formation is received from the computer 101 by the printer 102 through the high-speed serial communication I/F 105 or the printer 103 through the high-speed serial communication I/Fs 105 and 106. The printer processes the image data as needed and then prints it on printing paper.

The high-speed serial communication I/Fs 104, 105, 106, and 107 are communication I/Fs such as a USB or IEEE 1394 bus having a mechanism such as an isochronous transfer mode for ensuring a data transfer rate and generally have a high-speed serial bus structure.

<Detailed Arrangement of Computer 101>

The arrangement of the computer 101 will be described below in detail with reference to the functional block diagram shown in FIG. 2.

Figure 2:
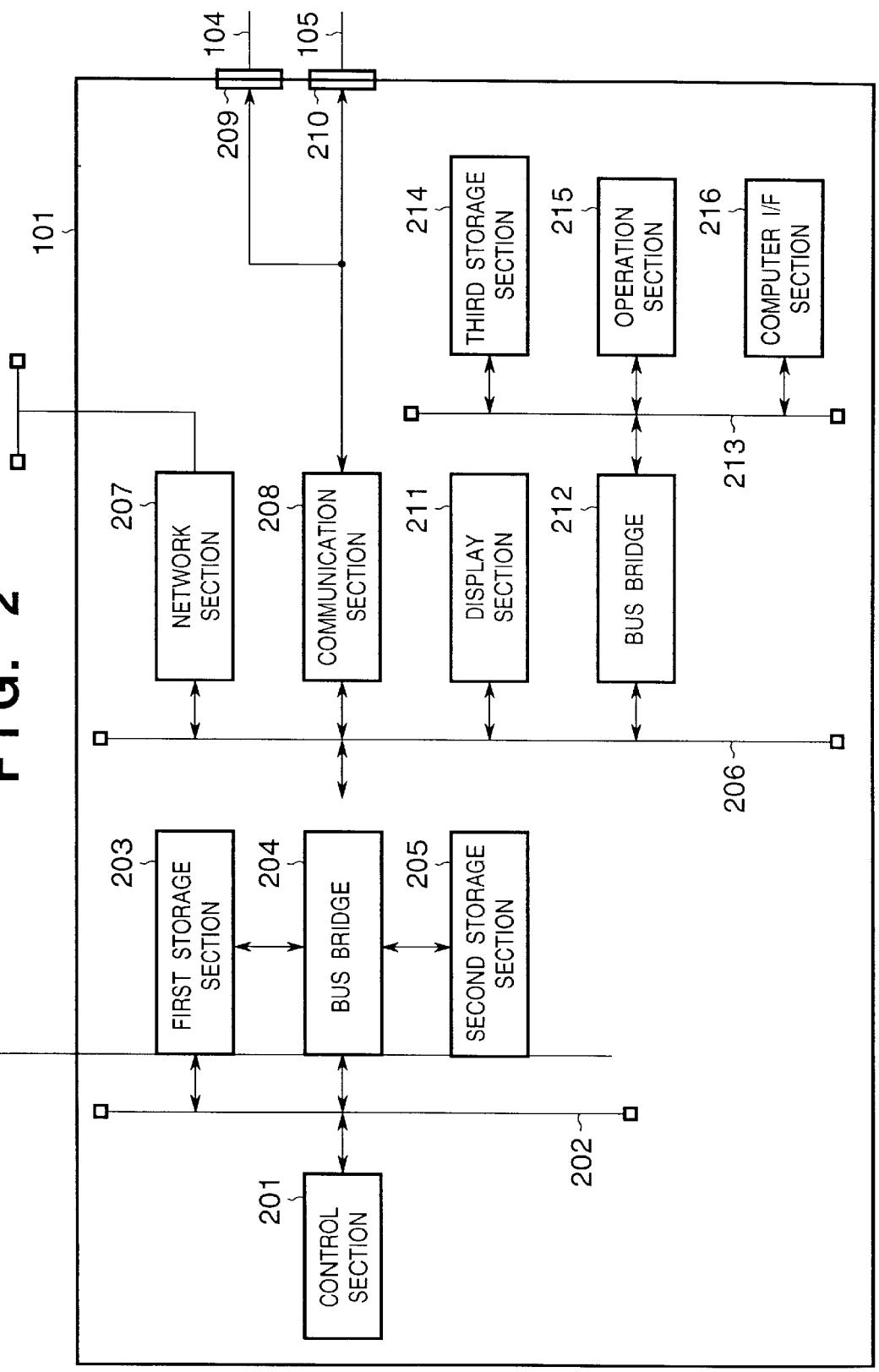
FIG. 2 is a block diagram showing the functional arrangement of a computer of the first embodiment.

Referring to FIG. 2, a control section 201 controls the entire computer 101. A CPU bus 202 connects the control section 201 to a first storage section 203 and bus bridge 204 and transfers data processed by the control section 201 at a high speed. The first storage section 203 is a cache memory used for operation of the control section 201. The first storage section 203 can be accessed by the control section 201 at a high speed and temporarily stores data used by the control section 201 for calculation. A high-speed SRAM or the like is generally used as the first storage section 203.

The bus bridge 204 connects the CPU bus 202 to a high-speed bus 206 (to be described later) and absorbs any processing speed difference between the buses. The bus bridge 204 enables data communication between units connected to the high-speed bus 206 and the control section 201 operating at a higher speed. The bus bridge 204 also has a memory controller function and performs a series of memory management operations of, e.g., reading out, at a predetermined time, data temporarily stored in the first storage section 203 by the control section 201, and writing the data in a second storage section 205, or reading out data from the second storage section 205 and writing it in the first storage section 203 in accordance with a request from the control section 201. The second storage section 205 is a main memory where the control section 201 executes various applications. A DRAM or the like is generally used as the second storage section 205.

The high-speed bus 206 connects the bus bridge 204, network section 207, high-speed serial communication section 208, display section 211, and bus bridge 212 to transfer data processed by the control section 201 to the units or transfer data between the units at a high speed (DMA transfer). A PCI bus or the like is generally used as the high-speed bus 206. The network section 207 connects the computer 101 to a network (not shown) for data communication with the connected network. Typical examples of the network to be connected are Ethernet and token ring.

The high-speed serial communication section 208 has a mechanism such as an isochronous transfer mode for ensuring a data transfer rate and can communicate a large amount of image data at a high speed (within a predetermined time). The isochronous transfer mode is executed by ensuring channels with a guaranteed data transfer cycle and broadcasting data packets using the channels. The data transfer rate can also be increased by ensuring a number of channels necessary to do so. The high-speed serial communication section 208 also has a mechanism such as an asynchronous transfer mode for asynchronous transfer in a one-to-one correspondence and can appropriately perform predetermined communication with the printer 102. Data is transferred using packets. Generally, IEEE 1394 or the like is used as the high-speed serial communication section 208.

High-speed serial communication connectors 209 and 210 are connected to other devices through the high-speed serial communication I/Fs 104 and 105, respectively. As described above, according to this embodiment, the computer 101 and printer 103 are connected via the high-speed serial communication I/F 105.

The display section 211 has a liquid crystal display device, loudspeaker, and the like to display necessary characters, images, and audio data in accordance with program execution by the control section 201. The bus bridge 212 connects the high-speed bus 206 to a low-speed bus 213 (to be described later) and absorbs any processing speed difference between the buses. The bus bridge 212 enables data exchange between the units operating at a high speed and units connected to the low-speed bus 213 and operating at a low speed.

The low-speed bus 213 connects a third storage section 214, operation section 215, and computer I/F 216. The low-speed bus 213 has a bus structure with a lower transfer rate than that of the above-described high-speed bus 206 to connect units having a relatively low processing speed. An ISA bus or the like is generally used as the low-speed bus 213.

The third storage section 214 stores a plurality of applications used for operation of the control section 201. Generally, the third storage section 214 is constructed by a large-capacity hard disk and managed by the control section 201. The operation section 215 has a keyboard, microphone, and the like and inputs various setting instructions necessary for operation of the computer 101 and/or various operation instructions to the control section 201. The low-speed computer I/F 216 connects the computer 101 to a peripheral device. Generally, an RS-232C for serial communication or a centronics I/F for parallel communication is used as the computer I/F 216.

<Detailed Arrangement of Printer 102>

The arrangements of the printers 102 and 103 will be described in detail with reference to the functional block diagrams shown in FIGS. 3 and 4.

The arrangement of the printer 102 will be described first with reference to FIG. 3.

Figure 3:
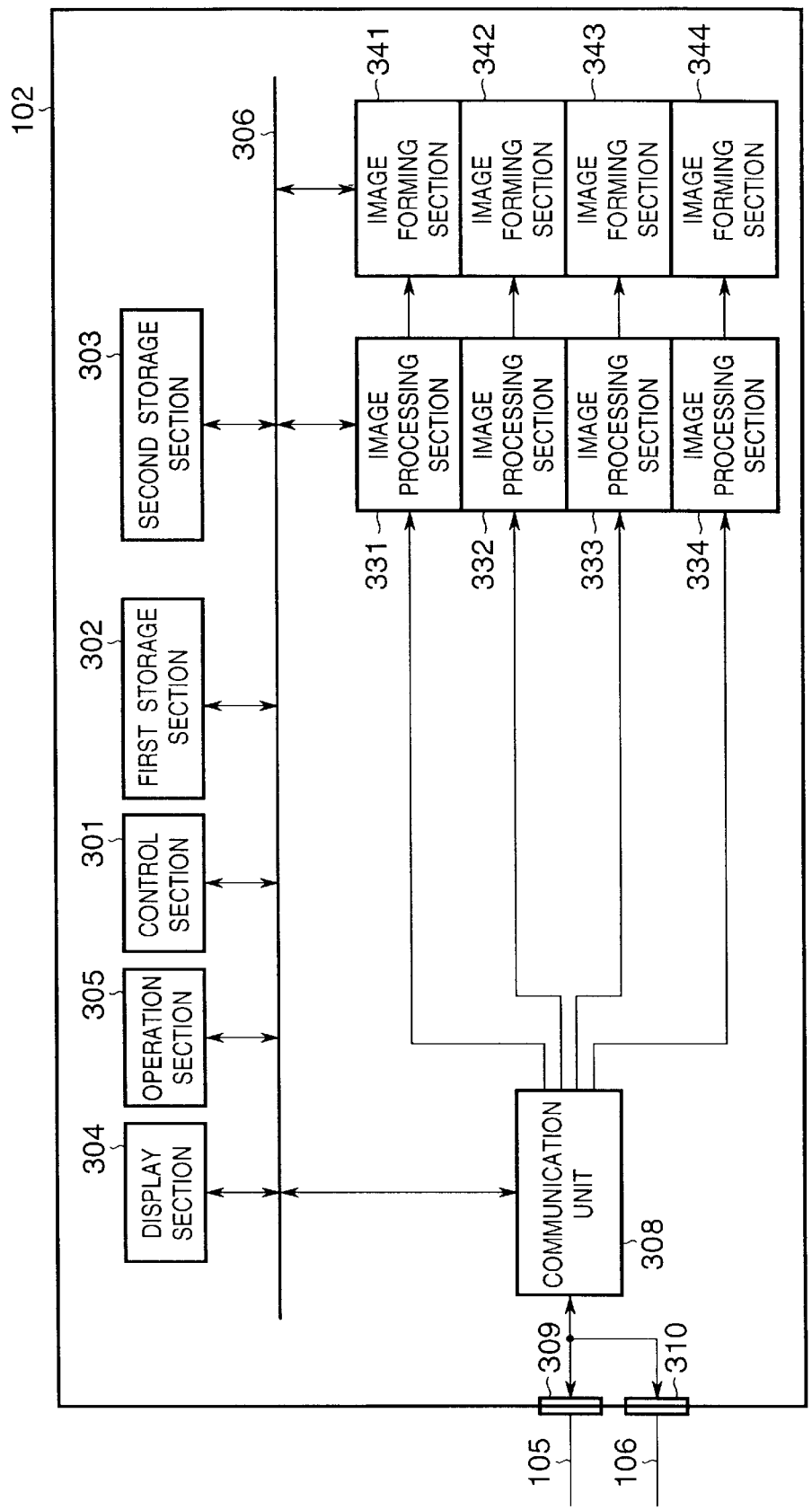
FIG. 3 is a block diagram showing the functional arrangement of a printer of the first embodiment.

Referring to FIG. 3, a control section 301 controls the entire printer 102 and is operated by a real-time OS. A first storage section 302 serving as a work memory for operation of the control section 301 is accessed by the control section 301 at a high speed. A second storage section 303 stores a plurality of applications for operation of the control section 301. The second storage section 303 is generally constructed by a large-capacity hard disk and managed by the control section 301.

A display section 304 has a liquid crystal display section. An operation section 305 has a touch panel input device bonded to the liquid crystal display section and a plurality of hard keys. A signal input by the touch panel or hard keys is transmitted to the control section 301 through a CPU bus 306, so image data read out from the first storage section 302 and/or second storage section 303 and sent by the control section 301 is displayed on the liquid crystal display section. The liquid crystal display section also displays functions of the operation of the printer and image data associated with the functions. The operation section 305 may have an input means based on a digitizer or pen recognition mechanism for pen input, a microphone or voice recognition mechanism for voice input, or an image sensing device or image recognition mechanism for image input.

The CPU bus 306 is connected to the control section 301, first storage section 302, second storage section 303, and various functional units to transfer data processed by the control section 301 to the functional units or transfer data between the functional units at a high speed (DMA transfer).

A high-speed serial communication section 308 has a mechanism such as an isochronous transfer mode for ensuring a data transfer rate and can communicate a large amount of image data at a high speed (within a predetermined time). The isochronous transfer mode is executed by ensuring channels with a guaranteed data transfer cycle and broadcasting data packets using the channels. The data transfer rate can also be increased by ensuring a number of channels necessary to do so. The high-speed serial communication section 308 also has a mechanism such as an asynchronous transfer mode for asynchronous transfer in a one-to-one correspondence and can appropriately perform predetermined communication with the computer 101. Data is transferred using packets. Generally, IEEE 1394 or the like is used as the high-speed serial communication section 308.

High-speed serial communication connectors 309 and 310 connect the printer 102 to the computer 101 and printer 103 through the high-speed serial communication I/Fs 105 and 106, respectively.

Image processing sections 331, 332, 333, and 334 perform various image processing operations including smoothing processing, edge processing, and color correction for image data input from the high-speed serial communication section 308 in accordance with a processing instruction from the control section 301. Each of the image processing sections 331, 332, 333, and 334 has a timing adjustment means such as a FIFO for adjusting time fluctuation in color image data input from the high-speed serial communication section 308. This means makes it possible to finely adjust the image data reception timing of each color within a predetermined range.

Image forming sections 341, 342, 343, and 344 form visible image data on printing paper in units of colors on the basis of image data received from the image processing sections 331, 332, 333, and 334, respectively. To form an image, for example, electrophotography for forming a latent image on a photosensitive drum using a laser beam or LED beam and forming an image on printing paper can be used.

The arrangement of the printer 103 will be described next with reference to FIG. 4. The arrangement shown in FIG. 4 is substantially the same as that shown in FIG. 3, in which reference numerals corresponding to those in FIG. 3 denote like elements in FIG. 4, and a detailed description thereof will be omitted.

Figure 4:
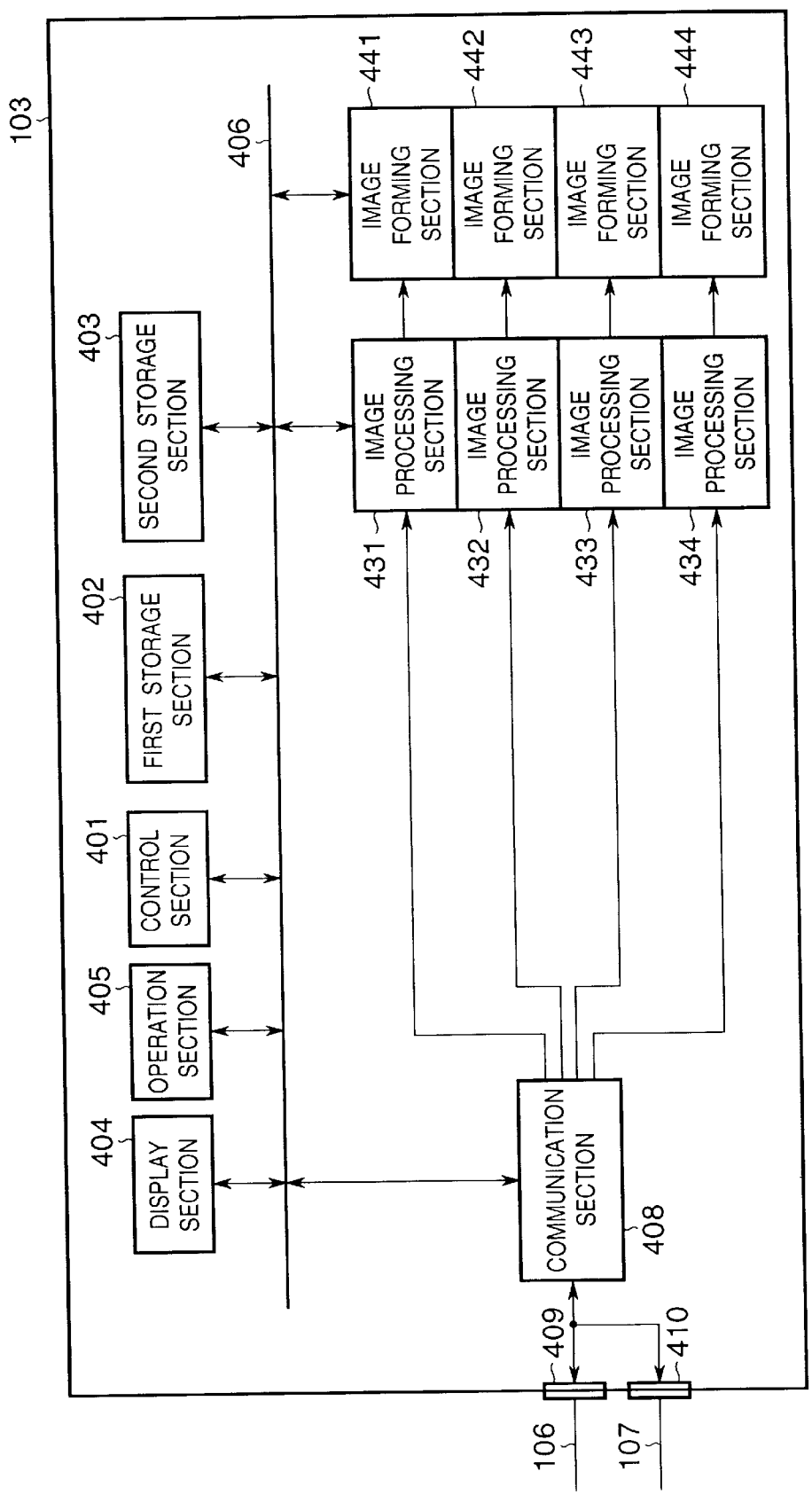
FIG. 4 is a block diagram showing the functional arrangement of another printer of the first embodiment.

Referring to FIG. 4, high-speed serial communication connectors 409 and 410 connect the printer 103 to the printer 102 and another device through the high-speed serial communication I/Fs 106 and 107, respectively.

Figure 5:
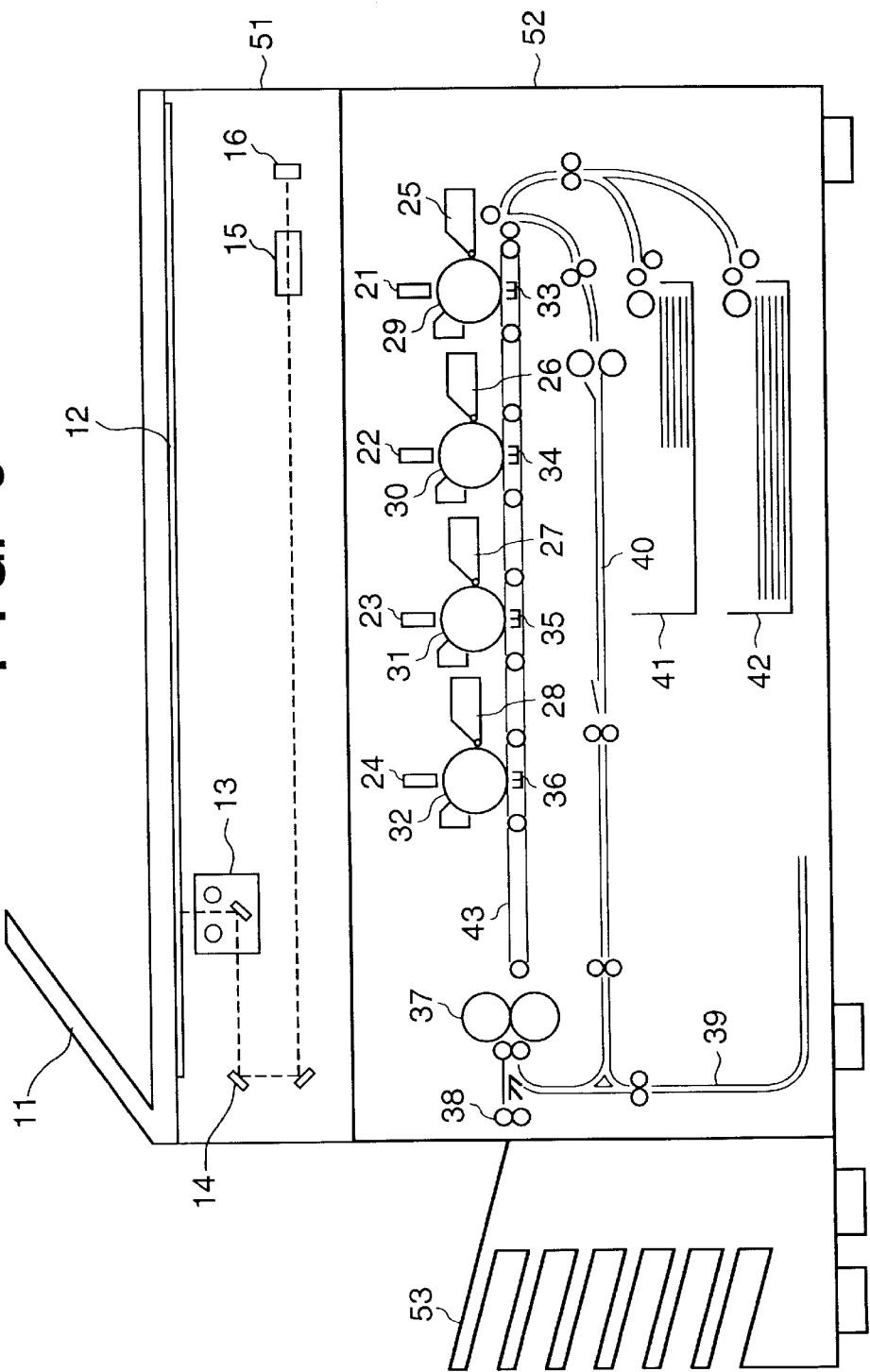
FIG. 5 is a cross-sectional view showing the structure of the printer of the first embodiment.

The mechanisms of the printers 102 and 103 will be described next with reference to FIG. 5. The printers 102 and 103 have substantially the same mechanism, and only the mechanism of the printer 102 will be described below.

The printer 102 is roughly divided into a scanner unit 51 for inputting an image signal and a printer unit 52 for printing and outputting the image signal.

In the scanner unit 51, an original feeder 11 sequentially feeds originals one by one from the final page onto an original table glass 12, and after the original read operation is ended, delivers the original on the original table glass 12. When an original is conveyed onto the original table glass 12, a lamp in the scanning section 13 is turned on, and the scanning section 13 starts moving to expose and scan the original. Reflected light from the original is guided to an image sensing element 16 by a plurality of mirrors 14 and a lens 15. The image of the scanned original is read by the image sensing element 16.

Image data output from the image sensing element 16 is subjected to predetermined processing and transferred to the printer unit 52 through a scanner I/F and printer I/F (constructed by a video I/F and high-speed serial communication I/F, respectively, though neither are shown)

In the printer unit 52, light-emitting sections 21, 22, 23, and 24 emit laser beams or LED beams in accordance with the input image data of colors (Y, M, C, K). Photosensitive drums 29, 30, 31, and 32 are irradiated with the laser beams or LED beams, so latent images corresponding to the laser beams or LED beams are formed on the photosensitive drums 29, 30, 31, and 32, respectively. Developing agents are attracted onto the latent image portions on the photosensitive drums 29, 30, 31, and 32 by developing units 25, 26, 27, and 28, respectively. At a timing synchronous with the start of irradiation of the laser beams or LED beams, a printing paper sheet is fed from a paper feed cassette 41 or paper feed cassette 42 and sequentially conveyed to transfer sections 33, 34, 35, and 36. The developing agents attracted on the photosensitive drums 29, 30, 31, and 32 are transferred to the printing paper sheet to superpose on each other. The photosensitive drums 29, 30, 31, and 32 and peripheral structures, which form the images of Y, M, C, and K, correspond to the image forming sections 341, 342, 343, and 344 shown in FIG. 3, respectively.

The printing paper sheet having the developing agents is conveyed to a fixing section 37. The fixing section 37 fixes the developing agents to the printing paper sheet by heat and pressure. The printing paper that has passed through the fixing section 37 is delivered by delivery rollers 38. A sorter 43 sorts the delivered printing paper sheets and stores them in bins. In a double-side print mode, the printing paper sheet that has passed through the fixing section 37 is temporarily conveyed to a convey switch 39. After this, the direction of rotation of the feed rollers is reversed to guide the printing paper sheet from the convey switch 39 to a re-feed convey path 40. In a multiple print mode, the printing paper sheet is guided to the re-feed convey path 40 without being conveyed to the delivery rollers 38. The printing paper sheet guided to the re-feed convey path 40 is fed at the above-described timing and sequentially conveyed to the transfer sections 33, 34, 35, and 36.

The print operation in the image processing system of this embodiment will be described below with reference to FIGS. 6 to 15.

<Print Operation in Computer 101>

Figure 6:
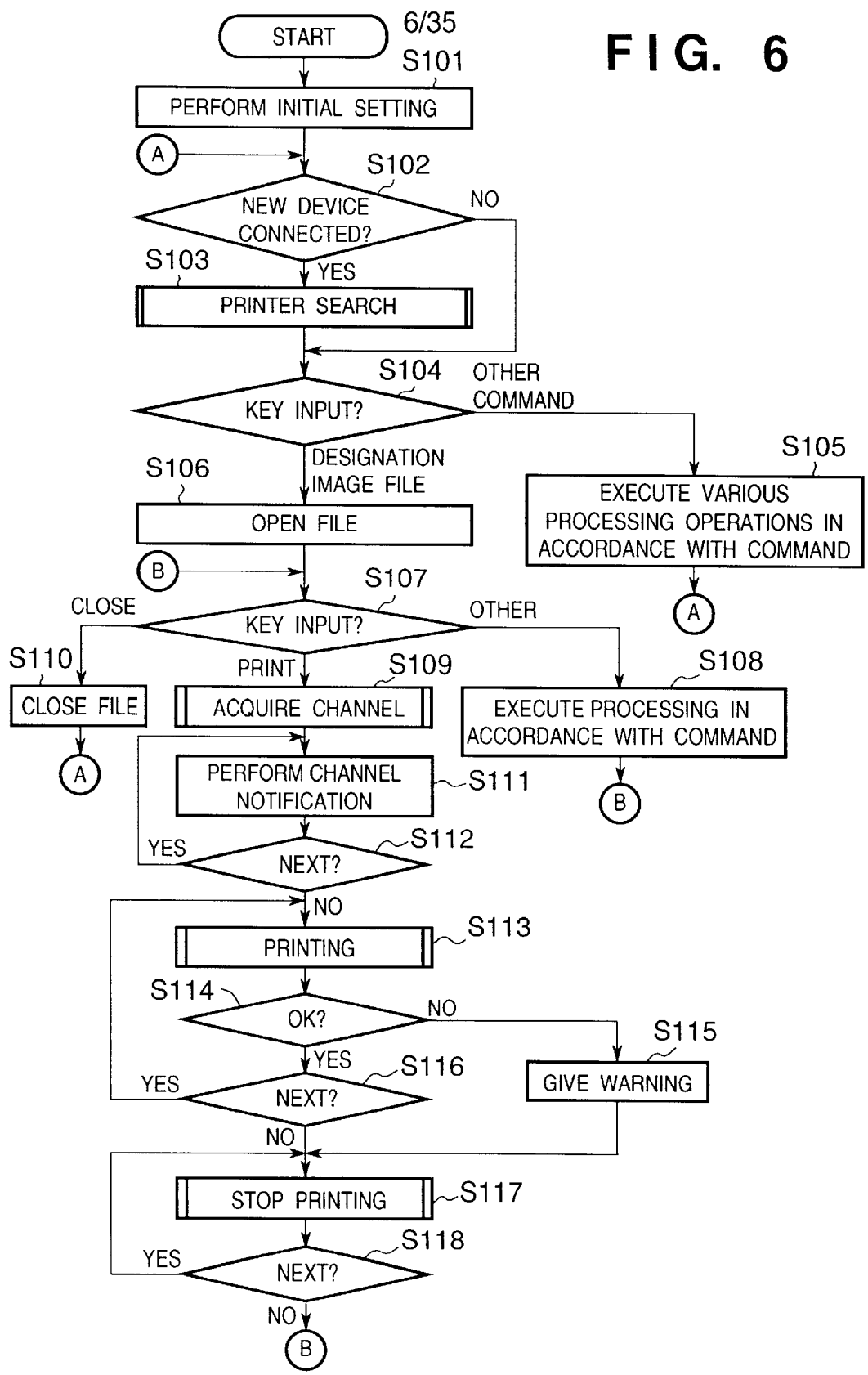
FIG. 6 is a flowchart showing the main routine of the computer of the first embodiment.

First, the print operation in the computer 101 will be described. FIG. 6 is a flow chart showing the main routine in the print processing of the computer of this embodiment.

In step S101, when the computer 101 is powered on, the control section 201 initializes flags, registers, control variables, and the like. The control section 201 temporarily loads a control program such as an OS stored in a partial area of the second storage section 205 to the first storage section 203 in units of predetermined amounts through the bus bridge 204 having a memory controller function and then executes the control program. The control section 201 initializes various sections of the computer 101. In step S102, the control section 201 determines whether new devices including the computer 101 itself are connected to the high-speed serial communication I/Fs 104, 105, 106, and 107. If YES in step S102, the flow advances to step S103 to perform printer search processing. Details of printer search processing in step S103 will be described later with reference to the flow chart in FIG. 7.

When it is determined in step S104 that the input by the keys, touch panel, digitizer, or the like of the operation section 215 is not a command input for designating an image file to be printed and opening it but a command input for executing other processing, the flow advances to step S105, and the control section 201 executes various processing operations corresponding to the input instruction. After execution of various processing operations, the flow returns to step S102. If it is determined in step S104 that the input designates an image file, the flow advances to step S106. The control section 201 loads the designated image file to the second storage section 205 from the third storage section 214, through the network section 207, or through the high-speed serial communication I/F 105.

When it is determined in step S107 that the input by the operation section 215 is not a command input for printing the opened image file or a command input for closing the opened image file but a command input for executing other processing, the flow advances to step S108, and the control section 201 executes various processing operations corresponding to the input. After that, the flow returns to step S107.

If it is determined in step S107 that the input directs closing the opened image file, the flow advances to step S110, and the control section 201 closes the image file loaded in the second storage section 205 to release an unnecessary area of the second storage section 205. When the contents of the image file need be changed and stored, the image file is stored as a new image file in the third storage section 214, through the network section 207, or through the high-speed serial communication I/F 105.

If it is determined in step S107 that the input directs printing the opened image file, the flow advances to step S109. The control section 201 acquires, via the high-speed serial communication section 208, a necessary number of channels with a guaranteed data transfer cycle such as an isochronous transfer mode on the high-speed serial communication I/F 105. Details of channel acquisition processing in step S109 will be described later with reference to the flow chart in FIG. 8.

In steps S111 and S112, the printers 102 and 103 whose connections are detected in printer search processing in step S103 are sequentially notified of a number or numbers identifying one or a plurality of acquired channels using asynchronous transfer such as an asynchronous transfer mode in a one-to-one correspondence through the high-speed serial communication section 208, high-speed serial communication connector 210, and high-speed serial communication I/F 105.

In step S113, the control section 201 transfers the image data to the printer 102 using one or a plurality of channels of which the printer 102 is notified, and the printer 102 prints the image data. Details of print processing in step S113 will be described later with reference to the flow charts in FIGS. 10A and 10B.

After the end of print processing in step S113, if the print processing has a problem in step S114, the control section 201 gives predetermined warning based on an image, voice, or text by the display section 211 in step S115. After that, the control section 201 sequentially sends a print stop command to the printers 102 and 103 in steps S117 and S118 to stop the print operation. After the print stop command is sent, the flow returns to step S107.

If the print processing has no problem in step S114, and it is determined in step S116 that printing is to continue, the flow returns to step S113 to repeat the series of operations. If it is determined in step S116 that printing is not to continue, a print stop command is sequentially sent to the printers 102 and 103 in steps S117 and S118 to stop the print operation. After the print stop command is sent, the flow returns to step S107.

<<Printer Search Processing>>

Figure 7:
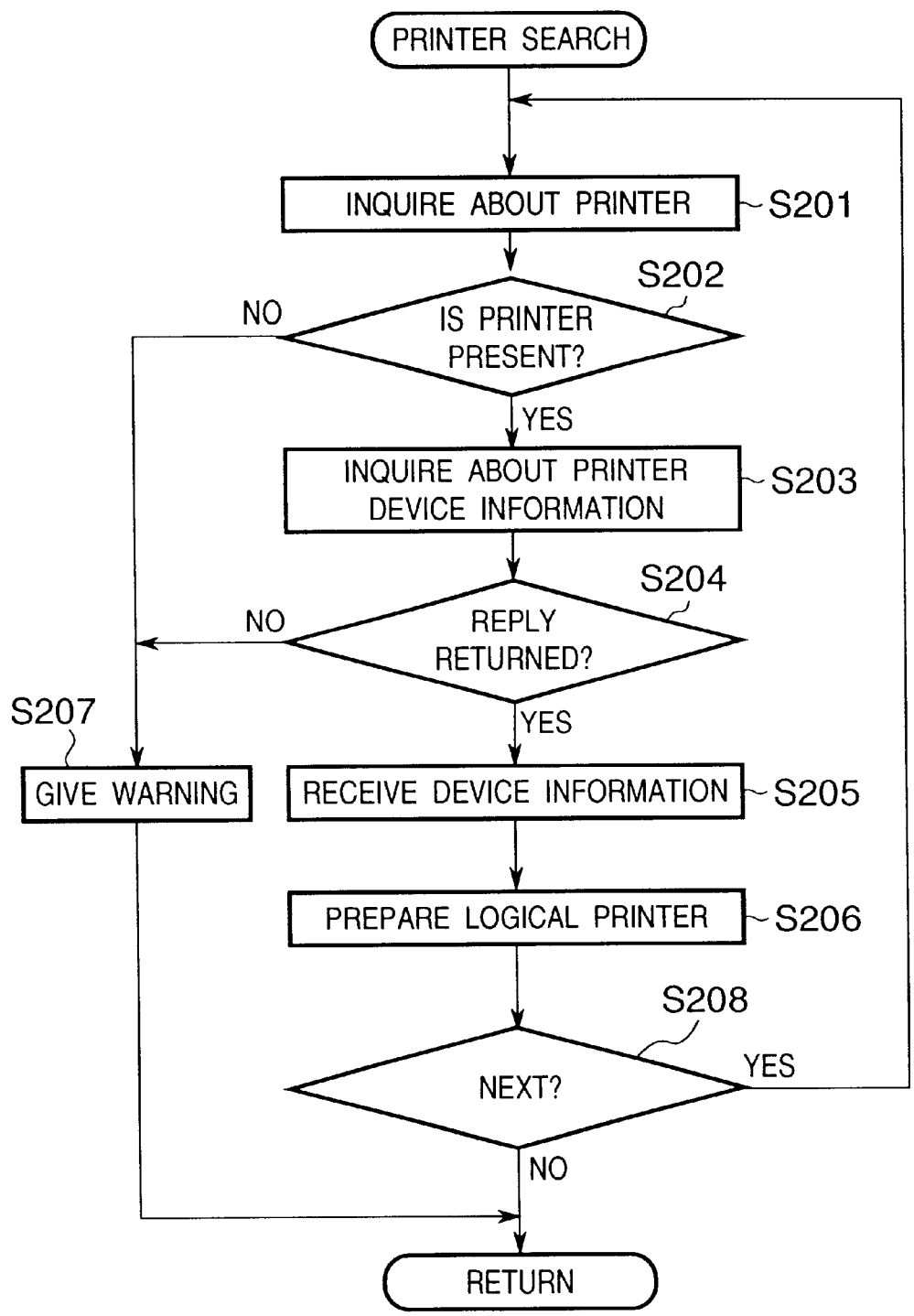
FIG. 7 is a flow chart showing the printer search routine of the computer of the first embodiment.

FIG. 7 is a flow chart showing the printer search processing in step S103 in FIG. 6. First, in step S201, the control section 201 inquires through the high-speed serial communication section 208 whether the devices newly connected to the high-speed serial communication I/Fs 104 105, 106, and 107 are image forming apparatuses such as printers, i.e., devices capable of printing transferred image data. If it is determined in step S202 that a desired image forming apparatus, e.g., the printer 102 or 103 is present on the high-speed serial communication I/F 104, 105, 106, or 107, the control section 201 subsequently inquires about printer device information in step S203. If printer device information is returned from the printer 102 or 103 in step S204, the returned device information is stored in a partial area of the second storage section 205 in step S205. In step S206, the control section 201 prepares a logical printer corresponding to the printer 102 or 103 used in the OS to transfer and print image data.

Until all devices newly connected to the high-speed serial communication I/Fs 104, 105, 106, and 107 are searched in step S208, the flow returns to step S201, and the control section 201 repeats the series of printer search processing operations.

If it is determined in step S202 that a desired printer is not present on the high-speed serial communication I/F 104, 105, 106, or 107, or if no printer device information is returned in step S204, the flow advances to step S207, and the control section 201 gives predetermined warning based on an image, voice, or text by the display section 211 and ends printer search processing.

<<Channel Acquisition Processing>>

Figure 8:
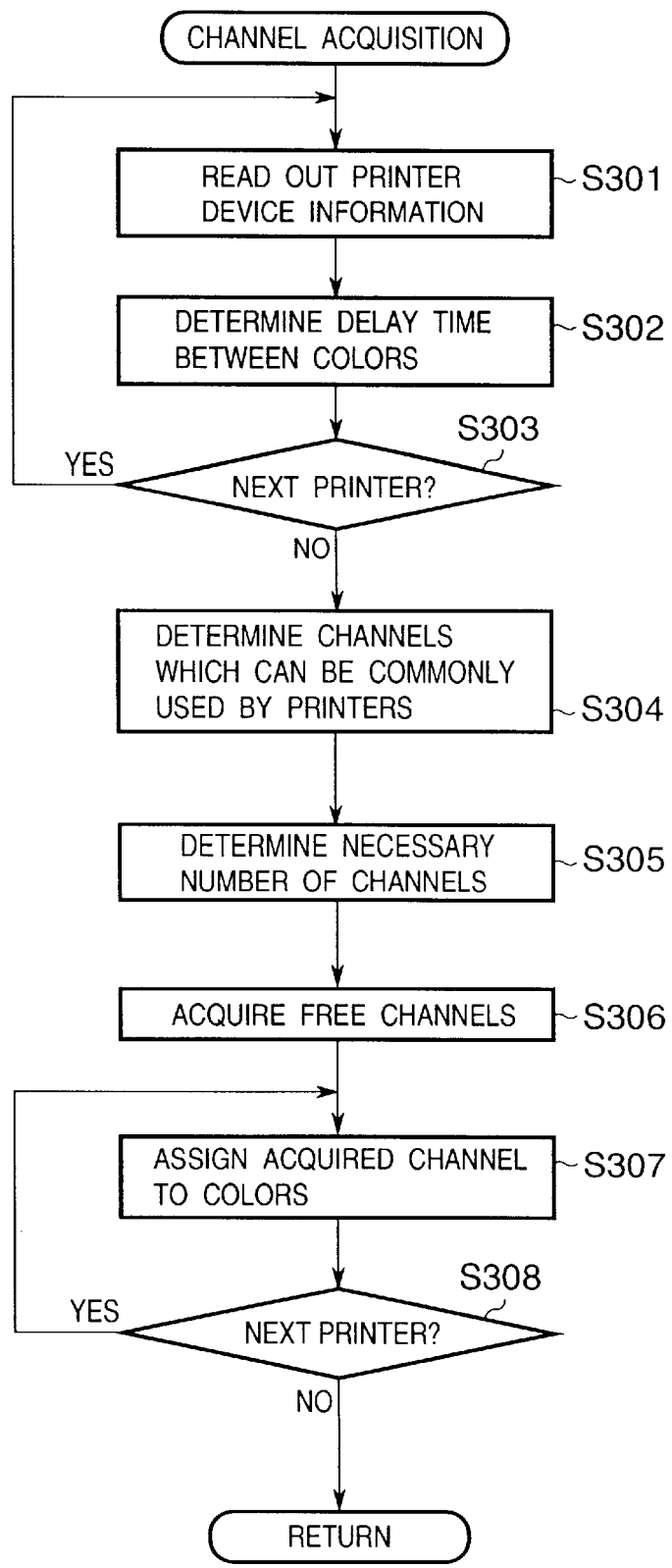
FIG. 8 is a flow chart showing the channel acquisition routine of the computer of the first embodiment.

FIG. 8 is a flow chart showing channel acquisition processing in step S109 of FIG. 6. Referring to FIG. 8, first in step S301, the control section 201 reads out printer device information stored in a partial area of the second storage section 205 in step S205 of FIG. 7 (printer search processing). The printer device information contains the number of photosensitive drums, types of colors used for image formation, distances between the photosensitive drums, image formation speed, misregistration amount between the photosensitive drums, and the like.

In step S302, the data transfer start delay time for each color for image data transfer is determined on the basis of the readout printer device information. When the data transfer start delay time for each color is determined for all desired image forming apparatuses (e.g., the printers 102 and 103) in step S303, the flow advances to step S304.

In step S304, the control section 201 determines on the basis of the data transfer start delay time for each color, which is determined in steps S302 and S303, whether a channel commonly usable for image data transfer to the printers is present. The intervals between the plurality of photosensitive drums do not match between the printers within a predetermined range because printers of different types have different printing paper convey speeds, different photosensitive drum structures, and different misregistration amounts between the drums. For this reason, the data transfer start delay time for each color differs in units of printers. Hence, the channels for the respective colors cannot be commonly used for all printers, and channels to be used must be individually prepared in units of printers. In step S304, when a plurality of printers have the same data transfer start delay time for a common color, it is determined that a channel commonly usable is present.

In step S305, the control section 201 determines the total number of necessary channels including both the channels commonly usable for the printers and the channels individually used by the printers on the basis of the a determination result in step S304. In step S306, free channels of the isochronous transfer mode are acquired.

In step S307, the control section 201 assigns the channel numbers of the isochronous transfer mode, which are acquired in step S306 on the basis of the determination results in steps S304 and S305, to the colors of the desired printer, and stores the result in the second storage section 205 in the form of a channel assignment table.

When it is determined in step S308 that assignment of the acquired channels to all the desired image forming apparatuses (e.g., the printers 102 and 103) and storage of the channel assignment table are to end, the channel acquisition processing is ended.

FIGS. 9A and 9B show examples of the channel assignment table in which the channel numbers of the isochronous transfer mode are assigned to the respective colors and stored in step S307.

According to the example shown in FIG. 9A, the printer 102 transfers Y (yellow), M (magenta), and C (cyan) image data using channel 1, channel 2, and channel 3, respectively, and K1 (black) image data using channel 4. The printer 103 transfers Y, M, and C image data using channel 1, channel 2, and channel 3 which are common to the printer 102, and transfers K2 image data using channel 5. More specifically, the printers 102 and 103 use common channels (1 to 3) for the Y, M, and C image data because the data transfer start delay times are the same, and individual channels (4 and 5) for the K image data because the data transfer start delay times are different. A total of five channels are used to transfer the image data.

To individually transfer color image data in each printer, eight channels are required in the isochronous transfer mode. However, according to the example shown in FIG. 9A, all image data can be transferred using only five channels. Hence, the excess three channels can be effectively used for another application purpose.

According to the example shown in FIG. 9B, the printer 102 transfers Y image data using channel 1 and M1, C1, and K1 image data using channel 2, channel 4, and channel 6, respectively. The printer 103 transfers Y image data using channel 1 common to the printer 102 and M2, C2, and K2 image data using channel 3, channel 5, and channel 7, respectively. More specifically, the printers 102 and 103 use common channel (1) for only the Y image data as the first data but individual channels (2 to 7) for the M, C, and K image data because color components with the same data transfer start delay time are not present. A total of seven channels are used to transfer the image data.

To individually transfer color image data in each printer, eight channels are required in the isochronous transfer mode. However, according to the example shown in FIG. 9B as well, all image data can be transferred using only seven channels. Hence, the extra channel can be effectively used for another application purpose.

The device names, channel number names, and image data names in the channel assignment tables shown in FIGS. 9A and 9B are merely examples for the descriptive convenience. Other names may be used, and more devices may be used.

A description will be made below assuming that the channel assignment table shown in FIG. 9A is prepared in step S308.

<<Print Processing>>

Figure 10A:
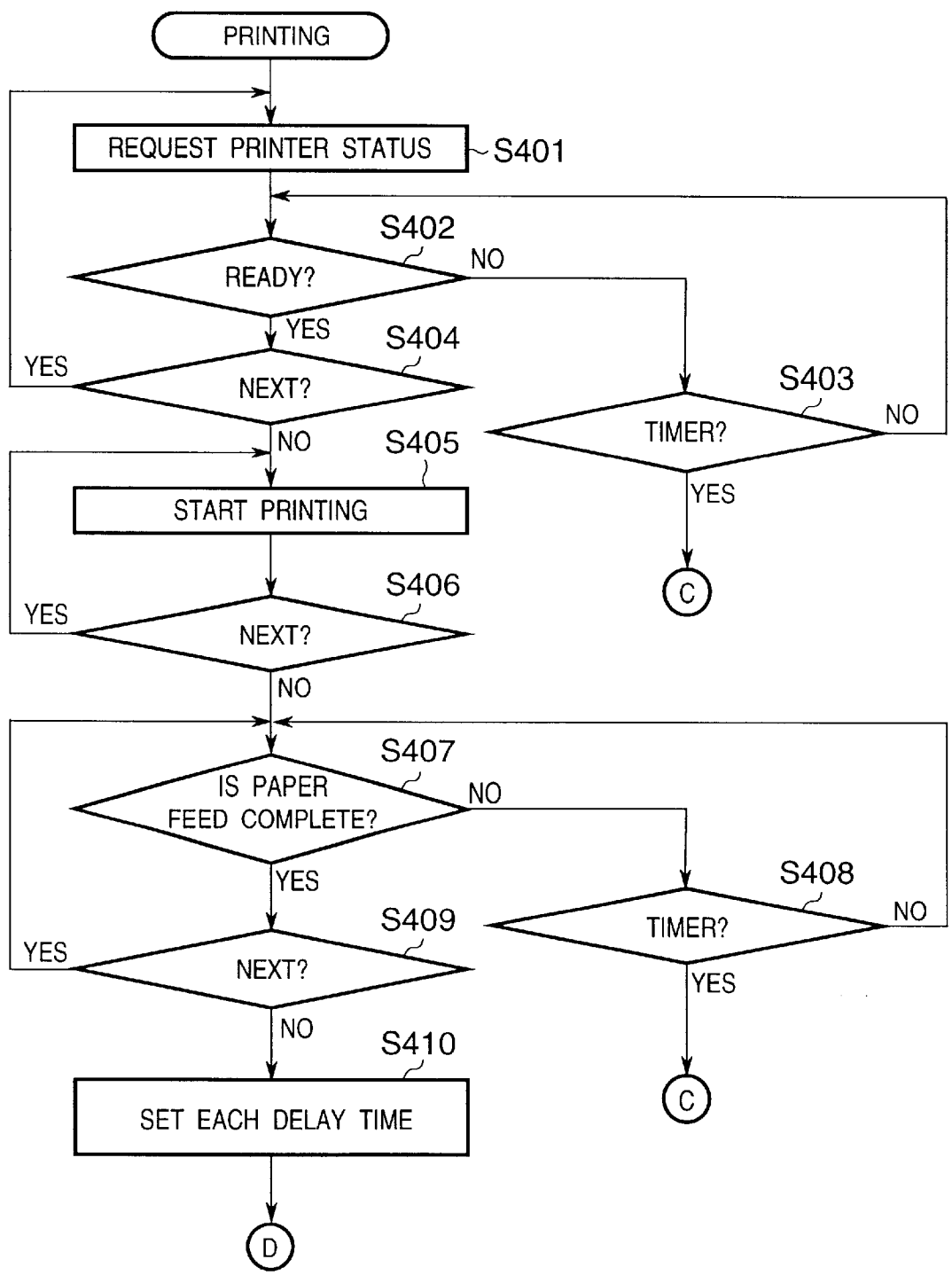
FIGS. 10A and 10B are flow charts showing the print routine of the computer of the first embodiment.
Figure 10B:
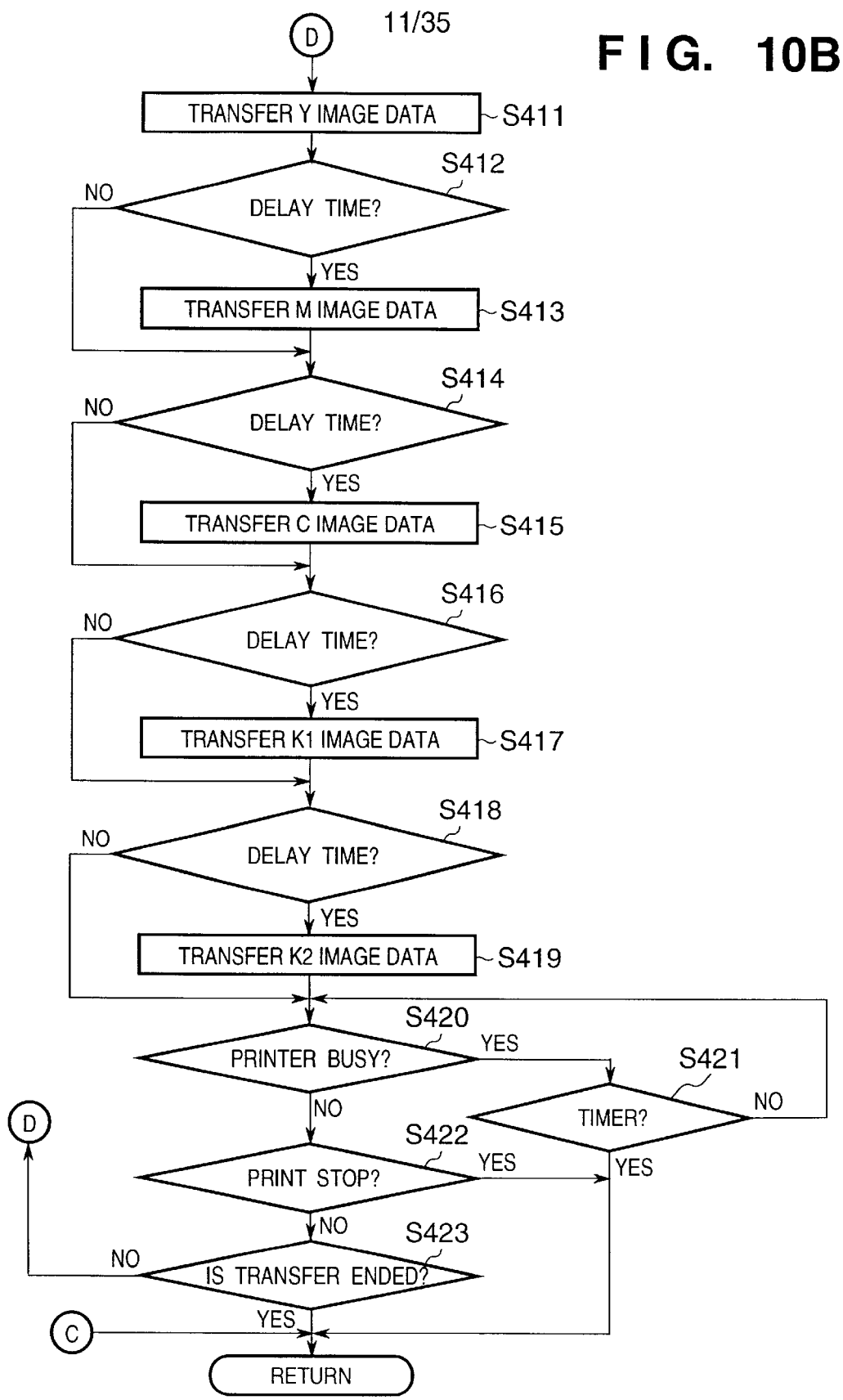

FIGS. 10A and 10B are flow charts showing details of print processing in step S113 of FIG. 6. Referring to FIGS. 10A and 10B, in step S401 the control section 201 requests, by the high-speed serial communication section 208 through the high-speed serial communication I/Fs 104, 105, 106, and 107, the first desired image forming apparatus, e.g., the printer 102 to send its printer status using the asynchronous transfer mode. If the status "READY" representing that preparation is complete is returned from the printer 102 within a predetermined time (S403) in step S402, processing in steps S401 to 403 is performed for the next desired image forming apparatus, e.g., the printer 103 (S404). If the status "READY" is not returned within the predetermined time instep S403, the print processing routine is ended.

When the status "READY" is returned from all desired image forming apparatuses (S404), the control section 201 sequentially sends a print start instruction to all the desired image forming apparatuses (e.g., the printers 102 and 103) using the asynchronous transfer mode (S405 and S406).

When a paper feed end notification is received from all the desired image forming apparatuses (the printers 102 and 103) using the asynchronous transfer mode within a predetermined time (S408) (S407 and S409), the control section 201 sets data transfer start delay times to transfer image data at timings for correcting the drum intervals in the image forming apparatuses (S410). More specifically, data transfer start delay times are set in units of channels in accordance with the contents of the channel assignment table assigned in step S307 of FIG. 8 (channel acquisition processing). According to the example of the assignment table shown in FIG. 9A, the data transfer start delay times are set in units of channels for Y, M, C, K1, and K2 which are acquired for the printers 102 and 103.

The delay times set in step S410 are obtained by calculation by the control section 201 on the basis of the printer device information unique to the printers 102 and 103, which are received in step S205 of FIG. 7 (printer search processing), and the data transfer rate of the isochronous transfer mode. As described above, the printer device information contains the number of photosensitive drums, types of colors used for image formation, distances between the photosensitive drums, image formation speed, misregistration amount between the photosensitive drums, and the like.

As a characteristic feature of this embodiment, to correct print misregistration due to the intervals between the plurality of drums in the image forming apparatuses, i.e., the relationship between the time lag of sequential conveyance of the printing paper sheet to the photosensitive drums and the transfer time of the image data of the respective colors, in step S410 the data transfer start delay times are set, and also, the relationship between the channels of the isochronous transfer mode and the colors is set in accordance with the contents of the channel assignment table.

The flow advances to step S411. For data transfer with a guaranteed data transfer cycle, the control section 201 starts transferring Y image data to the printers 102 and 103 in the isochronous transfer mode using channel 1 for Y of the plurality of channels for Y, M, C, K1, and K2 acquired for the printers 102 and 103 in step S109.

When the transfer start delay time between the Y photosensitive drum and the M photosensitive drum, which is common to the printers 102 and 103 and is set in step S410, has elapsed in step S412, the control section 201 starts transferring M image data to the printers 102 and 103 in the isochronous transfer mode using channel 2 for M in step S413.

When the transfer start delay time between the Y photosensitive drum and the C photosensitive drum, which is common to the printers 102 and 103 and is set in step S410, has elapsed in step S414, the control section 201 starts transferring C image data to the printers 102 and 103 in the isochronous transfer mode using channel 3 for C in step S415.

When the transfer start delay time between the Y photosensitive drum and the K photosensitive drum of the printer 102, which is set in step S410, has elapsed in step S416, the control section 201 starts transferring K1 image data to the printer 102 in the isochronous transfer mode using channel 4 for K1 in step S417.

When the transfer start delay time between the Y photosensitive drum and the K photosensitive drum of the printer 103, which is set in step S410, has elapsed in step S418, the control section 201 starts transferring K2 image data to the printer 103 in the isochronous transfer mode using channel 5 for K2 in step S419.

When a notification of "printer busy" is received from the printer 102 or 103 using the asynchronous transfer mode during transfer of image data in the isochronous transfer mode in step S420, image data transfer in the isochronous transfer mode is temporarily interrupted if the busy status falls within a predetermined time determined by a timer (not shown) in step S421. If the printer busy state continues even after the elapse of the predetermined time, print processing shown in FIGS. 10A and 10B is ended. When a print stop instruction is input from the operation section 215 in step S422, print processing is ended. If image data transfer is not ended in step S423, the flow returns to step S411 to repeat the series of processing operations. If it is determined in step S423 that image data transfer is to end, print processing is ended.

In the flow charts shown in FIGS. 10A and 10B, print processing based on the contents of the channel assignment table shown in FIG. 9A has been described. Operation based on the contents of another channel assignment table can also be implemented. In this case, the operation corresponding to steps S411 to S419 is changed in accordance with the contents of the channel assignment table.

<Print Operation in Printer 102>

The print operation in the printer 102 will be described below.

Figure 11:
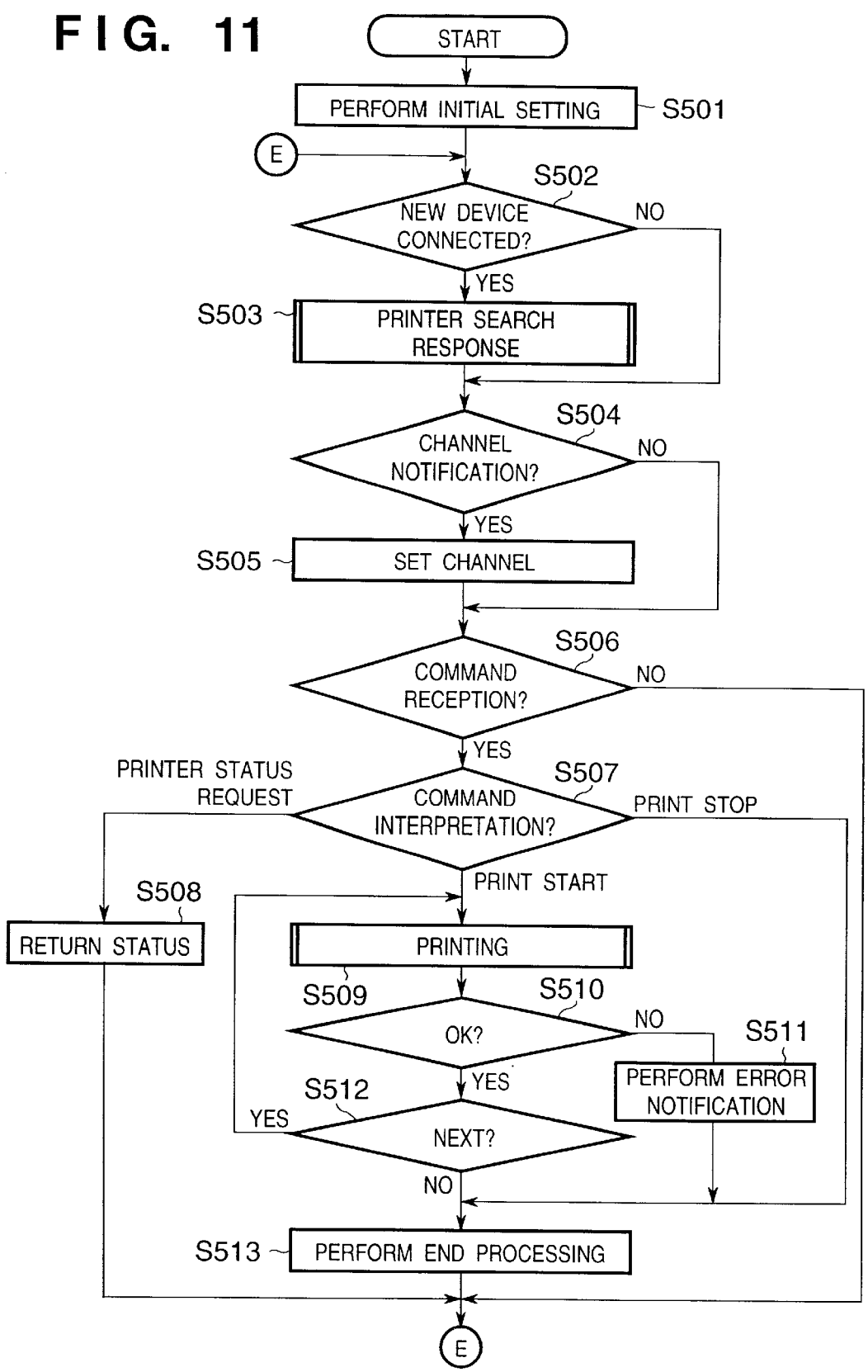
FIG. 11 is a flow chart showing the main routine of the printer of the first embodiment.

FIG. 11 is a flow chart showing the main routine in the printer 102.

In step S501, when the printer 102 is powered on, the control section 301 initializes flags, registers, control variables, and the like, executes a control program such as an OS stored in a partial area of the first storage section 302, and initializes various sections of the printer 102. In step S502, the control section 301 determines whether new devices including the printer 102 are connected to the high-speed serial communication I/Fs 104, 105, 106, and 107. If YES in step S502, the flow advances to step S503 to perform printer search response processing. Details of this printer search response processing will be described later with reference to FIG. 12.

If NO in step S502, the flow advances to step S504. When the printer 102 is notified, by the computer 101 through the high-speed serial communication I/F 105 using the asynchronous transfer mode, of a number or numbers identifying one or a plurality of channels which are acquired by the computer 101 to be used in the isochronous transfer mode (S504), the number or numbers identifying one or a plurality of channels of which the printer 102 is notified are stored in a partial area of the first storage section 302, and predetermined setting operations necessary for receiving image data using the isochronous transfer mode are performed instep S505. If NO instep S504, the flow advances to step S506.

When a command is received from the computer 101 through the high-speed serial communication I/F 105 using the asynchronous transfer mode in step S506, the control section 301 interprets the received command in step S507. If it is a command requesting a printer status, the status is sent to the computer 101 using the asynchronous transfer mode in step S508, and the flow returns to step S502. When it is determined in step S507 that the command requesting the printer to start printing, print processing is performed in step S509. Details of this print processing will be described later with reference to FIG. 13.

If it is determined in step S510 that the print processing in step S509 has a problem, the control section 301 sends an error status to the computer 101 using the asynchronous transfer mode in step S511. After necessary predetermined termination processing is performed in the printer 102 in step S513, the flow returns to step S502. If it is determined in step S509 that the print processing has no problem and in step S512 that printing need be continuously executed, the flow returns to step S509 to repeat the series of operations. If it is determined in step S512 that printing need not be continued, necessary predetermined termination processing is performed in the printer 102 in step S513, and then the flow returns to step S502.

<<Printer Search Response Processing in Printer 102>>

Figure 12:
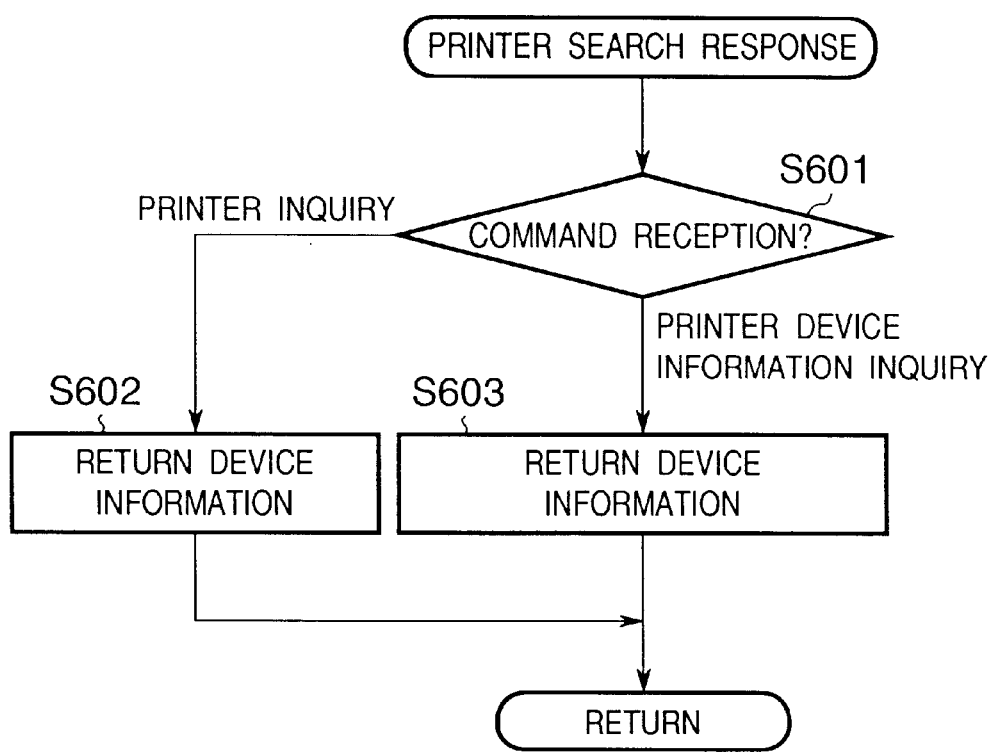
FIG. 12 is a flow chart showing the printer search response routine of the printer of the first embodiment.

FIG. 12 is a flow chart showing printer search response processing in step S503 of FIG. 11. Referring to FIG. 12, first, when a command is received from the computer 101 through the high-speed serial communication I/F 105 using the asynchronous transfer mode in step S601, the control section 301 interprets the received command. If the command is a printer inquiry command inquiring whether image data can be transferred from the computer 101 and printed, an acknowledgement is returned to the computer 101 using the asynchronous transfer mode in step S602, and printer search response processing is ended.

If the command received in step S601 is a command inquiring about printer device information, the printer device information is sent to the computer 101 using the asynchronous transfer mode in step S603, and printer search response processing is ended.

<<Print Processing in Printer 102>>

Figure 13:
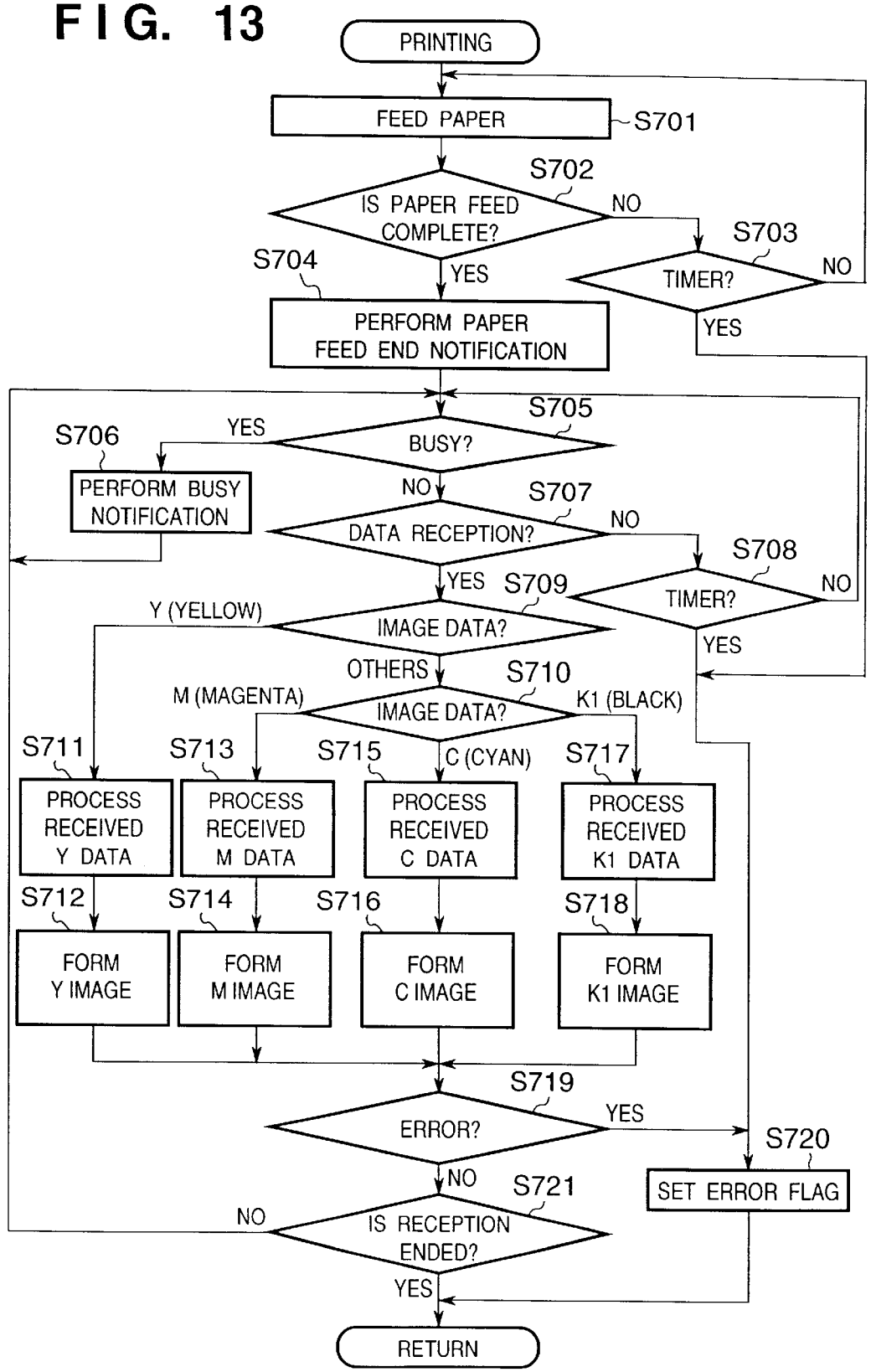
FIG. 13 is a flow chart showing the print routine of the printer of the first embodiment.

FIG. 13 is a flow chart showing details of print processing in step S509 of FIG. 11. Referring to FIG. 11, first, the control section 301 performs feed processing of picking up and feeding a printing paper sheet from the paper feed cassette 41 or 42 to sequentially convey it to the transfer sections 33, 34, 35, and 36 of the printer 102 in step S701. The leading edge of the fed printing paper sheet is aligned by the registration rollers before the first transfer section 33. At this time, the end of paper feed is detected by a paper detector, and the control section 301 is notified of it.

If the paper feed end notification is received in step S702 within a predetermined time determined by a timer (not shown) in step S703, the flow advances to step S704, and the control section 301 sends the paper feed end notification to the computer 101 through the high-speed serial communication I/F 105 using the asynchronous transfer mode. If no paper feed end notification is received within the predetermined time in step S702, the flow advances to step S720. The control section 301 sets an error flag and ends print processing.

If the printer is busy and cannot receive data in step S705, the control section 301 notifies the computer 101 of the busy status using the asynchronous transfer mode in step S706, and the flow returns to step S705. When the computer 101 starts transmitting image data using the isochronous transfer mode within a predetermined time determined by a timer (not shown) in step S708, the printer starts receiving the image data by the high-speed serial communication section 308 in step S707. The image data is received through the high-speed serial communication I/F 105, high-speed serial communication connector 309, and high-speed serial communication section 308 using one or a plurality of channels acquired by the computer 101 for data transfer with a guaranteed data transfer cycle. As described above, prior to the start of data reception, the control section 301 receives a number or numbers identifying one or a plurality of channels of which the printer is notified by the computer 101 in step S504 of FIG. 11 and performs predetermined setting operations necessary for data reception using the isochronous transfer mode in step S505.

In this embodiment, for image data transmission from the computer 101 to the printer 102 in the isochronous transfer mode, image data are transferred by delaying the start of image data transfer at timings for correcting the interval between the photosensitive drums in units of channels for Y, M, C, and K1. Hence, even when the printer 102 has no delay memory for correcting the interval between the photosensitive drums, the printer can sequentially receive the image data of four colors Y, M, C, and K and form a color image by accurately superposing color print data.

When Y image data is received via channel 1 for Y in the isochronous transfer mode in step S709, the control section 301 sends the received Y image data from the high-speed serial communication section 308 to the image processing section 331. After predetermined image processing is performed in step S711, an image is formed by the image forming section 341 in step S712.

When M image data is received via channel 2 for M in the isochronous transfer mode in step S710, the control section 301 sends the received M image data from the high-speed serial communication section 308 to the image processing section 332. After predetermined image processing is performed in step S713, an image is formed by the image forming section 342 in step S714.

When C image data is received via channel 3 for C in the isochronous transfer mode in step S710, the control section 301 sends the received C image data from the high-speed serial communication section 308 to the image processing section 333. After predetermined image processing is performed in step S715, an image is formed by the image forming section 343 in step S716.

When K image data is received via channel 4 for K1 in the isochronous transfer mode in step S710, the control section 301 sends the received K image data from the high-speed serial communication section 308 to the image processing section 334. After predetermined image processing is performed in step S717, an image is formed by the image forming section 344 in step S718.

When a problem such as jam occurs during image formation in step S719, the control section 301 sets an error flag in step S720 and ends print processing shown in FIG. 13. When it is determined in step S721 that image data reception is to continue, the flow returns to step S705 to repeat the series of processing operations. If it is determined instep S721 that image data reception is to end, print processing shown in FIG. 13 is ended.

<Print Operation in Printer 103>

The print operation in the printer 103 will be described below.

Figure 14:
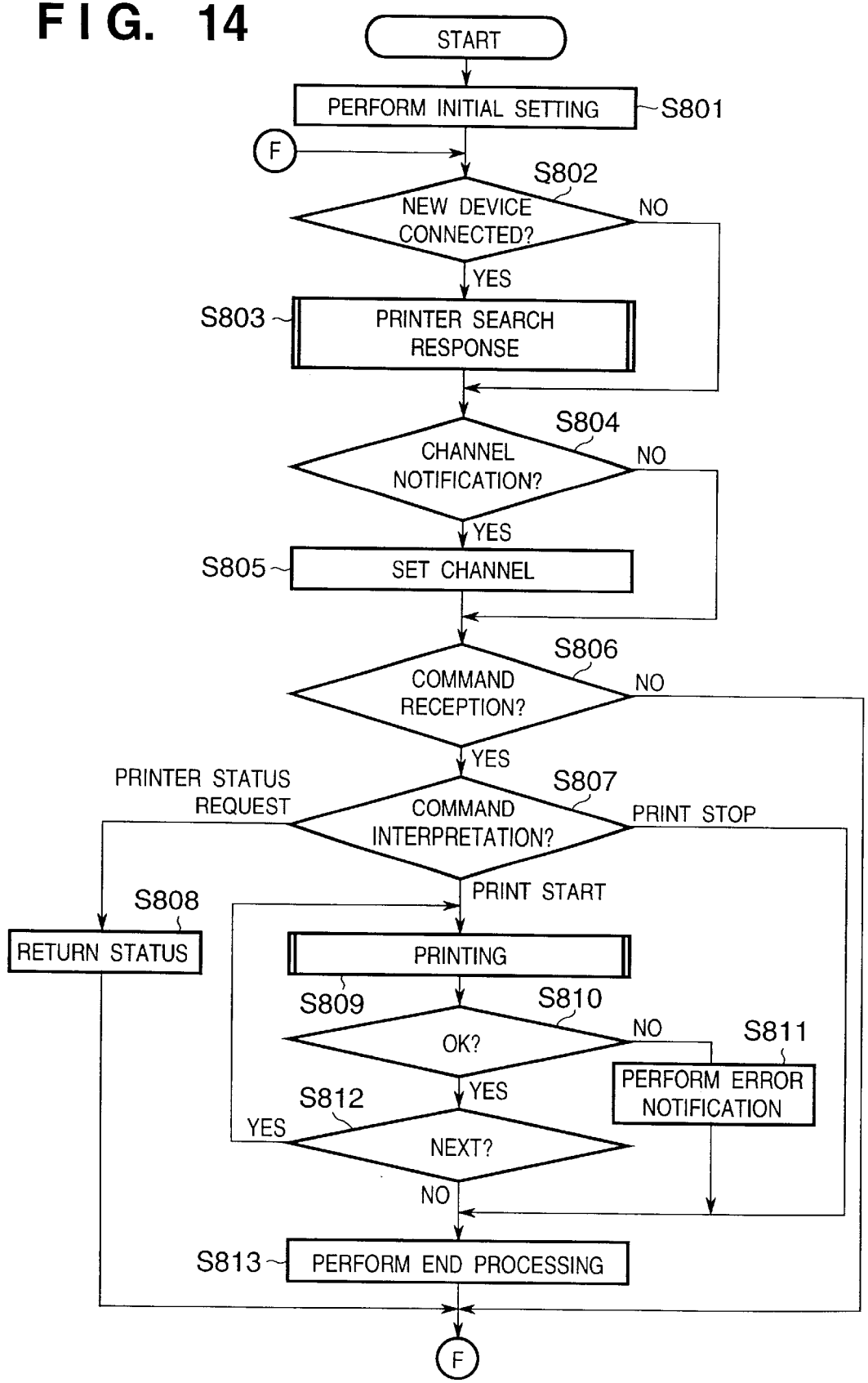
FIG. 14 is a flow chart showing the main routine of the printer of the first embodiment.

FIG. 14 is a flow chart showing the main routine in the printer 103.

In step S801, when the printer 103 is powered on, a control section 401 initializes flags, registers, control variables, and the like, executes a control program such as an OS stored in a partial area of a first storage section 402, and initializes various sections of the printer 103. In step S802, the control section 401 determines whether new devices including the printer 103 are connected to the high-speed serial communication I/Fs 104, 105, 106, and 107. If YES in step S802, the flow advances to step S803 to perform printer search response processing. Details of this printer search response processing are the same as described above.

If NO in step S802, the flow advances to step S804. When the printer 103 is notified, by the computer 101 through the high-speed serial communication I/Fs 105 and 106 using the asynchronous transfer mode, of a number or numbers identifying one or a plurality of channels which are acquired by the computer 101 to be used in the isochronous transfer mode (S804), the number or numbers identifying one or a plurality of channels of which the printer 103 is notified are stored in a partial area of the first storage section 402, and predetermined setting operations necessary for receiving image data using the isochronous transfer mode are performed instep S805. If NO instep S804, the flowadvances to step S806.

When a command is received from the computer 101 through the high-speed serial communication I/Fs 105 and 106 using the asynchronous transfer mode in step S806, the control section 401 interprets the received command in step S807. If it is a command requesting a printer status, the status is sent to the computer 101 using the asynchronous transfer mode in step S808, and the flow returns to step S802. When it is determined in step S807 that the command requesting the printer to start printing, print processing is performed in step S809. Details of this print processing will be described later with reference to FIG. 15.

If it is determined in step S810 that the print processing in step S809 has a problem, the control section 401 sends an error status to the computer 101 using the asynchronous transfer mode in step S811. After necessary predetermined termination processing is performed in the printer 103 in step S813, the flow returns to step S802. If it is determined in step S809 that the print processing has no problem and in step S812 that printing need be continuously executed, the flow returns to step S809 to repeat the series of operations. If it is determined instep S812 that printing need not be continued, necessary predetermined termination processing is performed in the printer 103 in step S813, and then the flow returns to step S802.

<<Print Processing in Printer 103>>

Figure 15:
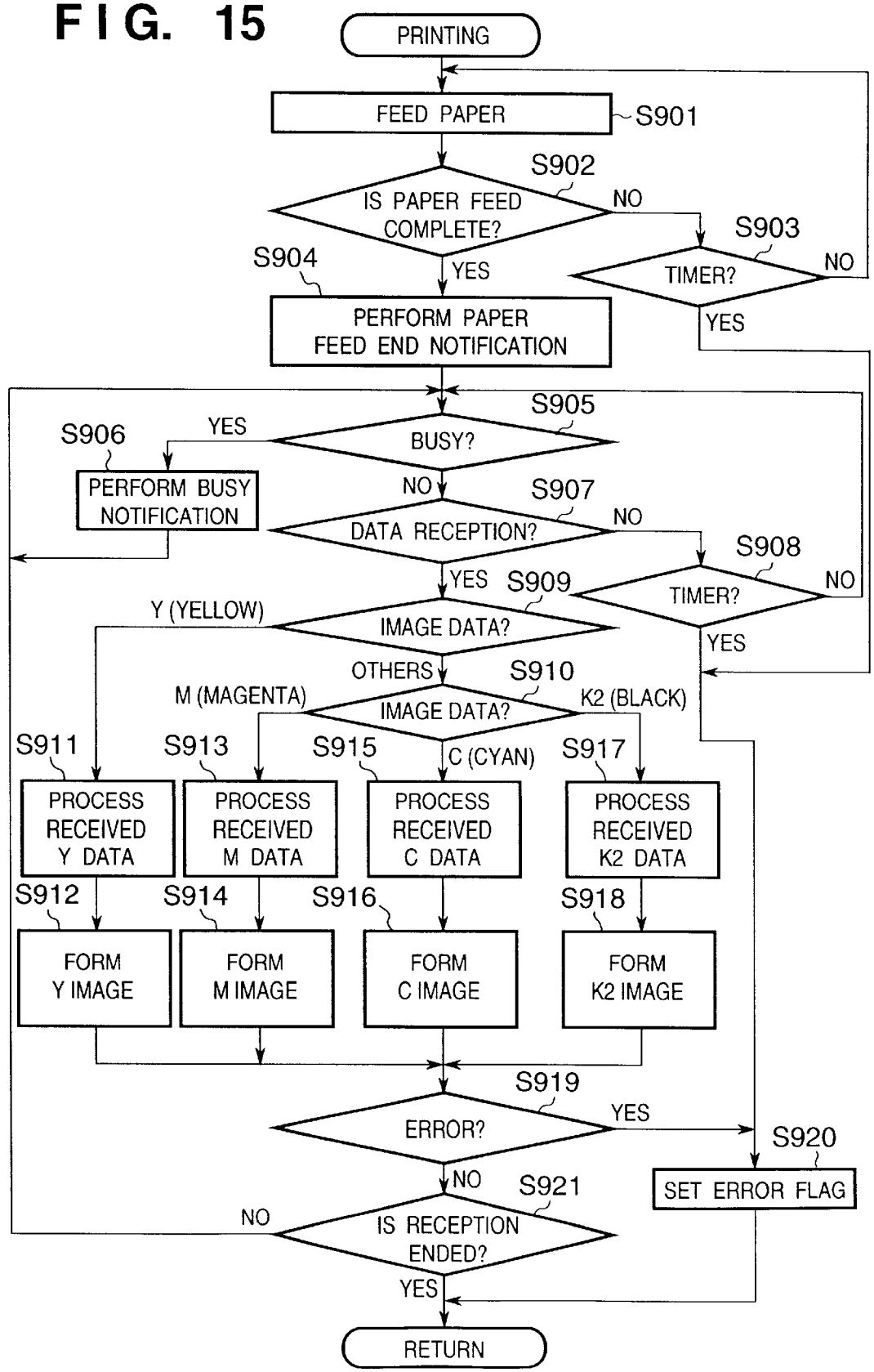
FIG. 15 is a flow chart showing the print routine of the printer of the first embodiment.

FIG. 15 is a flow chart showing details of print processing in step S809 of FIG. 14. Referring to FIG. 15, first, the control section 401 performs feed processing of picking up and feeding a printing paper sheet from the paper feed cassette 41 or 42 to sequentially convey it to the transfer sections 33, 34, 35, and 36 of the printer 103 in step S901. The leading edge of the fed printing paper sheet is aligned by the registration rollers before the first transfer section 33. At this time, the end of paper feed is detected by a paper detector, and the control section 401 is notified of it.

If the paper feed end notification is received in step S902 within a predetermined time determined by a timer (not shown) in step S903, the flow advances to step S904, and the control section 401 sends the paper feed end notification to the computer 101 through the high-speed serial communication I/Fs 105 and 106 using the asynchronous transfer mode. If no paper feed end notification is received within the predetermined time in step S902, the flow advances to step S920. The control section 401 sets an error flag and ends print processing.

If the printer is busy and cannot receive data in step S905, the control section 401 notifies the computer 101 of the busy status using the asynchronous transfer mode in step S906, and the flow returns to step S905. When the computer 101 starts transmitting image data using the isochronous transfer mode within a predetermined time determined by a timer (not shown) in step S908, the printer starts receiving the image data by a high-speed serial communication section 408 in step S907. The image data is received through the high-speed serial communication I/Fs 105 and 106, high-speed serial communication connector 409, and high-speed serial communication section 408 using one or a plurality of channels acquired by the computer 101 for data transfer with a guaranteed data transfer cycle. As described above, prior to the start of data reception, the control section 401 receives a number or numbers identifying one or a plurality of channels of which the printer is notified by the computer 101 in step S804 of FIG. 14 and performs predetermined setting operations necessary for data reception using the isochronous transfer mode in step S805.

In this embodiment, for image data transmission from the computer 101 to the printer 103 in the isochronous transfer mode, image data are transferred by delaying the start of image data transfer at timings for correcting the interval between the photosensitive drums in units of channels for Y, M, C, and K2. Hence, even when the printer 103 has no delay memory for correcting the interval between the photosensitive drums, the printer can sequentially receive the image data of four colors Y, M, C, and K and form a color image by accurately superposing color print data.

When Y image data is received via channel 1 for Y in the isochronous transfer mode in step S909, the control section 401 sends the received Y image data from the high-speed serial communication section 408 to an image processing section 431. After predetermined image processing is performed in step S911, an image is formed by an image forming section 441 in step S912.

When M image data is received via channel 2 for M in the isochronous transfer mode in step S910, the control section 401 sends the received M image data from the high-speed serial communication section 408 to an image processing section 432. After predetermined image processing is performed in step S913, an image is formed by an image forming section 442 in step S914.

When C image data is received via channel 3 for C in the isochronous transfer mode in step S910, the control section 401 sends the received C image data from the high-speed serial communication section 408 to an image processing section 433. After predetermined image processing is performed in step S915, an image is formed by an image forming section 443 in step S916.

When K image data is received via channel 5 for K2 in the isochronous transfer mode in step S910, the control section 401 sends the received K image data from the high-speed serial communication section 408 to an image processing section 434. After predetermined image processing is performed in step S917, an image is formed by an image forming section 444 in step S918.

When a problem such as jam occurs during image formation in step S919, the control section 401 sets an error flag in step S920 and ends print processing shown in FIG. 15. When it is determined in step S921 that image data reception is to continue, the flow returns to step S905 to repeat the series of processing operations. If it is determined instep S921 that image data reception is to end, print processing shown in FIG. 15 is ended.

Figure 16:
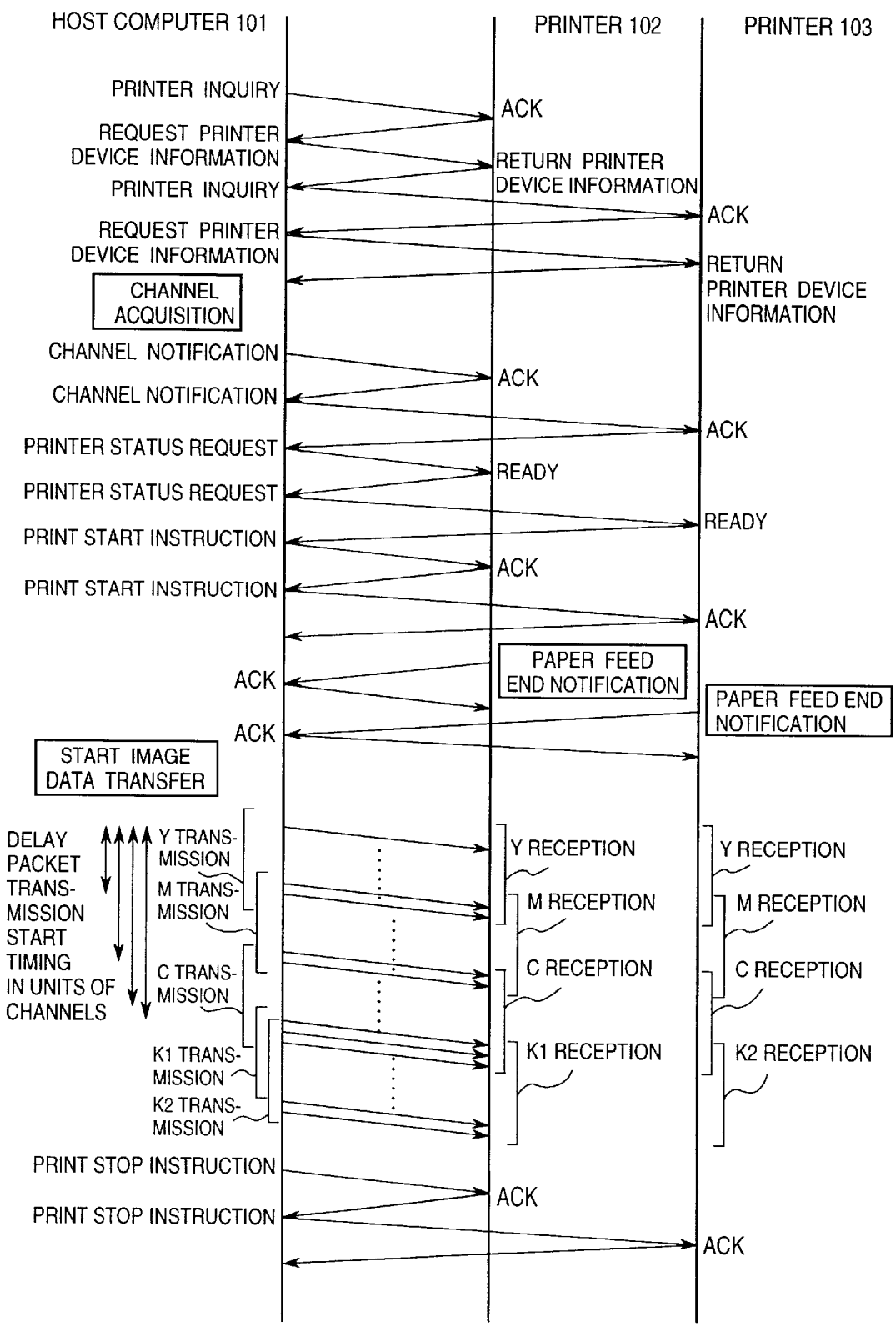
FIG. 16 is a view showing the flow of commands exchanged between the computer and the printer of the first embodiment.

In the above-described manner, communication using high-speed serial buses is performed between the computer 101 and the printers 102 and 103 in this embodiment to print a color image. FIG. 16 shows the flow of commands exchanged in print processing of this embodiment.

As described above, according to this embodiment, in the image processing system in which a computer and a plurality of printers each having a plurality of image forming sections are connected, to correct the time lag generated when a printing paper sheet reaches each image forming section in each printer, channels of the isochronous transfer mode in high-speed serial communication are efficiently ensured to transfer each data. With this arrangement, a color image can be appropriately formed at a high speed without preparing any large-capacity image memory and delay memory in each printer.

Second Embodiment

The second embodiment of the present invention will be described below.

Figure 17:
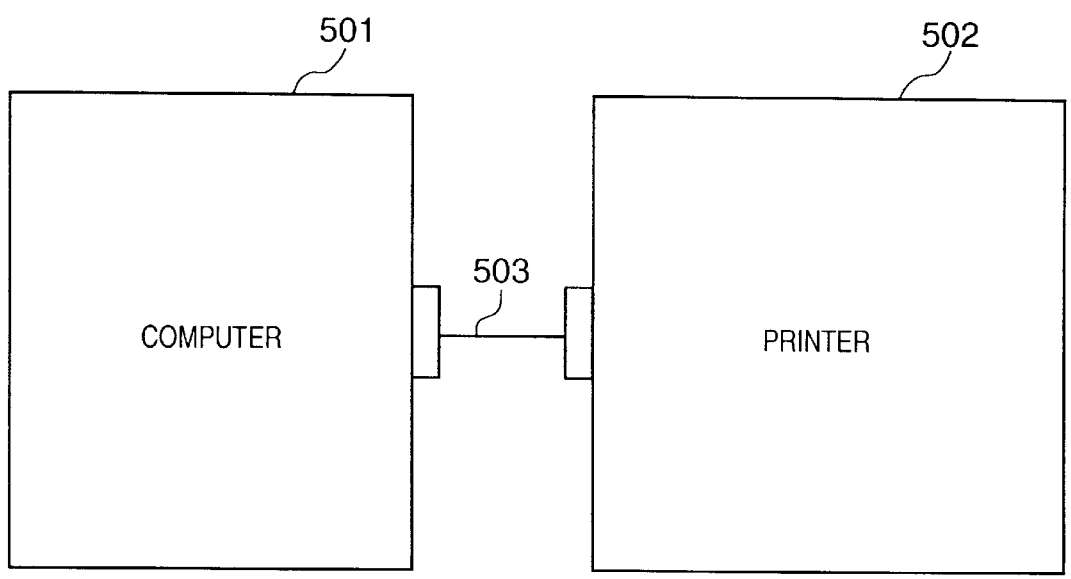
FIG. 17 is a block diagram showing the overall arrangement of an image processing system according to the second embodiment of the present invention.

FIG. 17 is a block diagram showing the overall arrangement of an image processing system according to the second embodiment. Referring to FIG. 17, a computer 501 normally used by a user is connected to a printer 502 via a high-speed serial communication I/F 503. The printer 502 implements the printing function of the computer 501. More specifically, to print a document or image created by the computer 501, the printer 502 receives data for image formation from the computer 501 through the high-speed serial communication I/F 503, processes the image data as needed, and then, prints it on printing paper.

The high-speed serial communication I/F 503 is a communication I/F such as a USB or IEEE 1394 bus having a mechanism such as an isochronous transfer mode for ensuring a data transfer rate and generally has a high-speed serial bus structure.

<Detailed Arrangement of Computer 501>

The arrangement of the computer 501 will be described below in detail with reference to the functional block diagram shown in FIG. 18.

Figure 18:
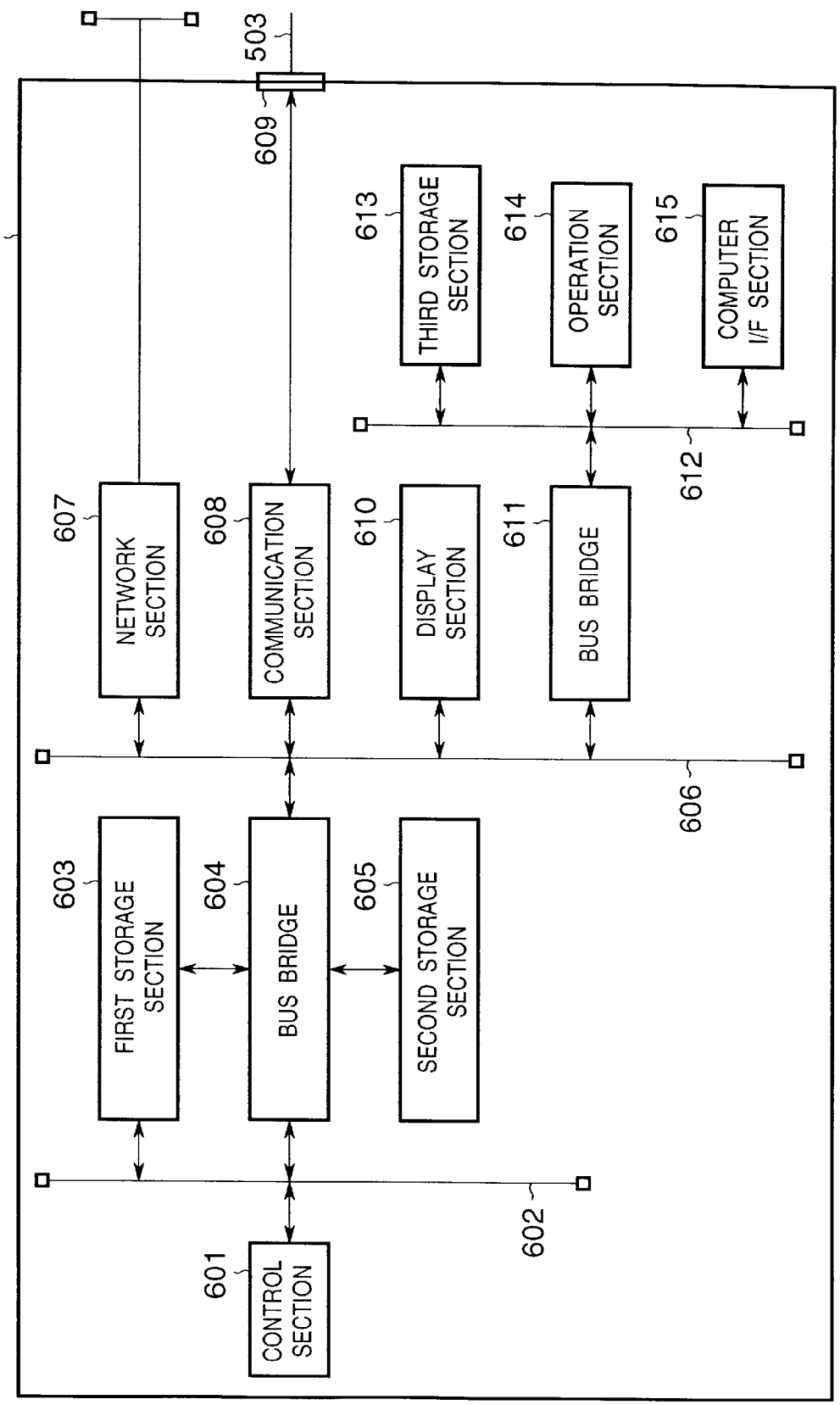
FIG. 18 is a block diagram showing the functional arrangement of a computer of the second embodiment.

Referring to FIG. 18, a control section 601 controls the entire computer 501. A CPU bus 602 connects the control section 601 to a first storage section 603 and bus bridge 604 and transfers data processed by the control section 601 at a high speed. The first storage section 603 is a cache memory used for operation of the control section 601. The first storage section 603 is accessed by the control section 601 at a high speed and temporarily stores data used by the control section 601 for calculation. A high-speed SRAM or the like is generally used as the first storage section 603.

The bus bridge 604 connects the CPU bus 602 to a high-speed bus 606 (to be described later) and absorbs any processing speed difference between the buses. The bus bridge 604 enables data communication between units connected to the high-speed bus 606 and the control section 601 operating at a higher speed. The bus bridge 604 also has a memory controller function and performs a series of memory management operations of, e.g., reading out, at a predetermined time, data temporarily written in the first storage section 603 by the control section 601, and writing the data in a second storage section 605, or reading out data from the second storage section 605 and writing it in the first storage section 603 in accordance with a request from the control section 601. The second storage section 605 is a main memory where the control section 601 executes various applications. A DRAM or the like is generally used as the second storage section 605.

The high-speed bus 606 connects the bus bridge 604, network section 607, high-speed serial communication section 608, display section 610, and bus bridge 611 to transfer data processed by the control section 601 to the units or transfer data between the units at a high speed (DMA transfer). A PCI bus or the like is generally used as the high-speed bus 606. The network section 607 connects the computer 501 to a network (not shown) for data communication with the network. Typical examples of the network to be connected are Ethernet and token ring.

The high-speed serial communication section 608 has a mechanism such as an isochronous transfer mode for ensuring a data transfer rate and can communicate a large amount of image data at a high speed (within a predetermined time). The isochronous transfer mode is executed by ensuring channels with a guaranteed data transfer cycle and broadcasting data packets using the channels. The data transfer rate can also be increased by ensuring a number of channels necessary to do so. The high-speed serial communication section 608 also has a mechanism such as an asynchronous transfer mode for asynchronous transfer in a one-to-one correspondence and can appropriately perform predetermined communication with the printer 502. Data is transferred using packets. Generally, IEEE 1394 or the like is used as the high-speed serial communication section 608.

A high-speed serial communication connector 609 connects the computer 501 to the printer 502 through the high-speed serial communication I/F 503. The display section 610 has a liquid crystal display device, loudspeaker, and the like to display necessary characters, images, and audio data in accordance with program execution by the control section 601. The bus bridge 611 connects the high-speed bus 606 to a low-speed bus 612 (to be described later) and absorbs any processing speed difference between the buses. The bus bridge 611 enables data communication between the units operating at a high speed and units connected to the low-speed bus 612 and operating at a low speed.

The low-speed bus 612 connects the bus bridge 611, third storage section 613, operation section 614, and computer I/F 615. The low-speed bus 612 has a bus structure with a lower transfer rate than that of the above-described high-speed bus 606 to connect units having a relatively low processing speed. An ISA bus or the like is generally used as the low-speed bus 612. The third storage section 613 stores a plurality of applications used for operation of the control section 601. Generally, the third storage section 613 is constructed by a large-capacity hard disk and managed by the control section 601. The operation section 614 has a keyboard, microphone, and the like and inputs various setting instructions necessary for operation of the computer 501 and/or various operation instructions to the control section 601. The low-speed computer I/F 61 connects the computer 501 to a peripheral device. Generally, an RS-232C for serial communication or a centronics I/F for parallel communication is used as the computer I/F 615.

<Detailed Arrangement of Printer 502>

The arrangement of the printer 502 will be described below in detail with reference to the functional block diagram shown in FIG. 19.

Figure 19:
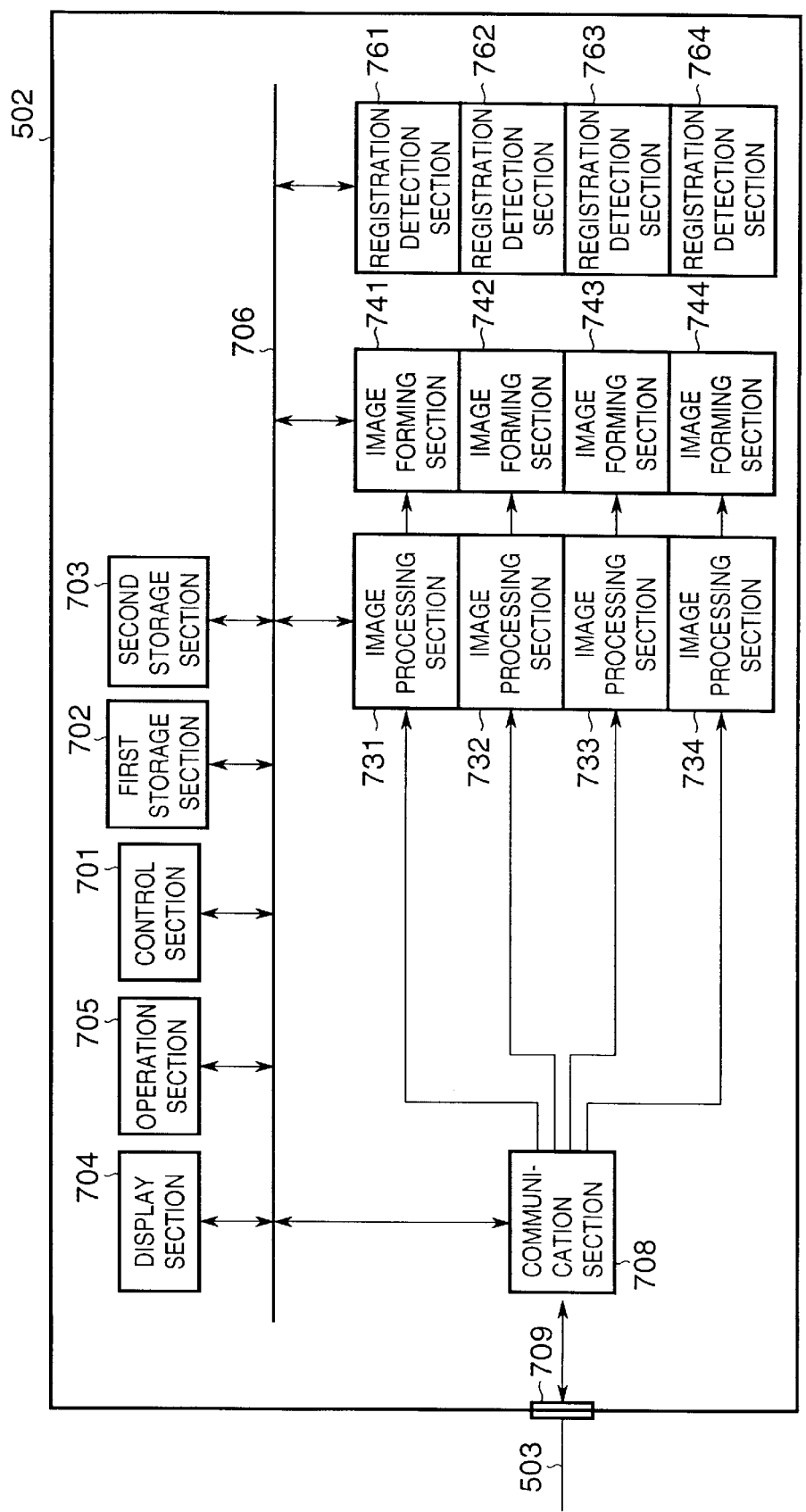
FIG. 19 is a block diagram showing the functional arrangement of a printer of the second embodiment.

Referring to FIG. 19, a control section 701 controls the entire printer 502 and is operated by a real-time OS. A first storage section 702 serving as a work memory for operation of the control section 701 is accessed by the control section 701 at a high speed. A second storage section 703 stores a plurality of applications for operation of the control section 701. The second storage section 703 is generally constructed by a large-capacity hard disk and managed by the control section 701.

A display section 704 has a liquid crystal display section. An operation section 705 has a touch panel input device bonded to the liquid crystal display section and a plurality of hard keys. A signal input by the touch panel or hard keys is transmitted to the control section 701 through a CPU bus 706, so image data read out from the first storage section 702 and/or second storage section 703 and sent by the control section 701 is displayed on the liquid crystal display section. The liquid crystal display section also displays functions of the operation of the image forming apparatus and image data associated with the functions. The operation section 705 may have an input means based on a digitizer or pen recognition mechanism for pen input, a microphone or voice recognition mechanism for voice input, or an image sensing device or image recognition mechanism for image input.

The CPU bus 706 is connected to the control section 701, first storage section 702, second storage section 703, and various functional units to transfer data processed by the control section 701 to the functional units or transfer data between the functional units at a high speed (DMA transfer).

A high-speed serial communication section 708 has a mechanism such as an isochronous transfer mode for ensuring a data transfer rate and can communicate a large amount of image data at a high speed (within a predetermined time). The isochronous transfer mode is executed by ensuring channels with a guaranteed data transfer cycle and broadcasting data packets using the channels. The data transfer rate can also be increased by ensuring a number of channels necessary to do so. The high-speed serial communication section 708 also has a mechanism such as an asynchronous transfer mode for asynchronous transfer in a one-to-one correspondence and can appropriately perform predetermined communication with the computer 501. Data is transferred using packets. Generally, IEEE 1394 or the like is used as the high-speed serial communication section 708. A high-speed serial communication connector 709 connects the printer 502 to the computer 501 through the high-speed serial communication I/F 503.

Image processing sections 731, 732, 733, and 734 perform various image processing operations including smoothing processing, edge processing, and color correction for image data input from the high-speed serial communication section 708 in accordance with a processing instruction from the control section 701. Image forming sections 741, 742, 743, and 744 form visible image data on printing paper in units of colors on the basis of the received image data. To form an image, for example, electrophotography for forming a latent image on a photosensitive drum using a laser beam or LED beam and forming an image on printing paper can be used.

Registration detection sections 761, 762, 763, and 764 form images for registration detection at predetermined positions on a conveyor belt in units of photosensitive drums before printing of image data. The registration detection sections 761, 762, 763, and 764 read the formation positions to detect a shift in registration position (misregistration amount) for each photosensitive drum.

Figure 20:
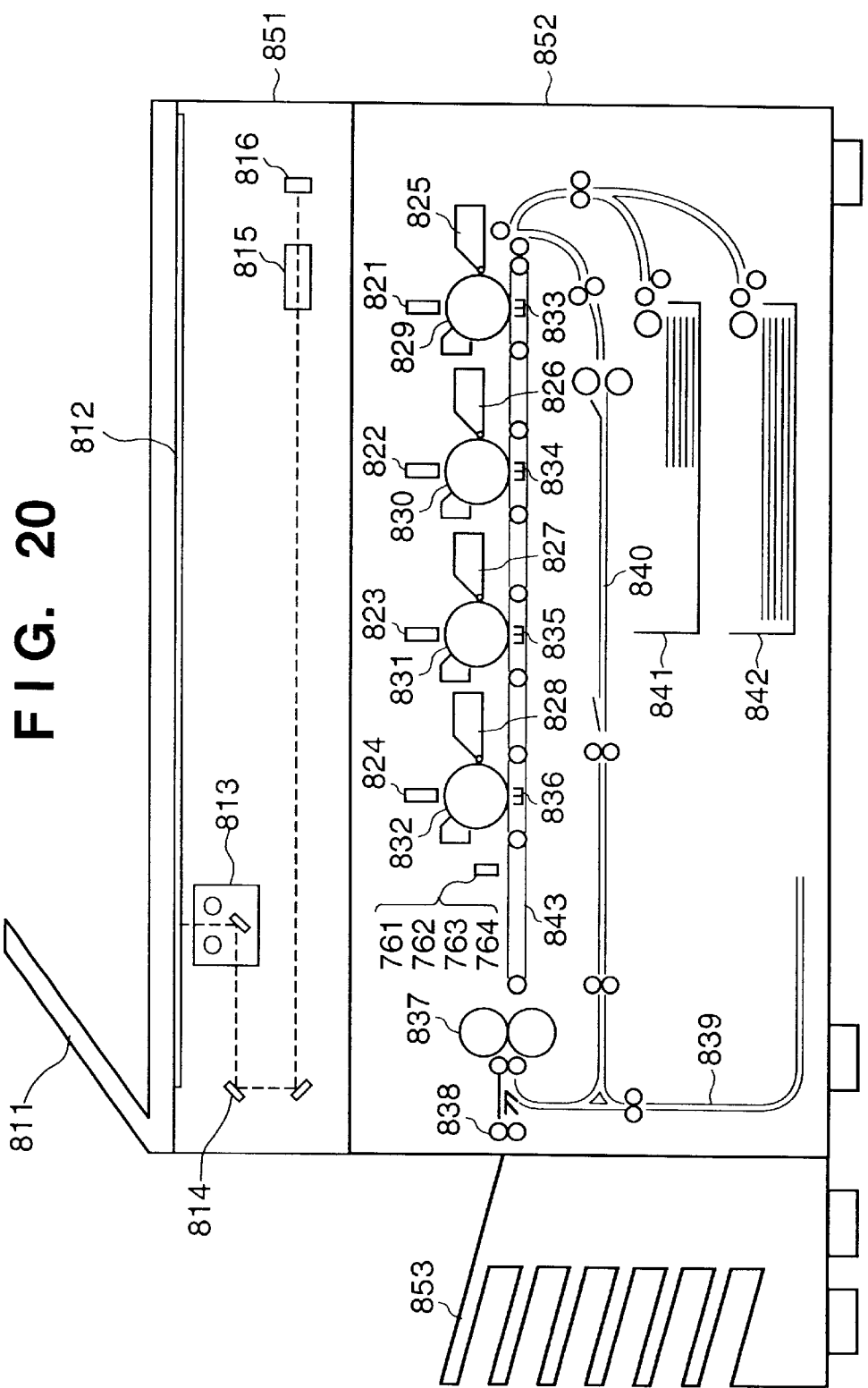
FIG. 20 is a cross-sectional view showing the structure of the printer of the second embodiment.

The mechanism of the printer 502 will be described next with reference to FIG. 20.

The printer 502 is roughly divided into a scanner unit 851 for inputting an image signal and a printer unit 852 for printing and outputting the image signal.

In the scanner unit 851, an original feeder 811 sequentially feeds originals one by one from the final page onto an original table glass 812, and after the original read operation is ended, delivers the original on the original table glass 812. When an original is conveyed onto the original table glass 812, a lamp in the scanning section 813 is turned on, and the scanning section 813 starts moving to expose and scan the original. Reflected light from the original is guided to an image sensing element 816 by a plurality of mirrors 814 and a lens 815. The image of the scanned original is read by the image sensing element 816.

Image data output from the image sensing element 816 is subjected to predetermined processing and transferred to the printer unit 852 through a scanner I/F and printer I/F (constructed by a video I/F and high-speed serial communication I/F, respectively, though neither are shown).

In the printer unit 852, light-emitting sections 821, 822, 823, and 824 emit laser beams or LED beams in accordance with the input image data of colors (Y, M, C, K). Photosensitive drums 829, 830, 831, and 832 are irradiated with the laser beams or LED beams, so latent images corresponding to the laser beams or LED beams are formed on the photosensitive drums 829, 830, 831, and 832, respectively. Developing agents are attracted onto the latent image portions on the photosensitive drums 829, 830, 831, and 832 by developing units 825, 826, 827, and 828, respectively. At a timing synchronous with the start of irradiation of the laser beams or LED beams, a printing paper sheet is fed from a paper feed cassette 841 or paper feed cassette 842 and sequentially conveyed to transfer sections 833, 834, 835, and 836. The developing agents attracted on the photosensitive drums 829, 830, 831, and 832 are transferred to the printing paper sheet to superpose on each other. The photosensitive drums 829, 830, 831, and 832 and peripheral structures, which form the images of Y, M, C, and K, correspond to the image forming sections 741, 742, 743, and 744 shown in FIG. 19, respectively.

The printing paper sheet having the developing agents is conveyed to a fixing section 837. The fixing section 837 fixes the developing agents to the printing paper sheet by heat and pressure. The printing paper that has passed through the fixing section 837 is delivered by delivery rollers 838. A sorter 843 sorts the delivered printing paper sheets and stores them in bins. In a double-side print mode, the printing paper sheet that has passed through the fixing section 837 is temporarily conveyed to a convey switch 839. After this, the direction of rotation of the feed rollers is reversed to guide the printing paper sheet from the convey switch 839 to a re-feed convey path 840. In a multiple print mode, the printing paper sheet is guided to the re-feed convey path 840 without being conveyed to the delivery rollers 838. The printing paper sheet guided to the re-feed convey path 840 is fed at the above-described timing and sequentially conveyed to the transfer sections 833, 834, 835, and 836.

To detect misregistration between the photosensitive drums, images for registration detection are formed at predetermined positions on the conveyor belt 843 in units of photosensitive drums before printing of image data. The registration detection sections 761, 762, 763, and 764 read the formation positions to detect a shift in registration position (misregistration amount) in units of photosensitive drums.

The print operation in the image processing system according to the second embodiment will be described below with reference to FIGS. 21 to 26.

<Print Operation in Computer 501>

Figure 21:
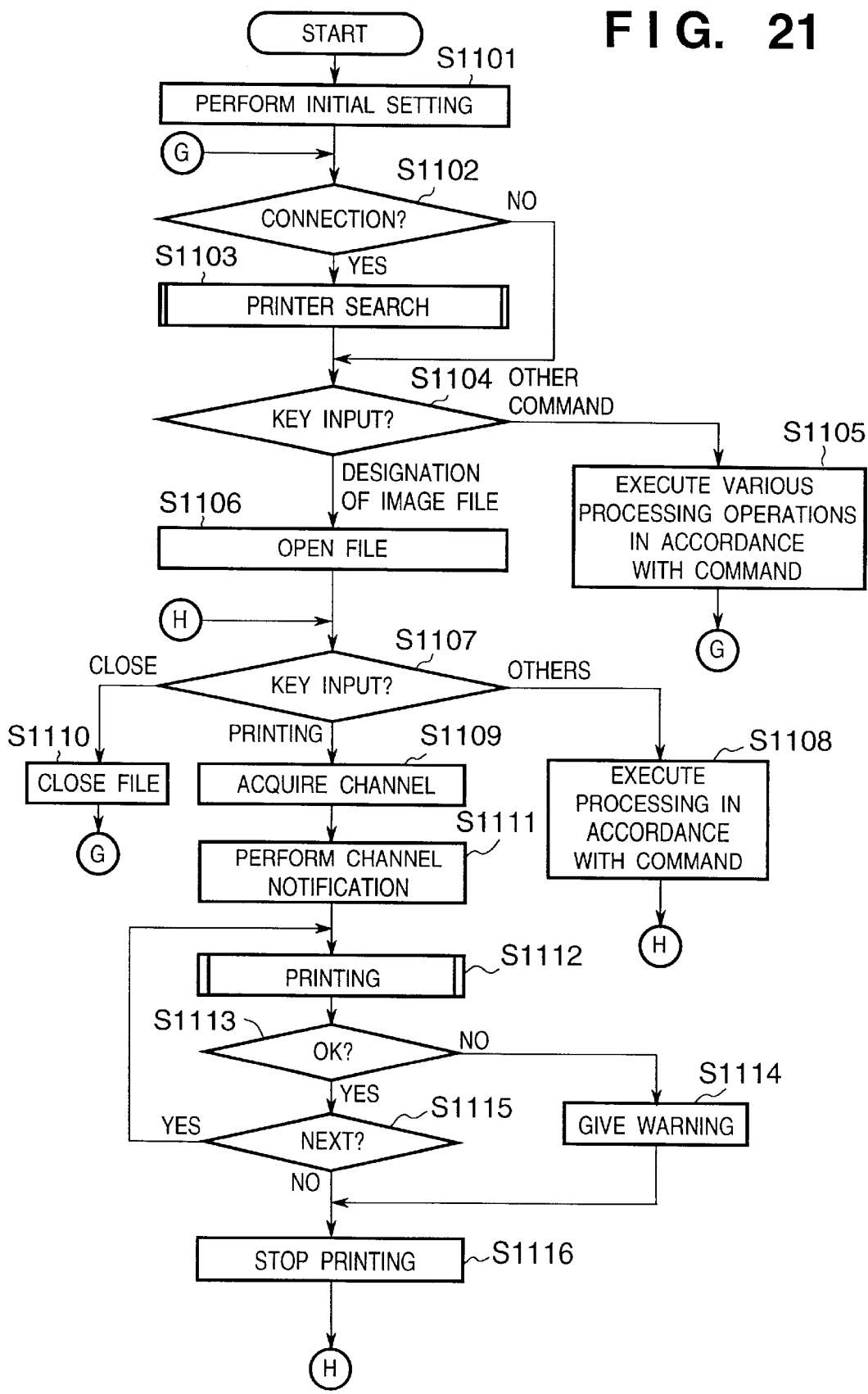
FIG. 21 is a flow chart showing the main routine of the computer of the second embodiment.

First, the print operation in the computer 501 will be described. FIG. 21 is a flow chart showing the main routine in the print processing of the computer 501 of the second embodiment.

In step S1101, when the computer 501 is powered on, the control section 601 initializes flags, registers, control variables, and the like. The control section 601 temporarily loads a control program such as an OS stored in a partial area of the second storage section 605 to the first storage section 603 in units of predetermined amounts through the bus bridge 604 having a memory controller function and then executes the control program. The control section 601 initializes various sections of the computer 501. In step S1102, the control section 601 determines whether new devices including the computer 501 itself are connected to the high-speed serial communication I/F 503. If YES in step S1102, the flow advances to step S1103 to perform printer search processing. Details of printer search processing in step S1103 will be described later with reference to FIG. 22.

When it is determined in step S1104 that the input by the keys, touch panel, digitizer, or the like of the operation section 614 is not a command input for designating an image file to be printed and opening it but a command input for executing other processing, the flow advances to step S1105, and the control section 601 executes various processing operations corresponding to the input instruction. After execution of various processing operations, the flow returns to step S1102. If it is determined in step S1104 that the input designates an image file, the flow advances to step S1106. The control section 601 loads the designated image file to the second storage section 605 from the third storage section 613, through the network section 607, or through the high-speed serial communication I/F 503.

When it is determined in step S1107 that the input by the operation section 614 is not a command input for printing the opened image file or a command input for closing the opened image file but a command input for executing other processing, the flow advances to step S1108, and the control section 601 executes various processing operations corresponding to the input. After that, the flow returns to step S1107. If it is determined in step S1107 that the input directs closing the opened image file, the flow advances to step S1110, and the control section 601 closes the image file loaded in the second storage section 605 to release the unnecessary area of the second storage section 605. When the contents of the image file need be changed and stored, the image file is stored as a new image file in the third storage section 613, through the network section 607, or through the high-speed serial communication I/F 503.

If it is determined in step S1107 that the input is to print the opened image file, the flow advances to step S1109. The control section 601 acquires, via the high-speed serial communication section 608, a necessary number of channels with a guaranteed data transfer cycle such as an isochronous transfer mode on the high-speed serial communication I/F 503. In step S1111, the printer 502 is notified of a number or numbers identifying one or a plurality of acquired channels using asynchronous transfer such as an asynchronous transfer mode in a one-to-one correspondence through the high-speed serial communication section 608, high-speed serial communication connector 609, and high-speed serial communication I/F 503. In step S1112, the control section 601 transfers the image data to the printer 502 using one or a plurality of channels of which the printer 502 is notified, and the printer 502 prints the image data. Details of print processing in step S1112 will be described later with reference to FIGS. 23A and 23B.

After the end of print processing in step S1112, if the print processing has a problem in step S1113, the control section 601 gives predetermined warning based on an image, voice, or text by the display section 610 in step S1114. After that, the control section 601 sends a print stop command to the printer 502 in step S1116 to stop the print operation. After the print stop command is sent, the flow returns to step S1107. If the print processing has no problem in step S1113, and it is determined in step S1115 that printing is to continue, the flow returns to step S1112 to repeat the series of operations. If it is determined in step S1115 that printing is not to continue, a print stop command is sent to the printer 502 in step S1116 to stop the print operation. After the print stop command is sent, the flow returns to step S1107.

<<Printer Search Processing>>

Figure 22:
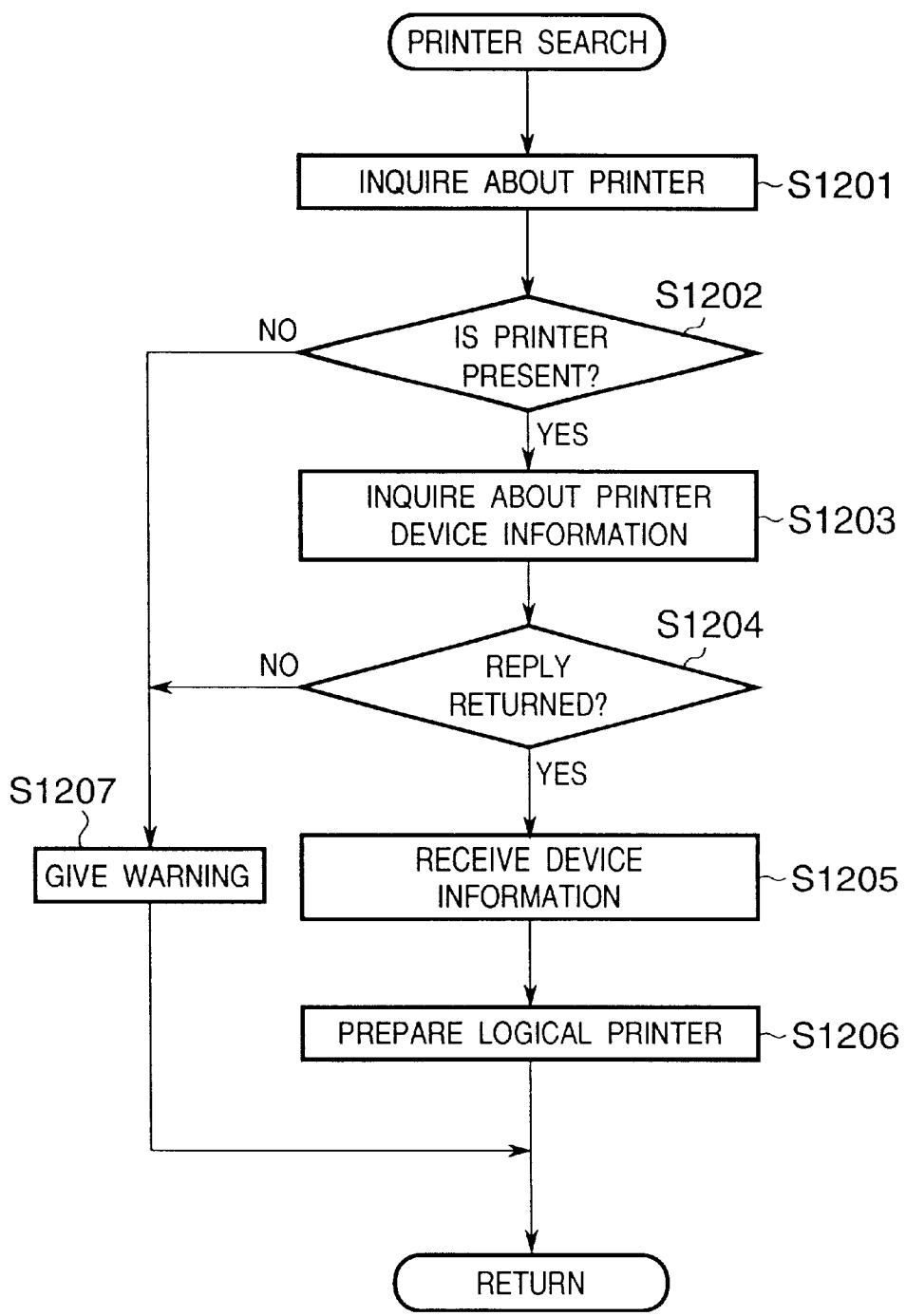
FIG. 22 is a flow chart showing the printer search routine of the computer of the second embodiment.

FIG. 22 is a flow chart showing the printer search processing in step S1103 in FIG. 21. First, in step S1201 the control section 601 inquires through the high-speed serial communication section 608 whether the device newly connected to the high-speed serial communication I/F 503 is an image forming apparatus such as the printer 502, i.e., a device capable of printing transferred image data. If it is determined in step S1202 that a desired image forming apparatus (e.g., the printer 502) is present on the high-speed serial communication I/F 503, the control section 601 subsequently inquires about printer device information in step S1203. If printer device information is returned from the printer 502 in step S1204, the returned device information is stored in a partial area of the second storage section 605 in step S1205. In step S1206, the control section 601 prepares a logical printer corresponding to the printer 502 used in the OS to transfer and print image data and ends printer search processing.

If it is determined in step S1202 that a desired printer is not present on the high-speed serial communication I/F 503, or if no printer device information is returned in step S1204, the flow advances to step S1207, and the control section 601 gives predetermined warning based on an image, voice, or text by the display section 610 and ends printer search processing.

<<Print Processing>>

Figure 23A:
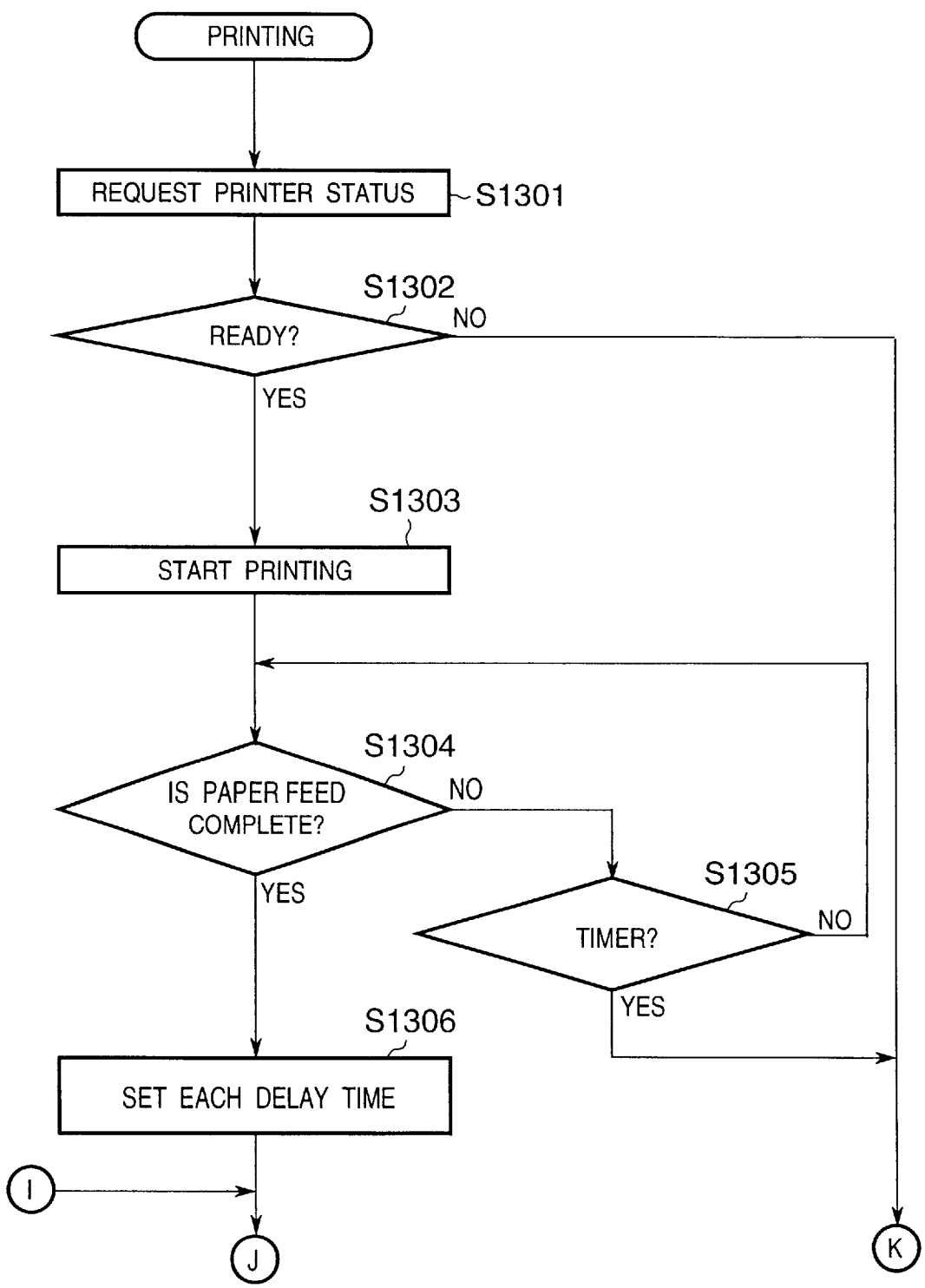
FIGS. 23A and 23B are flow charts showing the print routine of the computer of the second embodiment.
Figure 23B:
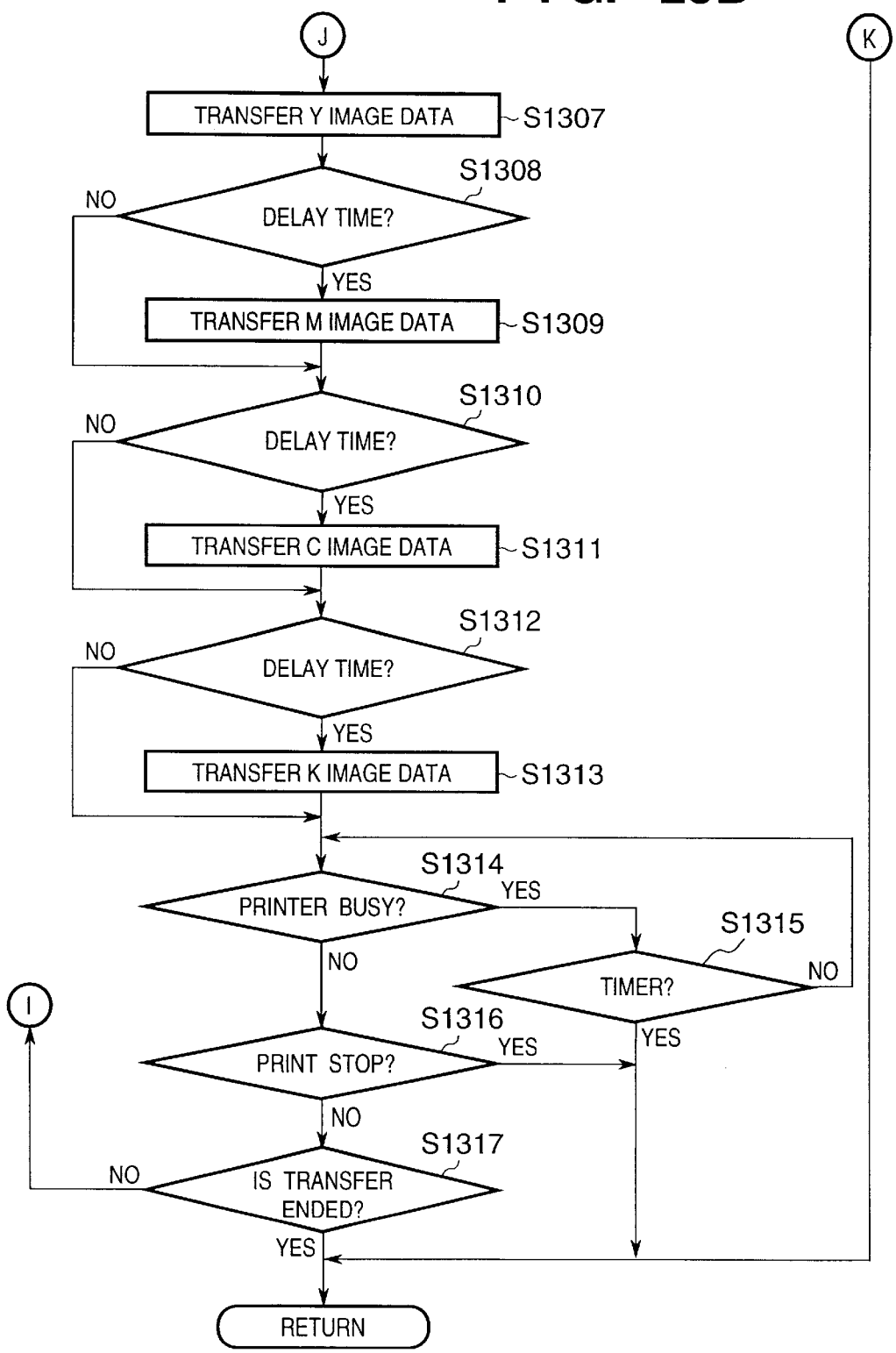

FIGS. 23A and 23B are flow charts showing details of print processing in step S1112 of FIG. 21. Referring to FIGS. 23A and 23B, in step S1301 the control section 601 requests, by the high-speed serial communication section 608 through the high-speed serial communication I/F 503, the desired image forming apparatus, e.g., the printer 502 to send the printer status using the asynchronous transfer mode. If the status "READY" representing that preparation is complete is returned from the printer 502 in step S1302, the control section 601 sends a print start instruction to the printer 502 using the asynchronous transfer mode in step S1303.

When a paper feed end notification is received in step S1304 from the printer 502 using the asynchronous transfer mode within a predetermined time determined in step S1305, the control section 601 sets data transfer start delay times to transfer image data at timings for correcting the drum interval in units of drums in step S1306. The delay times set in step S1306 are obtained by calculation by the control section 601 on the basis of the printer device information unique to the printer 502, which is received in step S1205 of FIG. 22, and the data transfer rate of the isochronous transfer mode. The printer device information contains the number of photosensitive drums, types of colors used for image formation, distances between the photosensitive drums, image formation speed, misregistration amount between the photosensitive drums, and the like. To correct the positions of the photosensitive drums, i.e., the time lag of sequential conveyance of the printing paper sheet to the photosensitive drums and the transfer time of the image data of the respective colors, the transfer start delay times are set in step S1306.

In step S1307, for data transfer with a guaranteed data transfer cycle, the control section 601 starts transferring Y image data to the printer 502 in the isochronous transfer mode using Y channel of the plurality of channels acquired for four colors of Y, M, C, and K in step S1109 of FIG. 21.

When the transfer start delay time between the Y photosensitive drum 829 and the M photosensitive drum 830, which is set in step S1306, has elapsed in step S1308, the control section 601 starts transferring M image data to the printer 502 in the isochronous transfer mode. When the transfer start delay time between the Y photosensitive drum 829 and the C photosensitive drum 831, which is set in step S1306, has elapsed in step S1310, the flow advances to step S1311, and the control section 601 starts transferring C image data to the printer 502 in the isochronous transfer mode. When the transfer start delay time between the Y photosensitive drum 829 and the K photosensitive drum 832, which is set in step S1306, has elapsed in step S1312, the flow advances to step S1313, and the control section 601 starts transferring K image data to the printer 502 in the isochronous transfer mode.

When a notification of "printer busy" is received from the printer 502 using the asynchronous transfer mode during transfer of image data in the isochronous transfer mode in step S1307, image data transfer in the isochronous transfer mode is temporarily interrupted within a predetermined time determined by a timer (not shown) in step S1308. If the printer busy state continues even after the elapse of the predetermined time, print processing shown in FIGS. 23A and 23B is ended. When an instruction for stopping printing is input from the operation section 614 in step S1309, print processing is ended. If image data transfer is not ended in step S1310, the flow returns to step S1307 to repeat the series see of processing operations. If image data transfer is ended in step S1310, print processing is ended.

<Print Operation in Printer 502>

The print operation in the printer 502 will be described below. FIG. 24 is a flow chart showing the main routine of print processing in the printer 502.

In step S1401, when the printer 502 is powered on, the control section 701 initializes flags, registers, control variables, and the like, executes a control program such as an OS stored in a partial area of the first storage section 702, and initializes various sections of the printer 502.

In step S1402, the control section 701 initializes registration correction data to correct misregistration between the photosensitive drums 829, 830, 831, and 832. Details of this registration correction initial setting processing in step S1402 will be described later with reference to FIG. 25.

In step S1403, the control section 701 determines whether new devices including the printer 502 are connected to the high-speed serial communication I/F 503. If YES in step S1403, the flow advances to step S1404 to perform printer search response processing. Details of this printer search response processing in step S1404 will be described later with reference to FIG. 26.

If NO in step S1403, the flow advances to step S1405. When in step the printer 502 is notified, by the computer 501 through the high-speed serial communication I/F 503 using the asynchronous transfer mode, of a number or numbers identifying one or a plurality of channels which are acquired by the computer 501 to be used in the isochronous transfer mode (S1405), the number or numbers identifying one or a plurality of channels of which the printer 502 is notified are stored in a partial area of the first storage section 702, and predetermined setting operations necessary for receiving image data using the isochronous transfer mode are performed in step S1406. If NO in step S1405, the flow advances to step S1407.

When a command is received from the computer 501 through the high-speed serial communication I/F 503 using the asynchronous transfer mode in step S1407, the control section 701 interprets the received command in step S1408. If it is a command requesting a printer status, the status is sent to the computer 501 using the asynchronous transfer mode in step S1409, and the flow returns to step S1403. When it is determined in step S1408 that the command requesting the printer to start printing, print processing is performed in step S1410. Details of this print processing will be described later with reference to FIG. 27.

If it is determined in step S1411 that the print processing in step S1410 has a problem, the control section 701 sends an error status to the computer 501 using the asynchronous transfer mode in step S1412. After necessary predetermined termination processing is performed in the printer 502 in step S1414, the flow returns to step S1403. If it is determined in step S1410 that the print processing has no problem and in step S1413 that printing need be continuously executed, the flow returns to step S1410 to repeat the series of operations. If it is determined in step S1413 that printing need not be continued, necessary predetermined termination processing is performed in the printer 502 in step S1414, and then the flow returns to step S1403.

<<Registration Correction Initial Setting Processing>>

Figure 25:
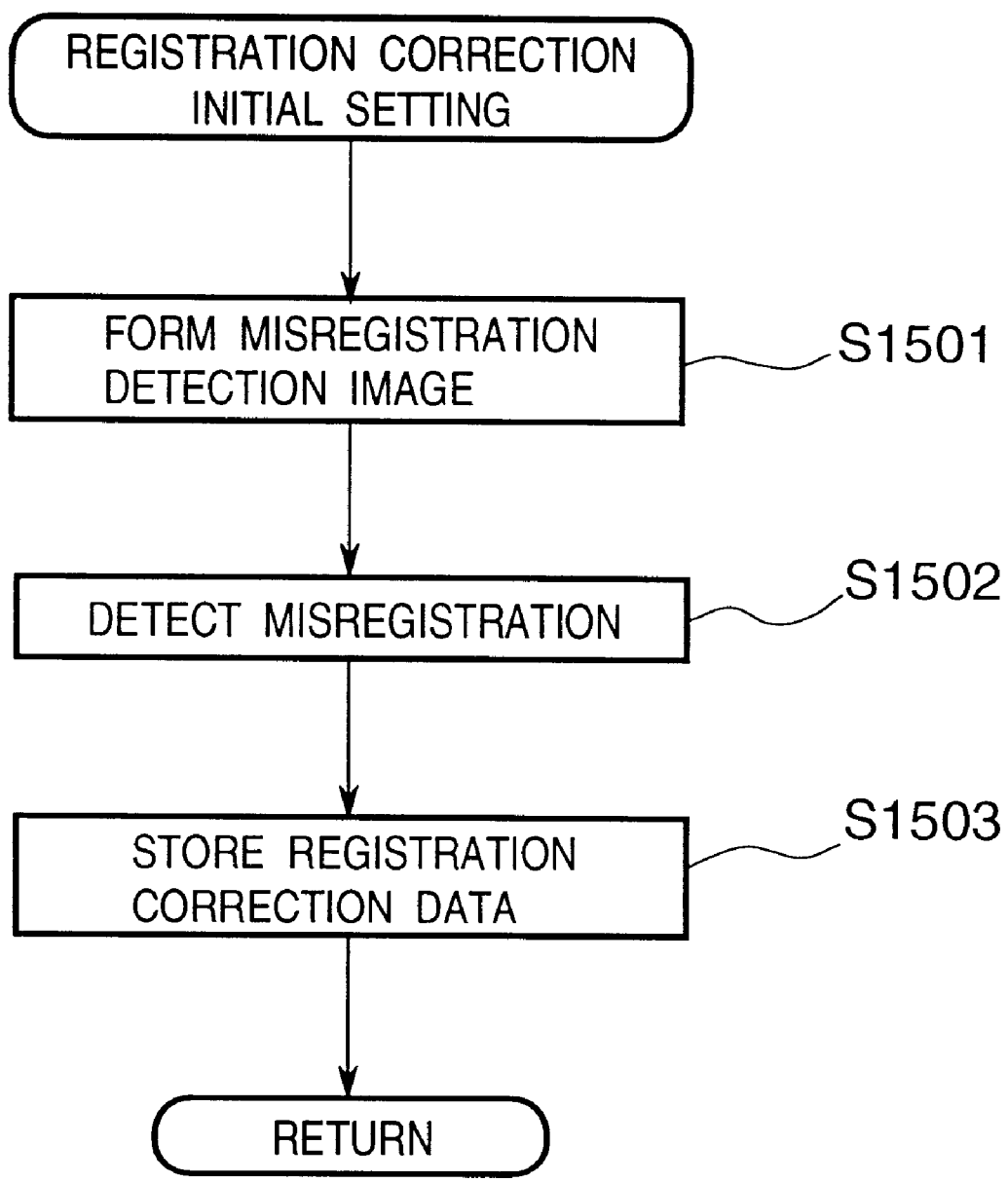
FIG. 25 is a flow chart showing the registration correction initial setting routine of the printer of the second embodiment.

FIG. 25 is a flow chart showing registration correction initial setting processing in step S1402 of FIG. 24.

In step S1501, the control section 701 prepares misregistration detection images to detect misregistrations between the photosensitive drums. More specifically, the control section 701 prepares misregistration detection images for the respective photosensitive drums and causes the light-emitting sections 821, 822, 823, and 824 to emit laser beams or LED beams in correspondence with the prepared image data. The photosensitive drums 829, 830, 831, and 832 are irradiated with the laser beams or LED beams, so latent images corresponding to the laser beams or LED beams are formed on the photosensitive drums 829, 830, 831, and 832. Developing agents are attracted onto the latent image portions on the photosensitive drums 829, 830, 831, and 832 by the developing units 825, 826, 827, and 828, respectively. The conveyor belt 843 is moved along the photosensitive drums in synchronism with rotation of the photosensitive drums 829, 830, 831, and 832 to transfer the developing agents attracted on the photosensitive drums 829, 830, 831, and 832 to predetermined positions of the conveyor belt 843 by the transfer sections 833, 834, 835, and 836, respectively.

As the misregistration detection image data, data stored in the second storage section 703 or generated by the control section 701 by calculation can be used.

In step S1502, using the registration detection sections 761, 762, 763, and 764, the control section 701 reads specific positions of the developing agents transferred to the predetermined positions of the conveyor belt 843 by the transfer sections 833, 834, 835, and 836, respectively, thereby detecting a shift in registration position (misregistration amount) for each photosensitive drum.

In step S1503, the control section 701 stores the detected registration correction data in the register in the control section 701, the first storage section 702, or the second storage section 703.

The stored registration correction data is used in the printer search response processing routine (to be described later) when returning device information in accordance with a printer device information inquiry from the computer 501.

<<Printer Search Response Processing>>

Figure 26:
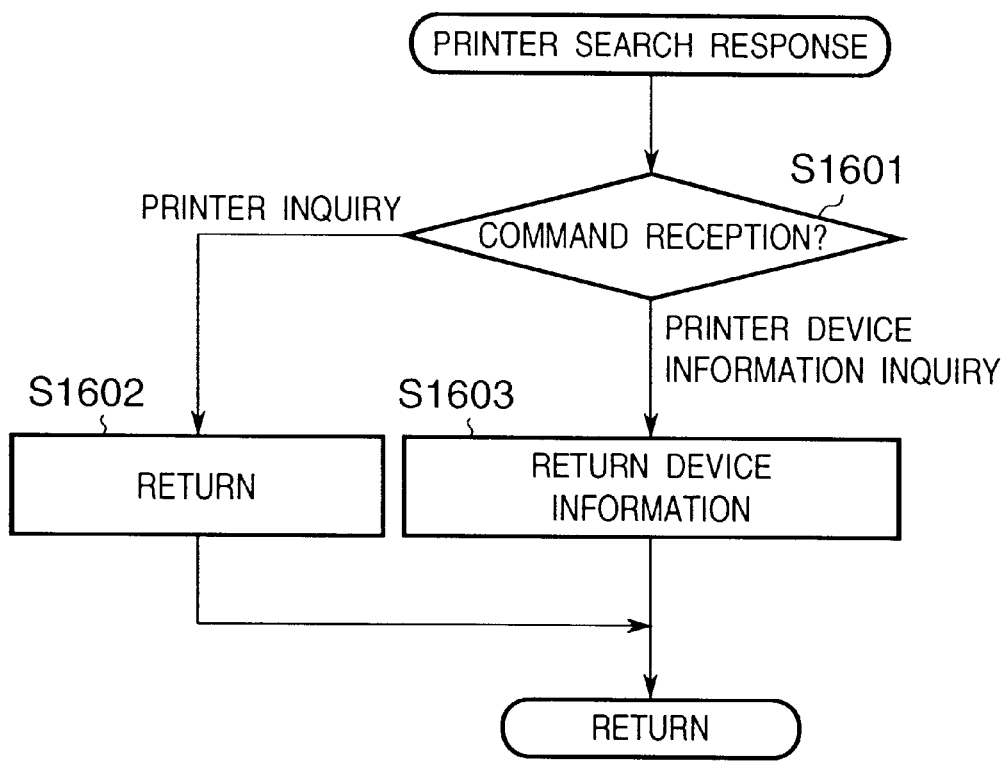
FIG. 26 is a flow chart showing the printer search response routine of the printer of the second embodiment.

FIG. 26 is a flow chart showing printer search response processing in step S1404 of FIG. 24. Referring to FIG. 26, first when a command is received from the computer 501 through the high-speed serial communication I/F 503 using the asynchronous transfer mode instep S1601, the control section 701 interprets the received command. If the command is a printer inquiry command inquiring whether image data can be transferred from the computer 501 and printed, an acknowledgement is returned to the computer 501 using the asynchronous transfer mode in step S1602, and printer search response processing is ended.

If the command received in step S1601 is a command inquiring about printer device information, the printer device information is sent to the computer 501 using the asynchronous transfer mode in step S1603, and printer search response processing is ended.

The printer device information contains the number of photosensitive drums, types of colors used for image formation, distances between the photosensitive drums, image formation speed, misregistration amount between the photosensitive drums, and the like. If the printer has a mechanism for forming an image using four individual photosensitive drums for four colors of Y, M, C, and K, the printer device information also contains information representing whether the printer has a large-capacity image memory or a drum interval correction delay memory.

<<Print Processing in Printer 502>>

Figure 27:
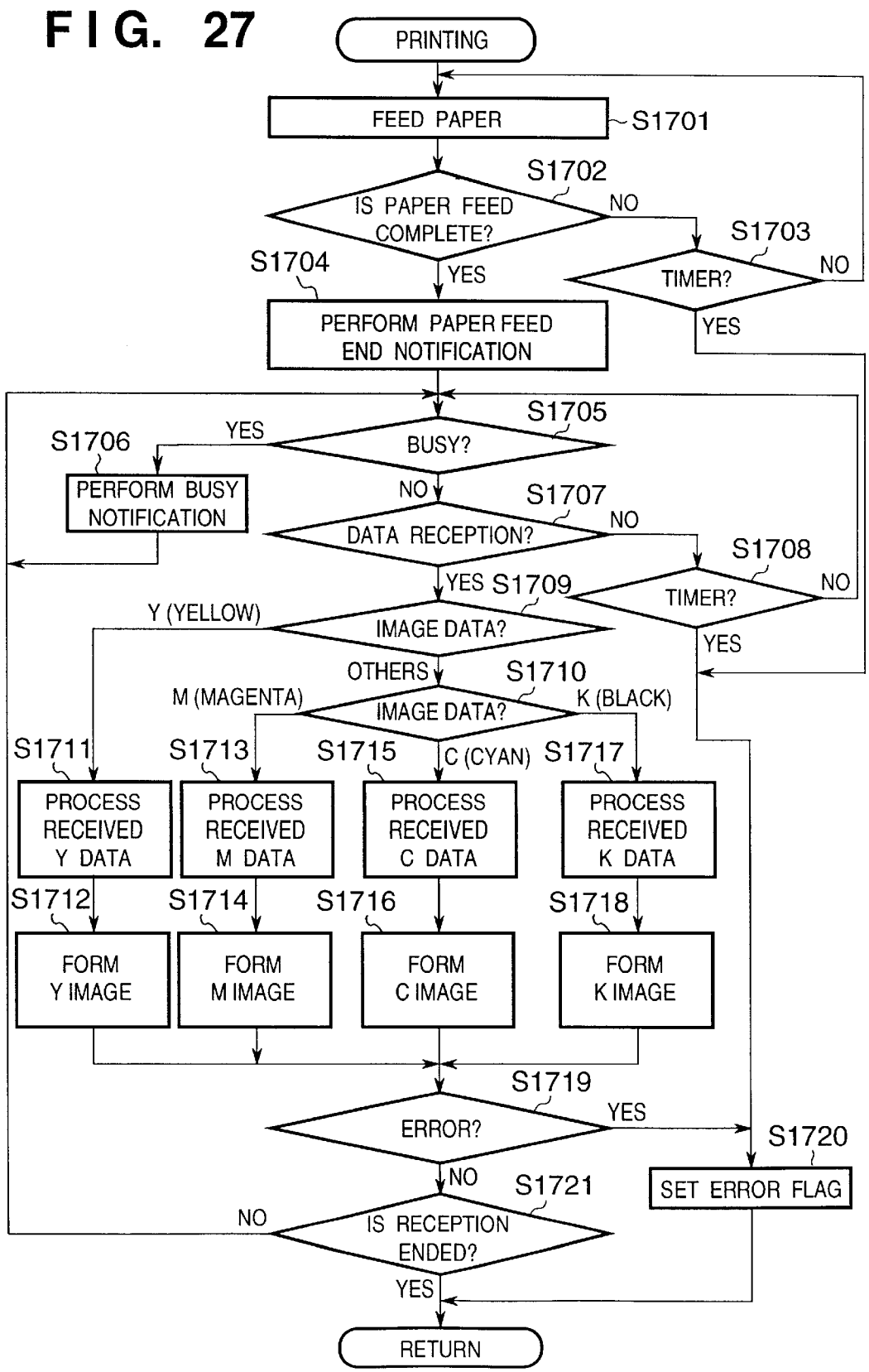
FIG. 27 is a flow chart showing the print routine of the printer of the second embodiment.

FIG. 27 is a flow chart showing details of print processing in step S1410 of FIG. 24. First, the control section 701 performs feed processing of picking up and feeding a printing paper sheet from the paper feed cassette 841 or 842 to sequentially convey it to the transfer sections 833, 834, 835, and 836 of the printer 502 in step S1701. The leading edge of the fed printing paper sheet is aligned by the registration rollers before the first transfer section 833. At this time, the end of paper feed is detected by a paper detector, and the control section 701 is notified of it. If the paper feed end notification is received in step S1702 within a predetermined time determined by a timer (not shown) in step S1703, the flow advances to step S1704, and the control section 701 sends the paper feed end notification to the computer 501 through the high-speed serial communication I/F 503 using the asynchronous transfer mode. If no paper feed end notification is received within the predetermined time in step S1702, the flow advances to step S1720. The control section 701 sets an error flag and ends print processing.

If the printer is busy and cannot receive data in step S1705, the control section 701 notifies the computer 501 of the busy status using the asynchronous transfer mode in step S1706, and the flow returns to step S1705. When the computer 501 starts transmitting image data using the isochronous transfer mode within a predetermined time determined by a timer (not shown) in step S1708, the printer starts receiving the image data by the high-speed serial communication section 708 in step S1707. The image data is received through the high-speed serial communication I/F 503, high-speed serial communication connector 709, and high-speed serial communication section 708 using one or a plurality of channels acquired by the computer 501 for data transfer with a guaranteed data transfer cycle. As described above, prior to the start of data reception, the control section 701 receives a number or numbers identifying one or a plurality of channels of which the printer is notified by the computer 501 in step S1405 of FIG. 24 and performs predetermined setting operations necessary for data reception using the isochronous transfer mode in step S1406.

In the second embodiment, for image data transmission from the computer 501 to the printer 502 in the isochronous transfer mode, image data are transferred by delaying the start of image data transfer at timings for correcting the interval between the photosensitive drums in units of channels for Y, M, C, and K. Hence, even when the printer 502 has no delay memory for correcting the interval between the photosensitive drums, the printer can sequentially receive the image data of four colors Y, M, C, and K and form a color image by accurately superposing color print data.

In addition, the start of image data transfer is delayed at a timing for registration correction between the drums. Even when the printer 502 has no FIFO memory for registration correction between the photosensitive drums, the printer can sequentially receive the image data of four colors Y, M, C, and K and form a color image while suppressing the misregistration between the color print data.

When Y image data is received via Y channel in the isochronous transfer mode in step S1709, the control section 701 sends the received Y image data from the high-speed serial communication section 708 to the image processing section 731. After predetermined image processing is performed in step S1711, an image is formed by the image forming section 741 in step S1712.

When M image data is received via M channel in the isochronous transfer mode in step S1710, the control section 701 sends the received M image data from the high-speed serial communication section 708 to the image processing section 732. After predetermined image processing is performed in step S1713, an image is formed by the image forming section 742 in step S1714.

When C image data is received via C in the isochronous transfer mode in step S1710, the control section 701 sends the received C image data from the high-speed serial communication section 708 to the image processing section 733. After predetermined image processing is performed in step S1715, an image is formed by the image forming section 743 in step S1716.

When K image data is received via K channel in the isochronous transfer mode in step S1710, the control section 701 sends the received K image data from the high-speed serial communication section 708 to the image processing section 734. After predetermined image processing is performed in step S1717, an image is formed by the image forming section 744 in step S1718.

When a problem such as jam occurs during image formation instep S1719, the control section 701 sets an error flag instep S1720 and ends print processing shown in FIG. 27. When it is determined in step S1721 that image data reception is to continue, the flow returns to step S1705 to repeat the series of processing operations. If it is determined in step S1721 that image data reception is to end, print processing shown in FIG. 27 is ended.

Figure 28:
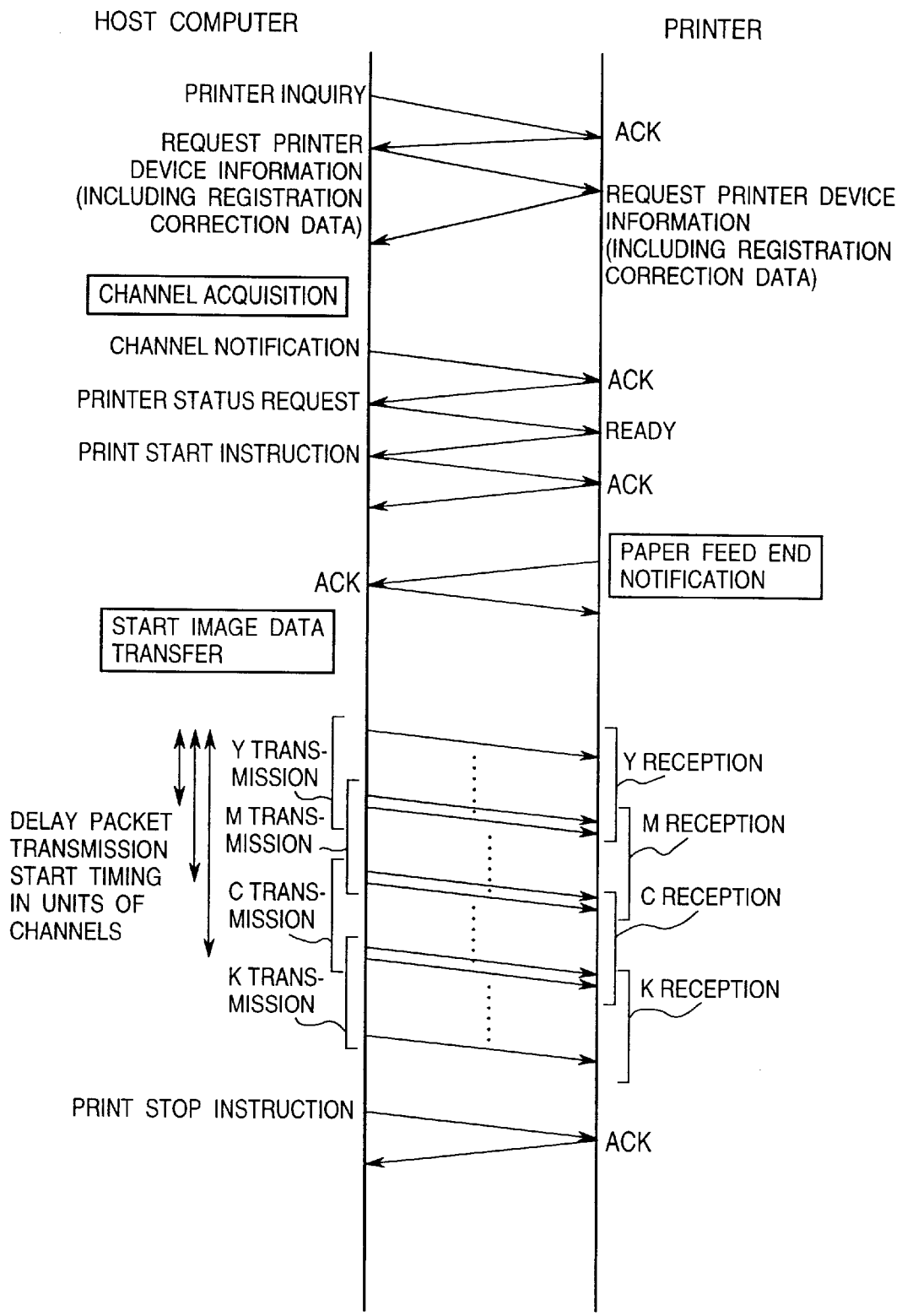
FIG. 28 is a view showing the flow of commands exchanged between the computer and the printer of the second embodiment.

In the above-described manner, communication using high-speed serial buses is performed between the computer 501 and the printer 502 to print a color image. FIG. 28 shows the flow of commands exchanged in print processing of the second embodiment.

As described above, according to the second embodiment, in the image processing system in which a computer and a printer having a plurality of image forming sections are connected, misregistration between the image forming sections in the printer is detected, and the data transfer start time is delayed to correct the misregistration. With this arrangement, a color image can be appropriately formed at a high speed without preparing any large-capacity image memory and delay memory in the printer.

Third Embodiment

The third embodiment of the present invention will be described below. The arrangement of an image processing system and detailed arrangements of a computer and printer constructing the system are the same as those of the above-described second embodiment, and a detailed description thereof will be omitted.

The print operation in the image processing system according to the third embodiment will be described below.
<Print Operation in Computer 501>

The main routine of print processing in the computer 501 of the third embodiment, and printer search processing of print processing are the same as in FIGS. 21 and 22 described in the second embodiment, and a detailed description thereof will be omitted.

Figure 29A:
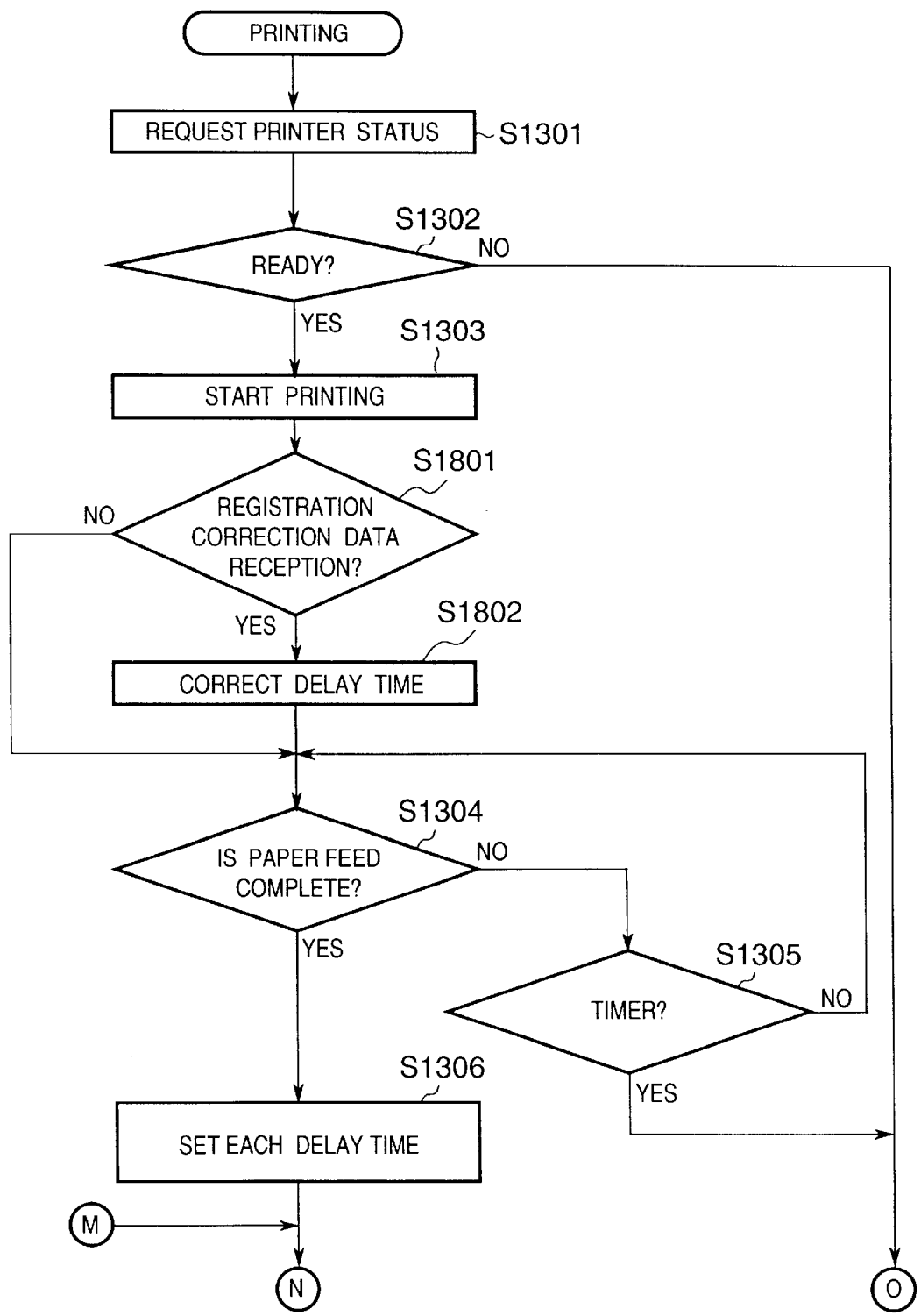
FIGS. 29A and 29B are flow charts showing the print routine of a computer according to the third embodiment of the present invention.
Figure 29B:
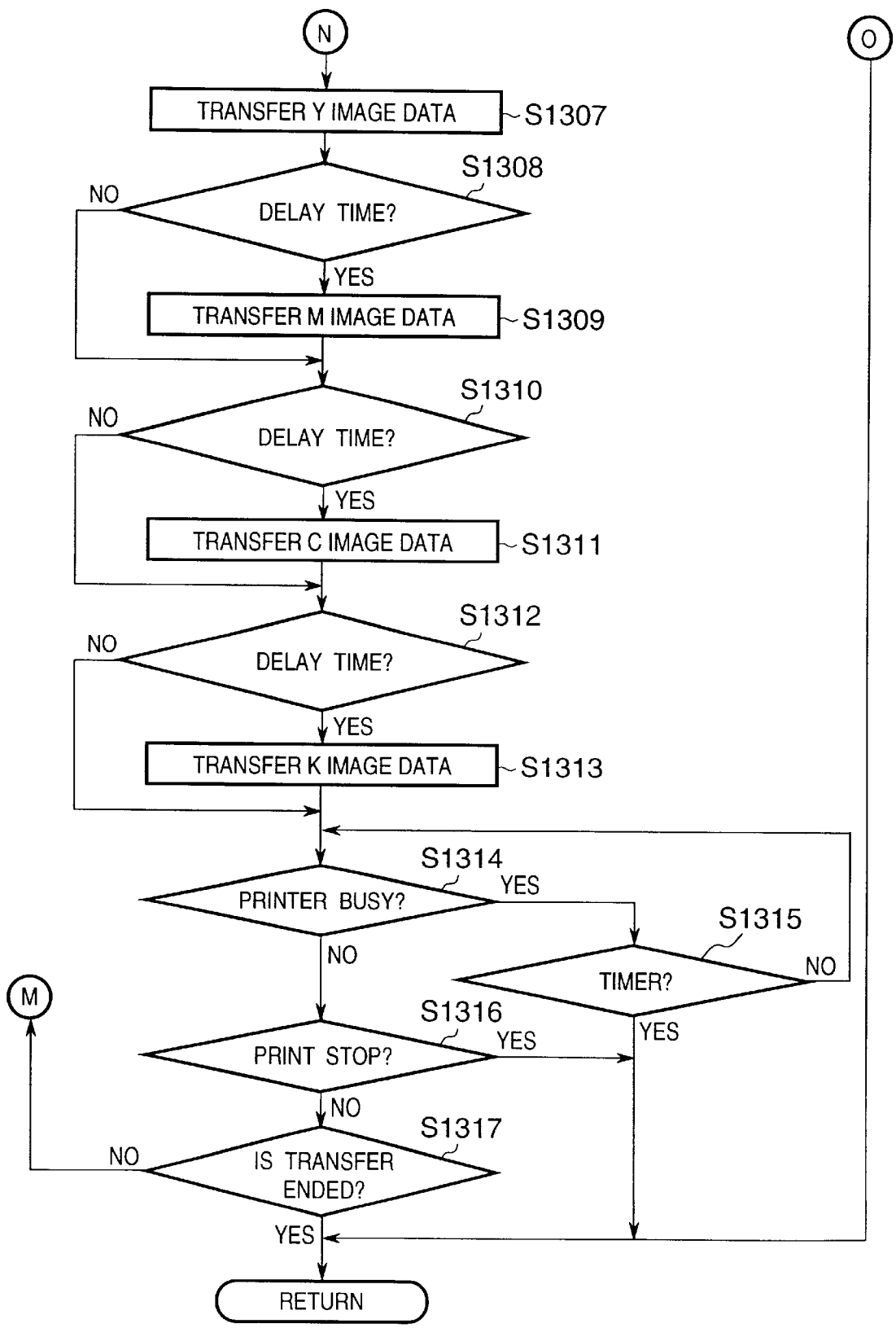

FIGS. 29A and 29B are flow charts showing details of print processing (step S1112 in FIG. 21) in the computer 501 according to the third embodiment. The same step numbers as in FIGS. 23A and 23B described in the second embodiment denote the same processing operations in FIGS. 29A and 29B, and a detailed description thereof will be omitted.

Referring to FIGS. 29A and 29B, after sending a print start instruction from a control section 601 to a printer 502 in step S1303, if registration correction data is sent from the printer 502 in the asynchronous transfer mode in step S1801, i.e., if registration correction data must be corrected for printing of this time, the control section 601 corrects each transfer start delay time for correcting the registration between the drums in step S1802.

If no registration correction data is received from the printer 502 in step S1801, i.e., if registration correction data need not be corrected for printing of this time, the flow advances to step S1304. After this, the same processing as in FIGS. 23A and 23B is performed.
<Print Operation in Printer 502>

FIG. 30 is a flow chart showing the main routine of print processing in the printer 502 according to the third embodiment. The same step numbers as in FIG. 24 described in the second embodiment denote the same processing operations in FIG. 30, and a detailed description thereof will be omitted.

Referring to FIG. 30, when a print start command is detected in step S1408, the control section 701 corrects registration correction data as needed in step S1901 to correct the misregistration between photosensitive drums 829, 830, 831, and 832. Details of registration correction processing in step S1901 will be described later with reference to FIG. 31.

After the end of registration correction processing in step S1901, print processing in step S1410 is started. After this, the same processing as in FIG. 24 is performed.

Details of registration correction initial setting processing (Sl402), printer search response processing (S1404), and print processing (S1410) in FIG. 30 are the same as in FIGS. 25, 26, and 27 described in the second embodiment, and a detailed description thereof will be omitted.

<<Registration Correction Processing>>

Figure 31:
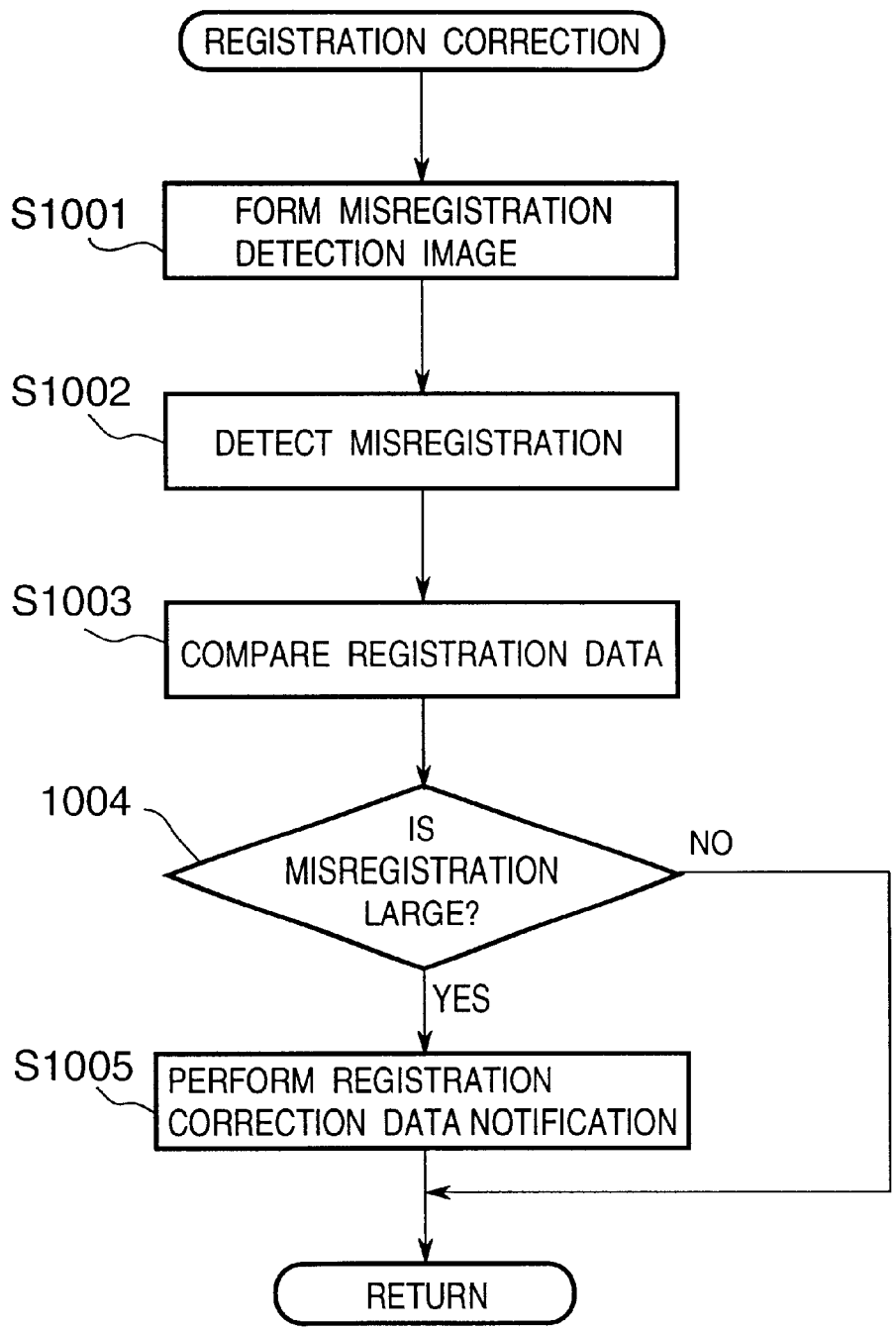
FIG. 31 is a flow chart showing the registration correction initial setting routine of the printer of the third embodiment.

FIG. 31 is a flowchart showing details of registration correction processing shown instep S1901 of FIG. 30. First, in step S1001 a control section 701 prepares misregistration detection images to detect misregistrations between the photosensitive drums.

More specifically, the control section 701 prepares misregistration detection images for the respective photosensitive drums and causes light-emitting sections 821, 822, 823, and 824 to emit laser beams or LED beams in correspondence with the prepared image data. The photosensitive drums 829, 830, 831, and 832 are irradiated with the laser beams or LED beams, so latent images corresponding to the laser beams or LED beams are formed on the photosensitive drums 829, 830, 831, and 832. Developing agents are attracted onto the latent image portions on the photosensitive drums 829, 830, 831, and 832 by developing units 825, 826, 827, and 828, respectively. A conveyor belt 843 is moved along the photosensitive drums in synchronism with rotation of the photosensitive drums 829, 830, 831, and 832 to transfer the developing agents attracted on the photosensitive drums 829, 830, 831, and 832 to predetermined positions of the conveyor belt 843 by transfer sections 833, 834, 835, and 836, respectively.

As the misregistration detection image data, data stored in a second storage section 703 or generated by the control section 701 by calculation can be used.

In step S1002, using registration detection sections 761, 762, 763, and 764 corresponding to the photosensitive drums, the control section 701 reads the specific positions of the developing agents transferred to the predetermined positions of the conveyor belt 843 by the transfer sections 833, 834, 835, and 836, respectively, thereby detecting a shift in registration position (misregistration amount) for each photosensitive drum.

In step S1003, the control section 701 compares the detected registration correction data with predetermined registration correction data stored in the register in the control section 701, a first storage section 702, or the second storage section 703. When it is determined in step S1004 that the detected registration correction data is larger than the predetermined registration correction data, i.e., falls outside the allowable misregistration range, the flow advances to step S1005. The computer 501 is notified of the detected registration correction data using the asynchronous transfer mode, and the registration correction processing is ended. When it is determined in step S1004 that the detected registration correction data falls within the predetermined misregistration range, the registration correction processing is ended.

Figure 32:
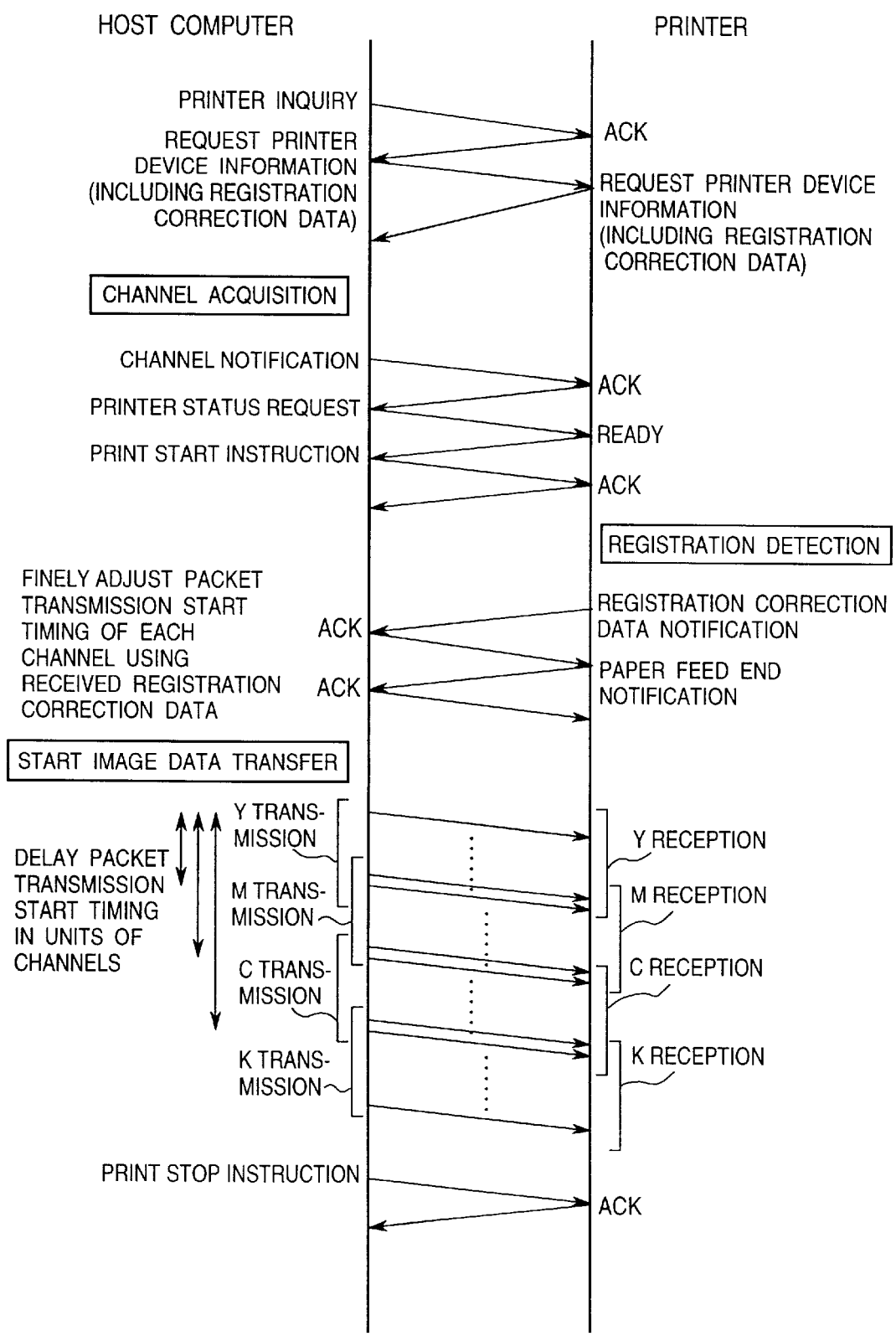
FIG. 32 is a view showing the flow of commands exchanged between the computer and the printer of the third embodiment.

As described above, in the third embodiment as well, communication using high-speed serial buses is performed between the computer 101 and the printer 502 to print a color image. FIG. 32 shows the flow of commands exchanged in print processing of the third embodiment.

As described above, according to the third embodiment, in addition to the effects obtained by the second embodiment, when the misregistration amount of the registration position (registration) of each photosensitive drum exceeds the allowable range due to a change over time or the like, the computer 501 is notified of it, and the start of image data transfer can be delayed on the basis of the new registration correction amount. Hence, a color image can be formed by always suppressing the misregistration between the color print data.

Modification

In the above-described embodiments, one computer and one or two printers are connected to a high-speed serial communication I/F. Even a combination of one or a plurality of computers and one or a plurality of printers poses no problem. Especially, in the first embodiment, three or more printers may be connected to the computer 101 to print simultaneously by all printers. One or a plurality of devices other than a computer or printer may be connected to the high-speed serial communication I/F.

In the embodiments, the printer has four photosensitive drums for Y, M, C, and K. However, the number, colors, and order of photosensitive drums are not limited to this. More specifically, the arrangement only requires the function of sequentially conveying a printing paper sheet to a plurality of photosensitive drums and supplying image data of the respective colors while correcting any time lag between the times of arrival of the printing paper at the photosensitive drums. In the second and third embodiments, the arrangement requires to further have the function of correcting the registration between the photosensitive drums.

In the above description, after the start of transfer of Y image data, when the set transfer start delay time between the Y photosensitive drum and the M photosensitive drum has elapsed, transfer of M image data is started. When the set transfer start delay time between the Y photosensitive drum and the C photosensitive drum has elapsed, transfer of C image data is started. When the set transfer start delay time between the Y photosensitive drum and the K photosensitive drum has elapsed, transfer of K image data is started. However, as far as the times of supply of image data of the respective colors can be corrected in accordance with the time lag between times of arrival of the printing paper at the photosensitive drums, the timing of starting transferring each color data may be generated by another method in the first embodiment, or the timing of starting transferring each color data including correcting registration may be generated by another method in the second and third embodiments.

For example, the time lag may be corrected such that after the start of transfer of Y image data, when the set transfer start delay time between the Y photosensitive drum and the M photosensitive drum has elapsed, transfer of M image data is started, when the set transfer start delay time between the M photosensitive drum and the C photosensitive drum has elapsed, transfer of C image data is started, and when the set transfer start delay time between the C photosensitive drum and the K photosensitive drum has elapsed, transfer of K image data is started.

In the above embodiments, image data is transferred from the computer to the printer. However, image data may be temporarily transferred from the computer to a server, and then from the server to the printer. After transfer of command instructing image formation from the computer to the server, image data may be transferred from the server to the printer. In these cases, the series of processing operations to be performed between the computer and the printer, as described in the above embodiments, are implemented between the server and the printer.

In the above embodiments, the printer has an image forming section using a photosensitive drum. However, an image forming section using another mechanism may be employed without any problem as far as the arrangement only need to sequentially convey a printing paper sheet to a plurality of photosensitive drums and supply image data of the respective colors while correcting any time lag between the times of arrival of the printing paper at the photosensitive drums.

In the above-described second and third embodiments, the registration detection sections 761 to 764 are arranged in correspondence with the number of photosensitive drums. However, a smaller number of registration detection sections may be provided for common use. For example, one registration detection section may detect the positions of images formed by a plurality of photosensitive drums.

In the second and third embodiments, registration correction processing is executed in accordance with reception of a print start command. However, registration correction processing may be executed at an arbitrary timing even during printing. The arbitrary timing is, e.g., a timing when one or a predetermined number of pages are printed, a timing when a predetermine time has come, or a timing when a predetermined temperature/humidity change has occurred. If registration correction is to be executed during printing, a registration detection image may be formed in a region between printing paper sheets on the conveyor belt 843 or the marginal region of the printing paper sheet. Alternatively, a registration detection image may be formed not on the conveyor belt 843 but on a printing paper sheet and read to detect the registration correction data.

Other Embodiments

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The products, e.g., printed matter obtained by the image processing method of the present invention are also incorporated in the present invention.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes. When the present invention is applied to the storage medium, the storage medium stores program codes corresponding to the above-described flow charts (FIGS. 6 to 8, 10A to 15, 21 to 27, and 29A to 31).

As has been described above, according to the present invention, in the image processing system in which an image processing apparatus and an image forming apparatus are connected via a serial bus, image data transferred from the image processing apparatus in the isochronous transfer mode is printed by the image forming apparatus at a high speed using an inexpensive arrangement.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus connected to a plurality of image forming apparatuses via a serial bus, comprising:
    channel control means for ensuring a plurality of channels for isochronous transfer through said serial bus and assigning the channels to a plurality of types of image data on the basis of device information of said plurality of image forming apparatuses; and
    communication means for isochronously transferring the plurality of types of image data to said plurality of image forming apparatuses using the assigned channels.

2. The apparatus according to claim 1, wherein that said channel control means ensures and assigns the channels on the basis of whether the plurality of types of image data to be transferred to said plurality of image forming apparatuses can share the channels.

3. The apparatus according to claim 2, wherein said channel control means assigns the plurality of channels by discriminating common channels to be shared by the plurality of types of image data from uncommon channels not to be shared by the plurality of types of image data.

4. The apparatus according to claim 3, wherein said channel control means detects a delay amount of a transfer start time in said communication means for each of the plurality of types of image data on the basis of device information of each of said plurality of image forming apparatuses and detects on the basis of the delay amount whether the channels can be shared.

5. The apparatus according to claim 4, wherein the device information includes construction information and/or image formation speed information of image formation means in said image forming apparatus.

6. The apparatus according to claim 4, wherein the plurality of types of image data are image data of a plurality of colors, and
    said channel control means assigns the channels in accordance with whether the channels can be shared by image data of a common color in said plurality of image forming apparatuses.

7. The apparatus according to claim 1, wherein the isochronous transfer is a communication mode capable of ensuring a given data transfer rate.

8. The apparatus according to claim 7, wherein the isochronous transfer is a communication mode for ensuring a channel with a guaranteed data transfer rate and broadcasting image data segmented into data packets via the channel.

9. The apparatus according to claim 1, wherein said serial bus is a bus compatible with or complying with the IEEE 1394 standard.

10. The apparatus according to claim 1, wherein said serial bus is a bus compatible with or complying with the USB standard.

11. An image processing apparatus connected to an image forming apparatus via a serial bus, comprising:
   channel control means for ensuring a plurality of channels for isochronous transfer through said serial bus and assigning the channels to a plurality of types of image data on the basis of device information of said image forming apparatus; and
   communication means for isochronously transferring the plurality of types of image data to said image forming apparatus using the assigned channels.

12. The apparatus according to claim 11, wherein the device information is positional shift information of an image formed in said image forming apparatus on the basis of the plurality of types of image data.

13. The apparatus according to claim 12, wherein said channel control means detects a delay amount of a transfer start time in said communication means for each of the plurality of types of image data on the basis of the positional shift information and ensures and assigns the channels on the basis of the delay amount.

14. The apparatus according to claim 11, wherein the isochronous transfer is a communication mode capable of ensuring a given data transfer rate.

15. The apparatus according to claim 14, wherein the isochronous transfer is a communication mode for ensuring a channel with a guaranteed data transfer rate and broadcasting image data segmented into data packets via the channel.

16. The apparatus according to claim 11, wherein said serial bus is a bus compatible with or complying with the IEEE 1394 standard.

17. The apparatus according to claim 11, wherein said serial bus is a bus compatible with or complying with the USB standard.

18. An image processing system in which an image processing apparatus and a plurality of image forming apparatuses are connected via a serial bus,
   said image processing apparatus comprises:
      channel control means for ensuring a plurality of channels for isochronous transfer through said serial bus and assigning the channels to a plurality of types of image data on the basis of device information of said plurality of image forming apparatuses; and
      first communication means for isochronously transferring the plurality of types of image data to said plurality of image forming apparatuses using the assigned channels, and
   each of said plurality of image forming apparatuses comprises:
      second communication means for receiving the plurality of types of image data isochronously transferred using the channels via said serial bus; and
      image formation means for forming an image on a recording medium on the basis of the received plurality of types of image data.

19. The system according to claim 18, wherein said channel control means ensures and assigns the channels on the basis of whether the plurality of types of image data to be transferred to said plurality of image forming apparatuses can share the channels.

20. The system according to claim 19, wherein said channel control means assigns the plurality of channels by discriminating common channels to be shared by the plurality of types of image data from uncommon channels not to be shared by the plurality of types of image data.

21. The system according to claim 20, wherein said channel control means detects a delay amount of a transfer start time in said communication means for each of the plurality of types of image data on the basis of device information of each of said plurality of image forming apparatuses and detects on the basis of the delay amount whether the channels can be shared.

22. The system according to claim 21, wherein the plurality of types of image data are image data of a plurality of colors, which are to be transferred to said plurality of image forming apparatuses, and
   said channel control means assigns the channels in accordance with whether the channels can be shared by image data of a common color in said plurality of image forming apparatuses.

23. The system according to claim 22, wherein each of said plurality of image forming apparatuses comprises a number of image formation means respectively corresponding to the plurality of colors.

24. The system according to claim 18, wherein the isochronous transfer is a communication mode capable of ensuring a given data transfer rate.

25. The system according to claim 24, wherein the isochronous transfer is a communication mode for ensuring a channel with a guaranteed data transfer rate and broadcasting image data segmented into data packets via the channel.

26. The system according to claim 18, wherein said second communication means further notifies said first communication means of the device information of said image forming apparatuses by asynchronous transfer.

27. The system according to claim 26, wherein the asynchronous transfer is a communication mode capable of data transfer in a one-to-one correspondence to a designated transfer destination.

28. The system according to claim 27, wherein said first communication means further notifies said second communication means, using asynchronous transfer, of channel information ensured by said channel control means for isochronous transfer.

29. The system according to claim 28, wherein said first communication means further asynchronously transfers an image formation start instruction to said second communication means, and
   said second communication means receives the image formation start instruction and asynchronously transfers to said first communication means information representing that said image forming apparatus is ready to start image formation.

30. The system according to claim 29, wherein when a recording medium is conveyed to said image formation means, said second communication means asynchronously transfers to said first communication means information representing that preparation for image formation is complete.

31. The system according to claim 18, wherein said serial bus is a bus compatible with or complying with the IEEE 1394 standard.

32. The system according to claim 18, wherein said serial bus is a bus compatible with or complying with the USB standard.

33. An image processing system in which an image processing apparatus and an image forming apparatus are connected via a serial bus,
 said image processing apparatus comprises:
  channel control means for ensuring a plurality of channels for isochronous transfer through said serial bus and assigning the channels to a plurality of types of image data on the basis of device information of said image forming apparatus; and
  first communication means for isochronously transferring the plurality of types of image data to said image forming apparatus using the assigned channels, and
 said image forming apparatus comprises:
  second communication means for receiving the plurality of types of image data isochronously transferred using the channels via said serial bus; and
  a plurality of image formation means for forming an image on a recording medium on the basis of the received plurality of types of image data, respectively.

34. The system according to claim 33, wherein said image forming apparatus further comprises detection means for detecting positional shift information of an image generated in image formation in each of said plurality of image formation means, and
 said second communication means asynchronously transfers the positional shift information to said first communication means as the device information.

35. The system according to claim 34, wherein said detection means forms detection images by said plurality of image formation means and detects formation positions to detect the positional shift information for each image formation means.

36. The system according to claim 34, wherein when the positional shift amount detected by said detection means is not less than a predetermined value, said second communication means asynchronously transfers the information to said first communication means.

37. The system according to claim 34, wherein said channel control means detects a delay amount of a transfer start time in said first communication means for each of the plurality of types of image data on the basis of the positional shift information and ensures and assigns the channels on the basis of the delay amount.

38. The system according to claim 37, wherein the plurality of types of image data are image data of a plurality of colors, and
 said image forming apparatus comprises a number of image formation means respectively corresponding to the plurality of colors.

39. The system according to claim 34, wherein the asynchronous transfer is a communication mode capable of data transfer in a one-to-one correspondence to a designated transfer destination.

40. The system according to claim 39, wherein said first communication means further asynchronously transfers an image formation start instruction to said second communication means, and
 said second communication means receives the image formation start instruction and asynchronously transfers to said first communication means information representing that said image forming apparatus is ready to start image formation.

41. The system according to claim 40, wherein when a recording medium is conveyed to said image formation means, said second communication means asynchronously transfers to said first communication means information representing that preparation for image formation is complete.

42. The system according to claim 40, wherein said detection means detects the positional shift information after said second communication means transfers to said first communication means information representing that preparation for image formation is complete.

43. The system according to claim 34, wherein said first communication means further notifies said second communication means, using asynchronous transfer, of channel information ensured by said channel control means for isochronous transfer.

44. The system according to claim 33, wherein the isochronous transfer is a communication mode capable of ensuring a given data transfer rate.

45. The system according to claim 44, wherein the isochronous transfer is a communication mode for ensuring a channel with a guaranteed data transfer rate and broadcasting image data segmented into data packets via the channel.

46. The system according to claim 33, wherein said serial bus is a bus compatible with or complying with the IEEE 1394 standard.

47. The system according to claim 33, wherein said serial bus is a bus compatible with or complying with the USB standard.

48. A control method for an image processing apparatus connected to a plurality of image forming apparatuses via a serial bus, comprising:
 the channel ensuring step of ensuring a plurality of channels for isochronous transfer via said serial bus on the basis of device information of said plurality of image forming apparatuses;
 the channel assignment step of assigning the plurality of channels to a plurality of types of image data; and
 the communication step of isochronously transferring the plurality of types of image data to said plurality of image forming apparatuses using the assigned channel.

49. The method according to claim 48, wherein the channel ensuring step comprises:
 the delay amount detection step of detecting a delay amount of a transfer start time in communication means for each of the plurality of types of image data on the basis of device information of each of said plurality of image forming apparatuses;
 the channel share detection step of detecting on the basis of the delay amount whether the channels can be shared; and
 the ensuring step of ensuring the channels on the basis of whether the channels can be shared.

50. A control method for an image processing apparatus connected to an image forming apparatus via a serial bus, comprising:
 the channel ensuring step of ensuring a plurality of channels for isochronous transfer via said serial bus on the basis of device information of said image forming apparatuses;
 the channel assignment step of assigning the plurality of channels to a plurality of types of image data; and
 the communication step of isochronously transferring the plurality of types of image data to said image forming apparatus using the assigned channel.

51. The method according to claim 50, wherein the device information is positional shift information of an image formed in said image forming apparatus on the basis of the plurality of types of image data, and the channel ensuring step comprises detecting a delay amount of a transfer start time in communication means for each of the plurality of types of image data on the basis of the positional shift information and ensuring and assigning the channels on the basis of the delay amount.

52. A control method for an image processing system in which an image processing apparatus and a plurality of image forming apparatuses are connected via a serial bus, comprising:

the channel ensuring step of, in said image processing apparatus, ensuring a plurality of channels for isochronous transfer through said serial bus on the basis of device information of said plurality of image forming apparatuses;

the channel assignment step of assigning the ensured channels to the plurality of types of image data;

the data transfer step of isochronously transferring the plurality of types of image data to said plurality of image forming apparatuses using the assigned channels;

the date reception step of, in each of said plurality of image forming apparatuses, receiving the plurality of types of image data transferred from said image processing apparatus in the data transfer step; and the image formation step of forming an image on a recording medium on the basis of each of the received plurality of types of image data.

53. The method according to claim 52, wherein the channel ensuring step comprises:

the delay amount detection step of detecting a delay amount of a transfer start time in communication means for each of the plurality of types of image data on the basis of device information of each of said plurality of image forming apparatuses;

the channel share detection step of detecting on the basis of the delay amount whether the channels can be shared; and the ensuring step of ensuring the channels on the basis of whether the channels can be shared.

54. A control method for an image processing system in which an image processing apparatus and an image forming apparatus are connected via a serial bus, comprising:

the channel ensuring step of, in said image processing apparatus, ensuring a plurality of channels for isochronous transfer through said serial bus on the basis of device information of said image forming apparatus;

the channel assignment step of assigning the ensured channels to the plurality of types of image data;

the data transfer step of isochronously transferring the plurality of types of image data to said image forming apparatus using the assigned channels;

the date reception step of, in said image forming apparatus, receiving the plurality of types of image data transferred from said image processing apparatus in the data transfer step; and the image formation step of forming an image on a recording medium by a plurality of image formation means on the basis of each of the received plurality of types of image data.

55. The method according to claim 54, further comprising:

the detection step of detecting positional shift information of an image generated in image formation in each of said plurality of image formation means in the image formation step; and the positional shift information transfer step of asynchronously transferring the positional shift information to said image processing apparatus as the device information.

56. A recording medium which stores control program codes of an image processing system in which an image processing apparatus and a plurality of image forming apparatuses are connected via a serial bus, the program codes comprising at least codes of:

the channel ensuring step of, in said image processing apparatus, ensuring a plurality of channels for isochronous transfer through said serial bus on the basis of device information of said image forming apparatus;

the channel assignment step of assigning the ensured channels to the plurality of types of image data;

the data transfer step of isochronously transferring the plurality of types of image data to said image forming apparatus using the assigned channels;

the date reception step of, in said image forming apparatus, receiving the plurality of types of image data transferred from said image processing apparatus in the data transfer step; and the image formation step of forming an image on a recording medium by a plurality of image formation means on the basis of each of the received plurality of types of image data.

57. A recording medium which stores control program codes of an image processing system in which an image processing apparatus and an image forming apparatus are connected via a serial bus, the program codes comprising at least codes of:

the channel ensuring step of, in said image processing apparatus, ensuring a plurality of channels for isochronous transfer through said serial bus on the basis of device information of said image forming apparatus;

the channel assignment step of assigning the ensured channels to the plurality of types of image data;

the data transfer step of isochronously transferring the plurality of types of image data to said image forming apparatus using the assigned channels;

the date reception step of, in said image forming apparatus, receiving the plurality of types of image data transferred from said image processing apparatus in the data transfer step; and the image formation step of forming an image on a recording medium by a plurality of image formation means on the basis of each of the received plurality of types of image data.

58. A storage medium storing a program implementing the method according to any one of claims 48 to 55.

* * * * *